(12) United States Patent
Ben-Zur

(10) Patent No.: US 11,447,648 B2
(45) Date of Patent: *Sep. 20, 2022

(54) PROCESS AND SYSTEM FOR PRINTING IMAGES ON ABSORPTIVE SURFACES

(71) Applicant: Kornit Digital Ltd., Rosh HaAyin (IL)

(72) Inventor: Ofer Ben-Zur, Hod-HaSharon (IL)

(73) Assignee: KORNIT DIGITAL LTD., Rosh Haayin (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/744,833

(22) Filed: Jan. 16, 2020

(65) Prior Publication Data
US 2020/0157367 A1 May 21, 2020

Related U.S. Application Data

(63) Continuation of application No. 14/619,218, filed on Feb. 11, 2015, which is a continuation-in-part of
(Continued)

(30) Foreign Application Priority Data

May 30, 2004 (IL) .......................................... 162231

(51) Int. Cl.
C09D 11/30 (2014.01)
C09D 11/38 (2014.01)
(Continued)

(52) U.S. Cl.
CPC .............. *C09D 11/30* (2013.01); *C09D 11/10* (2013.01); *C09D 11/322* (2013.01); *C09D 11/38* (2013.01);
(Continued)

(58) Field of Classification Search
CPC ....... C09D 11/30; C09D 11/40; D06P 5/2072; D06P 5/30; Y10S 38/00; B41J 3/4078; D06F 63/00; D06F 63/02; B41F 17/38
See application file for complete search history.

(56) References Cited

U.S. PATENT DOCUMENTS 2,123,638 A 7/1938 Steccone
3,100,704 A 8/1963 Coles et al.
(Continued)

FOREIGN PATENT DOCUMENTS

CN 1612919 5/2005
CN 1676547 10/2005
(Continued)

OTHER PUBLICATIONS

Final Official Action dated Apr. 15, 2020 from USPTO in U.S. Appl. No. 14/619,218. (16 pages).
(Continued)

*Primary Examiner* — Jennifer Bahls
*Assistant Examiner* — Quang X Nguyen
(74) *Attorney, Agent, or Firm* — Browdy and Neimark, PLLC

(57) ABSTRACT

A novel process for printing high quality, high resolution, multi-color images on fibrous or porous materials or other ink absorbing materials, or on materials having high surface tension with a liquid ink, and especially over garments, is disclosed. The process is effected by applying a wetting composition, prior to, concomitant with and/or subsequent to applying an ink composition and formation of the images. Pre-printing and printing systems for executing the above process are further disclosed.

7 Claims, 17 Drawing Sheets

Related U.S. Application Data application No. 11/606,242, filed on Nov. 30, 2006, now abandoned, which is a continuation-in-part of application No. PCT/IL2005/000558, filed on May 30, 2005, which is a continuation-in-part of application No. PCT/IL2005/000166, filed on Feb. 10, 2005.

(60) Provisional application No. 60/651,230, filed on Feb. 10, 2005.

(51) Int. Cl.

| | | |
|---|---|---|
| *C09D 11/10* | (2014.01) | |
| *C09D 11/40* | (2014.01) | |
| *C09D 11/322* | (2014.01) | |
| *D06P 1/651* | (2006.01) | |
| *D06P 1/62* | (2006.01) | |
| *D06P 5/30* | (2006.01) | |
| *D06P 5/20* | (2006.01) | |
| *D06P 1/52* | (2006.01) | |

(52) U.S. Cl.
CPC ............ *C09D 11/40* (2013.01); *D06P 1/5257* (2013.01); *D06P 1/625* (2013.01); *D06P 1/65112* (2013.01); *D06P 1/65118* (2013.01); *D06P 1/65125* (2013.01); *D06P 1/65131* (2013.01); *D06P 5/2077* (2013.01); *D06P 5/30* (2013.01)

(56) References Cited

U.S. PATENT DOCUMENTS

| | | | |
|---|---|---|---|
| 3,968,498 A | | 7/1976 | Uchiyama |
| 3,990,363 A | | 11/1976 | Vertegaal |
| 4,021,591 A | | 5/1977 | De Vries et al. |
| 4,284,758 A | | 8/1981 | North |
| 4,285,690 A | | 8/1981 | North |
| 4,296,421 A | | 10/1981 | Hara et al. |
| 4,312,007 A | | 1/1982 | Winfield |
| 4,345,063 A | | 8/1982 | North |
| 4,380,770 A | | 4/1983 | Maruyama |
| 4,435,442 A | * | 3/1984 | Hefele ...................... D06Q 1/06 2/272 |
| 4,630,076 A | | 12/1986 | Yoshimura |
| 4,702,742 A | | 10/1987 | Iwata et al. |
| 4,888,093 A | | 12/1989 | Dean et al. |
| 5,348,997 A | | 9/1994 | Kato et al. |
| 5,349,021 A | | 9/1994 | Rooney et al. |
| 5,360,933 A | | 11/1994 | Imashiro et al. |
| 5,428,383 A | | 6/1995 | Shields et al. |
| 5,432,229 A | | 7/1995 | Aoki et al. |
| 5,501,902 A | | 3/1996 | Kronzer |
| 5,510,415 A | | 4/1996 | Zahrobsky et al. |
| 5,518,534 A | | 5/1996 | Pearlstine et al. |
| 5,534,904 A | | 7/1996 | Sheinman |
| 5,582,104 A | | 12/1996 | Best et al. |
| 5,594,044 A | | 1/1997 | Yang |
| 5,596,047 A | | 1/1997 | Wu et al. |
| 5,631,684 A | | 5/1997 | Takaide et al. |
| 5,645,888 A | | 7/1997 | Titterington et al. |
| 5,757,407 A | | 5/1998 | Rezanka |
| 5,798,179 A | | 8/1998 | Kronzer |
| 5,820,661 A | | 10/1998 | Gregory et al. |
| 5,835,116 A | | 11/1998 | Sato et al. |
| 5,858,514 A | | 1/1999 | Bowers |
| 5,866,638 A | | 2/1999 | Shimomura |
| 5,885,335 A | | 3/1999 | Adams et al. |
| 5,902,387 A | | 5/1999 | Suzuki et al. |
| 5,981,113 A | | 5/1999 | Christian |
| 5,970,874 A | * | 10/1999 | Bill ...................... B41F 16/02 101/115 |
| 5,988,791 A | | 11/1999 | Miyashita et al. |
| 6,042,228 A | | 3/2000 | Yamada et al. |
| 6,059,391 A | | 5/2000 | Fulkerson et al. |
| 6,063,922 A | | 5/2000 | Flood et al. |
| 6,071,368 A | * | 6/2000 | Boyd ...................... B41M 5/5245 156/230 |
| 6,087,061 A | | 7/2000 | Hare et al. |
| 6,095,628 A | | 8/2000 | Rhome |
| 6,117,921 A | | 9/2000 | Ma et al. |
| 6,124,398 A | | 9/2000 | Imashiro et al. |
| 6,126,281 A | | 10/2000 | Shimoda et al. |
| 6,132,502 A | | 10/2000 | Yatake |
| 6,140,391 A | | 10/2000 | Zou et al. |
| 6,156,072 A | | 12/2000 | Usui et al. |
| 6,161,929 A | | 12/2000 | Erdtmann et al. |
| 6,183,079 B1 | | 2/2001 | Meade et al. |
| 6,196,674 B1 | | 3/2001 | Takemoto |
| 6,200,667 B1 | | 3/2001 | Harata et al. |
| 6,206,516 B1 | | 3/2001 | Moriyama et al. |
| 6,262,796 B1 | | 7/2001 | Loopstra |
| 6,267,518 B1 | | 7/2001 | Abe |
| 6,270,189 B1 | | 8/2001 | Miyashita et al. |
| 6,277,183 B1 | | 8/2001 | Johnson et al. |
| 6,281,269 B1 | | 8/2001 | Schul |
| 6,291,023 B1 | | 9/2001 | Nigam |
| 6,300,391 B2 | | 10/2001 | Parazek et al. |
| 6,322,620 B1 | | 11/2001 | Xiao |
| 6,326,419 B1 | | 12/2001 | Smith |
| 6,335,140 B1 | | 1/2002 | Miyazaki |
| 6,341,856 B1 | | 1/2002 | Thompson et al. |
| 6,500,880 B1 | | 3/2002 | Parazek |
| 6,416,923 B2 | | 7/2002 | Miyazaki |
| 6,450,633 B1 | | 9/2002 | Kronzer |
| 6,464,649 B1 | | 10/2002 | Duchon et al. |
| 6,472,051 B2 | | 10/2002 | Hirabayashi et al. |
| 6,513,924 B1 | | 2/2003 | Goldberg et al. |
| 6,517,199 B1 | | 2/2003 | Tomioka et al. |
| 6,536,894 B1 | | 3/2003 | Rasmussen |
| 6,606,427 B1 | | 8/2003 | Graves et al. |
| 6,626,530 B2 | | 9/2003 | Snow et al. |
| 6,647,208 B1 | | 11/2003 | Kirby |
| 6,682,189 B2 | | 1/2004 | May et al. |
| 6,698,874 B2 | | 3/2004 | Katsuki |
| 6,755,518 B2 | | 6/2004 | Codos |
| 6,785,436 B2 | | 8/2004 | Ravikanth et al. |
| 6,840,992 B2 | | 1/2005 | Glaum et al. |
| 6,879,378 B2 | | 4/2005 | Morita et al. |
| 7,119,160 B2 | | 10/2006 | Kodama et al. |
| 7,134,749 B2 | | 11/2006 | Ben Zur et al. |
| 7,275,806 B2 | | 10/2007 | Matsuzawa et al. |
| 7,338,988 B2 | | 3/2008 | Hesler et al. |
| 7,381,347 B2 | | 6/2008 | Jacobs, III et al. |
| 7,425,062 B2 | | 9/2008 | Bauer |
| 7,723,400 B2 | | 5/2010 | Kobayashi |
| 7,748,838 B2 | | 7/2010 | Oishi |
| 8,540,358 B2 | | 9/2013 | Mozel et al. |
| 8,569,397 B2 | | 10/2013 | Ohzeki |
| 8,926,080 B2 | | 1/2015 | Mozel et al. |
| 9,340,694 B2 | | 5/2016 | Oura et al. |
| 9,611,401 B2 | | 4/2017 | Mozel et al. |
| 9,611,404 B2 | | 4/2017 | Mozel et al. |
| 9,616,683 B2 | | 4/2017 | Mozel et al. |
| 10,472,533 B2 | | 11/2019 | Mozel et al. |
| 2002/0009662 A1 | | 1/2002 | Miyazaki |
| 2002/0022120 A1 | | 2/2002 | Katsuki et al. |
| 2002/0044188 A1 | | 4/2002 | Codos |
| 2002/0060728 A1 | * | 5/2002 | Koizumi ...................... D06P 5/30 347/101 |
| 2002/0197750 A1 | | 12/2002 | Tanaka et al. |
| 2003/0064206 A1 | | 4/2003 | Koyano et al. |
| 2003/0069329 A1 | | 4/2003 | Kubota |
| 2003/0117473 A1 | | 6/2003 | Smith |
| 2003/0142167 A1 | | 7/2003 | Nakamura et al. |
| 2003/0157304 A1 | | 8/2003 | Li et al. |
| 2003/0172840 A1 | | 9/2003 | Blank et al. |
| 2003/0197750 A1 | | 10/2003 | Iwatsuki et al. |
| 2003/0197772 A1 | | 10/2003 | Iwatsuki et al. |
| 2003/0205159 A1 | | 11/2003 | McNeil |
| 2004/0024083 A1 | | 2/2004 | Lee |
| 2004/0100542 A1 | | 5/2004 | Chen et al. |
| 2004/0179077 A1 | * | 9/2004 | Samii ...................... B41J 11/007 347/101 |

(56) References Cited

U.S. PATENT DOCUMENTS

| | | |
|---|---|---|
| 2004/0252173 A1 | 12/2004 | Ben-Zur et al. |
| 2005/0012798 A1 | 1/2005 | Adachi |
| 2005/0098054 A1 | 5/2005 | Berndtsson et al. |
| 2005/0174411 A1 | 8/2005 | Adachi et al. |
| 2005/0179706 A1 | 8/2005 | Childers |
| 2005/0179708 A1 | 8/2005 | Ben-Zur |
| 2005/0185004 A1 | 8/2005 | Couwenhoven et al. |
| 2005/0203245 A1 | 9/2005 | Lee et al. |
| 2005/0233097 A1 | 10/2005 | Tojo et al. |
| 2006/0249039 A1 | 11/2006 | Feldman et al. |
| 2006/0284929 A1 | 12/2006 | Matsuzawa et al. |
| 2007/0103528 A1 | 5/2007 | Pearl et al. |
| 2007/0103529 A1 | 5/2007 | Pearl et al. |
| 2007/0104899 A1 | 5/2007 | Pearl et al. |
| 2007/0148128 A1 | 6/2007 | Kennedy et al. |
| 2007/0218222 A1 | 9/2007 | Campbell et al. |
| 2007/0229577 A1 | 10/2007 | Morimoto |
| 2008/0006176 A1 | 1/2008 | Houjou |
| 2008/0012884 A1 | 1/2008 | Ben-Zur et al. |
| 2008/0095940 A1 | 4/2008 | Lee et al. |
| 2008/0108746 A1 | 5/2008 | Waki et al. |
| 2008/0241397 A1 | 10/2008 | Kato et al. |
| 2008/0241436 A1 | 10/2008 | Kobayshi |
| 2008/0268156 A1 | 10/2008 | Ueno et al. |
| 2009/0122127 A1 | 5/2009 | Baker |
| 2010/0073408 A1 | 3/2010 | Hale et al. |
| 2010/0075045 A1 | 3/2010 | Kaimoto et al. |
| 2010/0166962 A1 | 7/2010 | Ohzeki |
| 2011/0032304 A1 | 2/2011 | Mozel et al. |
| 2011/0079716 A1 | 4/2011 | Ganapathiappan et al. |
| 2011/0169901 A1 | 7/2011 | Pinto et al. |
| 2011/0290127 A1 | 12/2011 | Biel et al. |
| 2012/0081477 A1 | 4/2012 | Nagano |
| 2012/0128949 A1 | 5/2012 | Goto |
| 2012/0251795 A1 | 10/2012 | Okada et al. |
| 2013/0155162 A1 | 6/2013 | Ohtsuka |
| 2014/0036014 A1 | 2/2014 | Mozel et al. |
| 2014/0192112 A1 | 7/2014 | Nagashima et al. |
| 2015/0077488 A1 | 3/2015 | Mozel et al. |
| 2015/0152274 A1 | 6/2015 | Pearl et al. |
| 2015/0284905 A1 | 10/2015 | Mozel |
| 2016/0176201 A1 | 1/2016 | Kitagawa et al. |
| 2016/0057314 A1 | 2/2016 | Morovic et al. |
| 2016/0060810 A1 | 3/2016 | Saito et al. |
| 2017/0145239 A1 | 5/2017 | Mozel et al. |
| 2019/0281191 A1 | 9/2019 | Morovic et al. |
| 2019/0382608 A1 | 12/2019 | Mozel et al. |
| 2020/0140708 A1 | 5/2020 | Shimoni et al. |
| 2020/0157371 A1 | 5/2020 | Mozel et al. |
| 2021/0284859 A1 | 9/2021 | Mozel et al. |
| 2021/0380829 A1 | 12/2021 | Shimoni et al. |

FOREIGN PATENT DOCUMENTS

| | | | |
|---|---|---|---|
| CN | 1890111 | 1/2007 | |
| DE | 3121043 | 3/1982 | |
| EP | 0121083 | 10/1984 | |
| EP | 0277361 | 8/1988 | |
| EP | 709519 | 3/1996 | |
| EP | 1247890 | 10/2002 | |
| EP | 1281533 | 2/2003 | |
| EP | 1652895 | 5/2006 | |
| EP | 1853431 | 11/2007 | |
| EP | 2166046 | 3/2010 | |
| EP | 2405055 | 1/2012 | |
| EP | 3184692 | 6/2017 | |
| GB | 422488 | 1/1935 | |
| IL | 162231 | 5/2007 | |
| JP | 59-187029 | 10/1984 | |
| JP | 61-075870 | 4/1986 | |
| JP | 63-031593 | 6/1988 | |
| JP | 05-293954 | 11/1993 | |
| JP | H0790780 A | * 4/1995 | ............ B41J 3/4078 |
| JP | 08-232176 | 9/1996 | |
| JP | 61-231285 | 10/1996 | |
| JP | 09-039365 | 2/1997 | |
| JP | 10-278379 | 10/1998 | |
| JP | 10-330661 | 12/1998 | |
| JP | 11-138768 | 5/1999 | |
| JP | 2000-103995 | 4/2000 | |
| JP | 2002-036644 | 2/2002 | |
| JP | 2002-332437 | 11/2002 | |
| JP | 2003-160455 | 3/2003 | |
| JP | 2003-312069 | 11/2003 | |
| JP | 2004-532750 | 10/2004 | |
| JP | 2005-320663 | 11/2005 | |
| JP | 2006-124843 | 5/2006 | |
| JP | 2006-124854 | 5/2006 | |
| JP | 2006-199498 | 8/2006 | |
| JP | 2006-256163 | 9/2006 | |
| JP | 2008-018664 | 1/2008 | |
| JP | 2009-061645 | 3/2009 | |
| JP | 2009-285877 | 12/2009 | |
| JP | 2010-053357 | 3/2010 | |
| JP | 2012-008254 | 1/2012 | |
| JP | 2013-227414 | 11/2013 | |
| JP | 2014-173017 | 9/2014 | |
| JP | 2017-171907 | 9/2017 | |
| WO | 98/30749 | 7/1998 | |
| WO | 99/56948 | 11/1999 | |
| WO | 00/73570 | 12/2000 | |
| WO | 01/17792 | 3/2001 | |
| WO | 01/32974 | 5/2001 | |
| WO | 01/49504 | 7/2001 | |
| WO | 02/066565 | 8/2002 | |
| WO | 02/078958 | 10/2002 | |
| WO | 03057787 | 7/2003 | |
| WO | 2005/076730 | 8/2005 | |
| WO | 2005/106109 | 11/2005 | |
| WO | 2005/115089 | 12/2005 | |
| WO | 2005/115761 | 12/2005 | |
| WO | 2011018786 | 2/2011 | |
| WO | 2011/055639 | 5/2011 | |
| WO | 2011/078068 | 6/2011 | |
| WO | 2013/046884 | 4/2013 | |
| WO | 2015152291 | 10/2015 | |
| WO | 2016/027835 | 2/2016 | |
| WO | 2017/109786 | 6/2017 | |
| WO | 2017109786 | 6/2017 | |
| WO | 201807834 | 5/2018 | |
| WO | 2019077603 | 4/2019 | |
| WO | 2019077615 | 4/2019 | |
| WO | 2020/027842 | 2/2020 | |
| WO | 2022/024109 | 2/2022 | |

OTHER PUBLICATIONS

Supplementary European Search Report and the European Search Opinion dated Jun. 24, 2020 From the European Patent Office Re. Application No. 17865042.0. (13 Pages).

Interview Summary dated Dec. 7, 2020 from the US Patent and Trademark Office Re. U.S. Appl. No. 14/619,218. (3 pages).

Official Action dated Dec. 4, 2020 From the US Patent and Trademark Office Re. U.S. Appl. No. 16/774,073. (99 Pages).

Geckeler et al. "Carbon Nanotubes: Are They Dispersed or Dissolved in Liquids?" Nanosclae Research Letters 6:136, 3 pages, 2011.

Official Action dated Sep. 24, 2020 from the US Patent and Trademark Office Re. U.S. Appl. No. 14/619,218. (20 pages).

Advisory Action dated May 21, 2020 from the US Patent and Trademark Office Re. U.S. Appl. No. 14/619,218. (4 pages).

International Preliminary Report on Patentability dated May 7, 2020 From the International Bureau of WIPO Re. Application No. PCT/IL2018/051128. (8 Pages).

International Preliminary Report on Patentability dated Apr. 30, 2020 From the International Bureau of WIPO Re. Application No. PCT/IL2018/051107. (6 Pages).

Official Action dated May 29, 2020 from the US Patent and Trademark Office Re. U.S. Appl. No. 16/774,073. (16 pages).

Provision of the Minutes in Accordance With Rule 124(4) EPC dated Nov. 5, 2018 From the European Patent Office Re. Application No. 05745218.7. (22 Pages).

(56) References Cited

OTHER PUBLICATIONS

Communication Pursuant to Article 94(3) EPC dated Aug. 21, 2017 From the European Patent Office Re. Application No. 05745218.7. (3 Pages).
Communication Pursuant to Article 94(3) EPC dated Oct. 17, 2017 From the European Patent Office Re. Application No. 10754998.2. (3 Pages).
Advisory Action Before the Filing of An Appeal Brief dated Apr. 18, 2019 From the US Patent and Trademark Office Re. U.S. Appl. No. 14/619,218. (4 pages).
Applicant-Initiated Interview Summary dated Aug. 8, 2018 From the US Patent and Trademark Office Re. U.S. Appl. No. 14/619,218. (3 pages).
Official Action dated May 17, 2018 From the US Patent and Trademark Office Re. U.S. Appl. No. 14/619,218. (21 pages).
Official Action dated Jan. 30, 2019 From the US Patent and Trademark Office Re. U.S. Appl. No. 14/619,218. (24 pages).
Official Action dated Sep. 30, 2019 From the US Patent and Trademark Office Re. U.S. Appl. No. 14/619,218. (17 Pages).
Advisory Action Before the Filing of An Appeal Brief dated Dec. 29, 2017 From the US Patent and Trademark Office Re. U.S. Appl. No. 14/619,218. (6 pages).
Official Action dated Jul. 1, 2016 From the US Patent and Trademark Office Re. U.S. Appl. No. 14/619,218.
Official Action dated Dec. 4, 2015 From the US Patent and Trademark Office Re. U.S. Appl. No. 14/619,218.
Official Action dated Feb. 23, 2017 From the US Patent and Trademark Office Re. U.S. Appl. No. 14/619,218. (16 pages).
Official Action dated Aug. 30, 2017 From the US Patent and Trademark Office Re. U.S. Appl. No. 14/619,218. (19 pages).
International Search Report and the Written Opinion dated Jan. 18, 2018 From the International Searching Authority Re. Application No. PCT/IL2017/051181. (16 Pages).
Restriction Official Action dated Oct. 24, 2019 From the US Patent and Trademark Office Re. Application No. 16/558,356. (8 pages).
Official Action dated Nov. 30, 2018 From the US Patent and Trademark Office Re. U.S. Appl. No. 15/424,943. (56 pages).
International Search Report and the Written Opinion dated Dec. 25, 2018 From the International Searching Authority Re. Application No. PCTIIL2018/051128. (14 Pages).
International Preliminary Report on Patentability dated May 9, 2019 From the International Bureau ofWIPO Re. Application No. PCT/IL2017/051181. (7 Pages).
Official Action dated Apr. 9, 2019 From the US Patent and Trademark Office Re. U.S. Appl. No. 15/424,943. (16 Pages).
Summons to Attend Oral Proceedings Pursuant to Rule 115(1) EPC dated Jan. 30, 2018 From the European Patent Office Re. Application No. 05745218.7. (7 Pages).
Communication Pursuant to Article 94(3) EPC dated Feb. 14, 2018 From the European Patent Office Re. Application No. 10754998.2. (5 Pages).
Riesen et al. "The Glass Transition Temperature Measured by Different TA Techniques. Part 2: Determination of Glass Transition Temperatures", Mettler Toledo, UserCom, XP007918757, p. 1-20, Feb. 2003.
Official Action dated Apr. 9, 2018 From the US Patent and Trademark Office Re. U.S. Appl. No. 111606,242. (16 pages).
International Search Report and the Written Opinion dated Jan. 8, 2019 From the International Searching Authority Re. Application No. PCT/IL2018/051107. (9 Pages).
Official Action dated Nov. 27, 2019 From the US Patent and Trademark Office Re. U.S. Appl. No. 16/558,356. (22 pages).
Acknowledgment of Request for Notice of Allowance dated Jun. 18, 2013 From the US Patent and Trademark Office Re. U.S. Appl. No. 12/853,389.
Advisory Action dated May 27, 2014 From the US Patent and Trademark Office Re. U.S. Appl. No. 13/206,646.
Applicant-Initiated Interview Summary dated Oct. 9, 2013 From the US Patent and Trademark Office Re. U.S. Appl. No. 12/853,361.
Applicant-Initiated Interview Summary dated Feb. 13, 2014 From the US Patent and Trademark Office Re. U.S. Appl. No. 11/606,242.
Communication Pursuant to Article 94(3) EPC dated Oct. 10, 2014 From the European Patent Office Re. Application No. 10754998.2.
Communication Pursuant to Article 94(3) EPC dated Nov. 12, 2009 From the European Patent Office Re.: Application No. 05703208.8.
International Preliminary Report on Patentability dated Dec. 14, 2006 From the International Bureau ofWIPO Re.: Application No. PCT/il/2005/000558.
International Preliminary Report on Patentability dated Jul. 17, 2007 From the International Preliminary Examining Authority Re.: Application No. PCTIIL05/00166.
International Preliminary Report on Patentability dated Feb. 23, 2012 From the International Bureau ofWIPO Re. Application No. PCTIIL2010/000645.
International Preliminary Report on Patentability dated Nov. 26, 2007 From the International Preliminary Examining Authority Re.: Application No. PCT IIL05/00559.
International Preliminary Report on Patentabillity dated Feb. 8, 2007 From the International Preliminary Examining Authority Re.: Application No. PCTIIL05/00166.
International Preliminary Report on Patentabillity dated Nov. 29, 2011 From the International Preliminary Examining Authority Re.: Application No. PCTIIL05/00166.
International Search Report and the Written Opinion dated Dec. 21, 2010 From the International Searching Authority Re. Application No. PCT IIL20 10/000645.
International Search Report dated Jan. 4, 2006 From the International Searching Authority Re.: Application No. PCT/IL05/00559.
International Search Report dated Jan. 9, 2007 From the International Searching Authority Re.: Application No. PCT/IL05/00166.
International Search Report dated Sep. 19, 2006 From the International Searching Authmity Re.: Application No. PCT/IL0500558.
Office Action dated Jul. 3, 2006 From the Israeli Patent Office Re.: Application No. 162231 and Its Translation Into English.
Office Action dated Dec. 7, 2010 From the Israel Patent Office Re. Application No. 179765 and Its Translation Into English.
Office Action dated Aug. 18, 2010 From the Israeli Patent Office Re.: Application No. 163459 and Its Translation Into English.
Office Action dated Feb. 21, 2006 From the Israeli Patent Office Re.: Application No. 162231 and Its Translation Into English.
Office Action dated Mar. 24, 2011 From the Israeli Patent Office Re.: Application No. 177323 and Its Translation Into English.
Office Action dated Aug. 26, 2009 From the Israeli Patent Office Re.: Application No. 177323 and Its Translation Into English.
Office Action dated Jul. 28, 2010 From the Israeli Patent Office Re.: Application No. 177323 and Its Translation Into English.
Official Action dated Dec. 6, 2010 From the US Patent and Trademark Office Re.: U.S. Appl. No. 10/589,234.
Official Action dated May 7, 2009 From the US Patent and Trademark Office Re.: U.S. Appl. No. 11/588,277.
Official Action dated Sep. 7, 2010 From the US Patent and Trademark Office Re.: U.S. Appl. No. 10/589,234.
Official Action dated Feb. 8, 2011 From the US Patent and Trademark Office Re.: U.S. Appl. No. 11/606,242.
Official Action dated Mar. 10, 2006 From the US Patent and Trademark Office Re.: U.S. Appl. No. 10/461,414.
Official Action dated Jun. 11, 2014 From the US Patent and Trademark Office Re. U.S. Appl. No. 12/853,361.
Official Action dated May 11, 2007 From the US Patent and Trademark Office Re.: U.S. Appl. No. 10/776,163.
Official Action dated Jul. 12, 2013 From the US Patent and Trademark Office Re. U.S. Appl. No. 11/606,242.
Official Action dated Mar. 12, 2012 From the US Patent and Trademark Office Re. U.S. Appl. No. 12/853,369.
Official Action dated May 14, 2009 From the US Patent and Trademark Office Re.: U.S. Appl. No. 11/606,242.
Official Action dated May 14, 2012 From the US Patent and Trademark Office Re. U.S. Appl. No. 12/853,361.
Official Action dated Jan. 15, 2013 From the US Patent and Trademark Office Re. U.S. Appl. No. 12/853,361.
Official Action dated Nov. 15, 2013 From the US Patent and Trademark Office Re. U.S. Appl. No. 12/853,361.

(56) References Cited

OTHER PUBLICATIONS

Official Action dated Jul. 17, 2008 From the US Patent and Trademark Office Re.: U.S. Appl. No. 11/606,154.
Official Action dated Jul. 18, 2014 From the US Patent and Trademark Office Re. U.S. Appl. No. 11/606,242.
Official Action dated Jun. 18, 2013 From the US Patent and Trademark Office Re. U.S. Appl. No. 12/853,361.
Official Action dated Feb. 19, 2014 From the US Patent and Trademark Office Re. U.S. Appl. No. 13/206,646.
Official Action dated Nov. 19, 2007 From the US Patent and Trademark Office Re.: U.S. Appl. No. 10/776,163.
Official Action dated Oct. 19, 2010 From US Patent and Trademark Office Re.: U.S. Appl. No. 90/009,646.
Official Action dated Aug. 20, 2008 From the US Patent and Trademark Office Re.: U.S. Appl. No. 10/776,163.
Official Action dated Dec. 20, 2012 From the US Patent and Trademark Office Re. U.S. Appl. No. 12/853,389.
Official Action dated Aug. 21, 2012 From the US Patent and Trademark Office Re. U.S. Appl. No. 12/853,361.
Official Action dated Apr. 22, 2010 From the US Patent and Trademark Office Re.: U.S. Appl. No. 90/009,646.
Official Action dated Aug. 23, 2011 From the US Patent and Trademark Office Re.: U.S. Appl. No. 11/606,242.
Official Action dated May 23, 2012 From the US Patent and Trademark Office Re. U.S. Appl. No. 11/606,242.
Official Action dated Jan. 25, 2007 From the US Patent and Trademark Office Re.: U.S. Appl. No. 10/776,163.
Official Action dated Feb. 26, 2009 From the United States Patent and Trademark Office Re.: U.S. Appl. No. 10/776,163.
Interview Summary dated Oct. 27, 2020 from the US Patent and Trademark Office Re. U.S. Appl. No. 16/341,069. (3 pages).
Official Action dated Aug. 7, 2020 from the US Patent and Trademark Office in U.S. Appl. No. 16/341,069. (58 pages).
Final Official Action dated Feb. 8, 2021 From the US Patent and Trademark Office Re. U.S. Appl. No. 16/341,069. (18 Pages).
Interview Summary dated Jan. 14, 2021 from the US Patent and Trademark Office Re. U.S. Appl. No. 16/774,073. (2 pages).
Official Action dated Mar. 19, 2021 From the US Patent and Trademark Office Re. U.S. Appl. No. 14/619,218. (24 Pages).
Notice of Reason(s) for Rejection dated Mar. 12, 2021 From the Japan Patent Office Re. Application No. 2019-523628 and Its Translation Into English. (13 Pages).
Communication of the Board of Appeal Pursuant to Article 15(1) of the Rules of Procedure of the Boards of Appeal dated Mar. 24, 2021 From the Boards of Appeal of The European Patent Office Re. Application No. 05745218.7. (12 Pages).
Advisory Action dated Dec. 30, 2021 from US Patent and Trademark Office Re. U.S. Appl. No. 14/619,218. (10 pages).
Communication Pursuant to Article 94(3) EPC dated Jul. 26, 2021 From the European Patent Office Re. Application No. 05745218.7. (4 Pages).
English Summary dated May 30, 2022 of Notification of Office Action and Search Report dated May 11, 2022 From the State Intellectual Property Office of the People's Republic of China Re. Application No. 201780069685.7. (2 Pages).
English Translation dated Feb. 18, 2022 of Notification of Office Action and Search Report dated Jan. 17, 2022 From the State Intellectual Property Office of the People's Republic of China Re. Application No. 2017-80069685.7. (5 Pages).
Examination Report dated Jul. 7, 2021 From the Servico Publico Federal, Ministerio da Economia, Instituto Nacional da Propriedade Industrial do Brasil RE Application No. BR1120190088628. (4 Pages).
Examination Report Under Sections 12 & 13 of the Patents Act, 1970 and the Patents Rules, 2003 dated Dec. 17, 2021 From the Government of India, Intellectual Property India, Patents, Designs, Trade Marks, Geographical Indications, The Patent Office Re. Application No. 201927020694. (5 Pages).
Final Official Action dated Aug. 11, 2021 from the US Patent and Trademark Office Re. U.S. Appl. No. 14/619,218. (16 pages).
International Search Report and the Written Opinion dated Oct. 26, 2021 From the International Searching Authority Re. Application No. PCT/IL2021/050893 (12 Pages).
Notice of Reason(s) for Rejection dated Oct. 22, 2021 From the Japan Patent Office Re. Application No. 2019-523628 and Its Translation Into English. (9 Pages).
Notification of Office Action and Search Report dated Aug. 10, 2021 From the State Intellectual Property Office of the People's Republic of China Re. Application No. 1220200219335 and Its Translation of Office Action Into English. (8 Pages).
Notification of Office Action and Search Report dated May 11, 2022 From the State Intellectual Property Office of the People's Republic of China Re. Application No. 201780069685.7. (6 Pages).
Notification of Office Action and Search Report dated Mar. 16, 2022 From the State Intellectual Property Office of the People's Republic of China Re. Application No. 201880078383.0. (6 Pages).
Notification of Office Action and Search Report dated Jan. 17, 2022 From the State Intellectual Property Office of the People's Republic of China Re. Application No. 2017-80069685.7. (12 Pages).
Supplementary European Search Report and the European Search Opinion dated Jul. 12, 2021 From the European Patent Office Re. Application No. 18867552.4. (15 Pages).
Supplementary European Search Report and the European Search Opinion dated Sep. 14, 2021 From the European Patent Office Re. Application No. 18868124.1. (9 Pages).
Translation Dated Aug. 25, 2021 of Examination Report dated Jul. 7, 2021 From the Servico Publico Federal, Ministerio da Economia, Instituto Nacional da Propriedade Industrial do Brasil RE Application No. BR112013014918.3. (4 Pages).
Decision of Rejection dated May 17, 2022 From the Japan Patent Office Re. Application No. 2019-523628. (1 Page).

\* cited by examiner

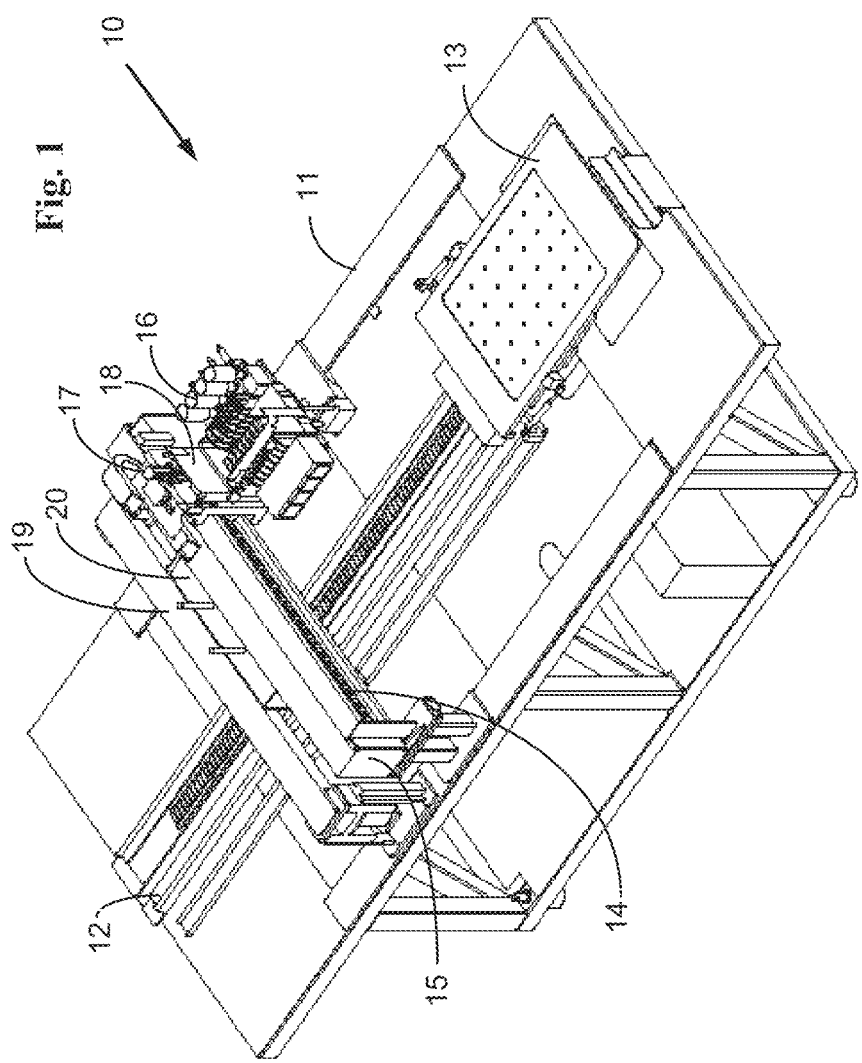

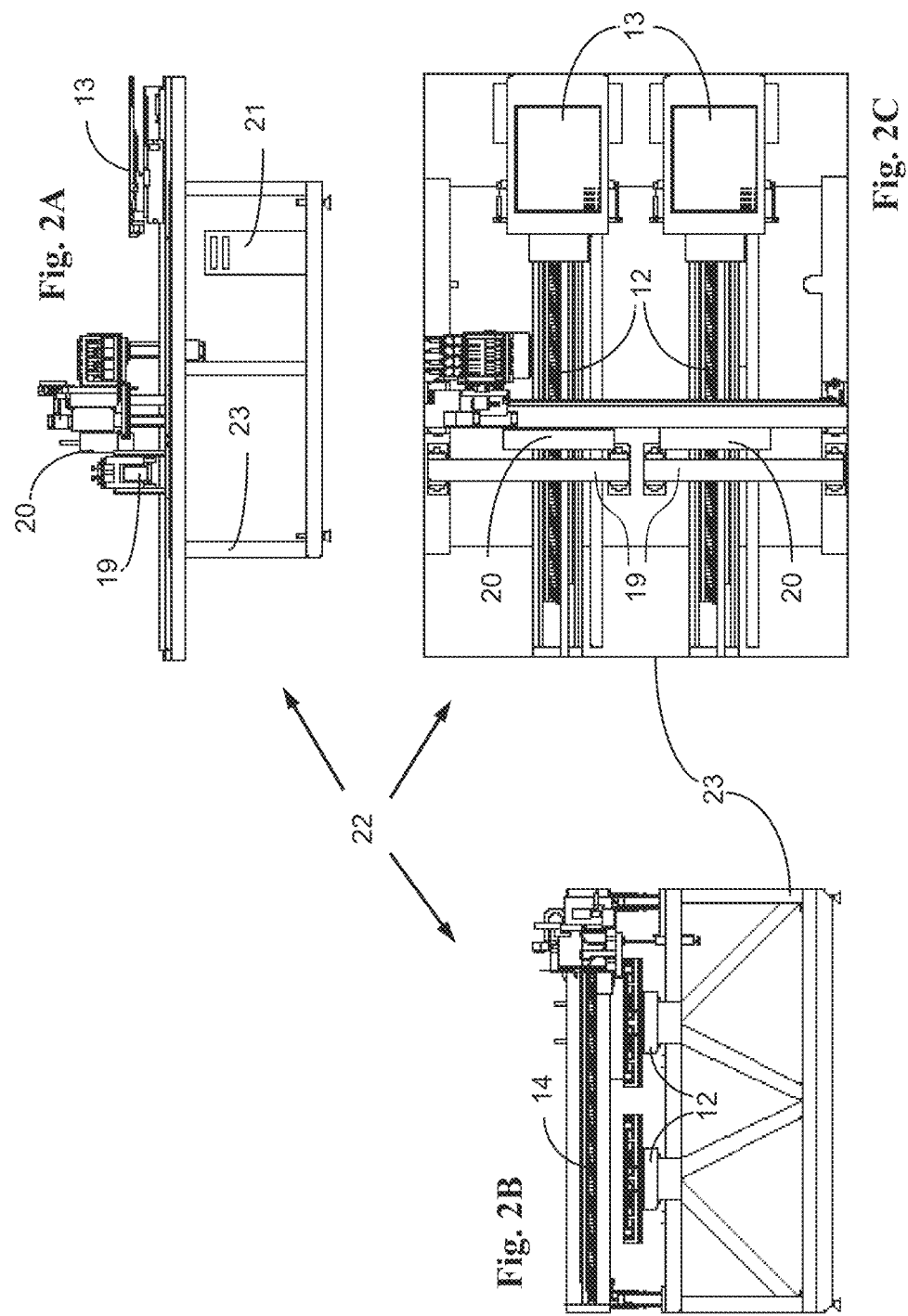

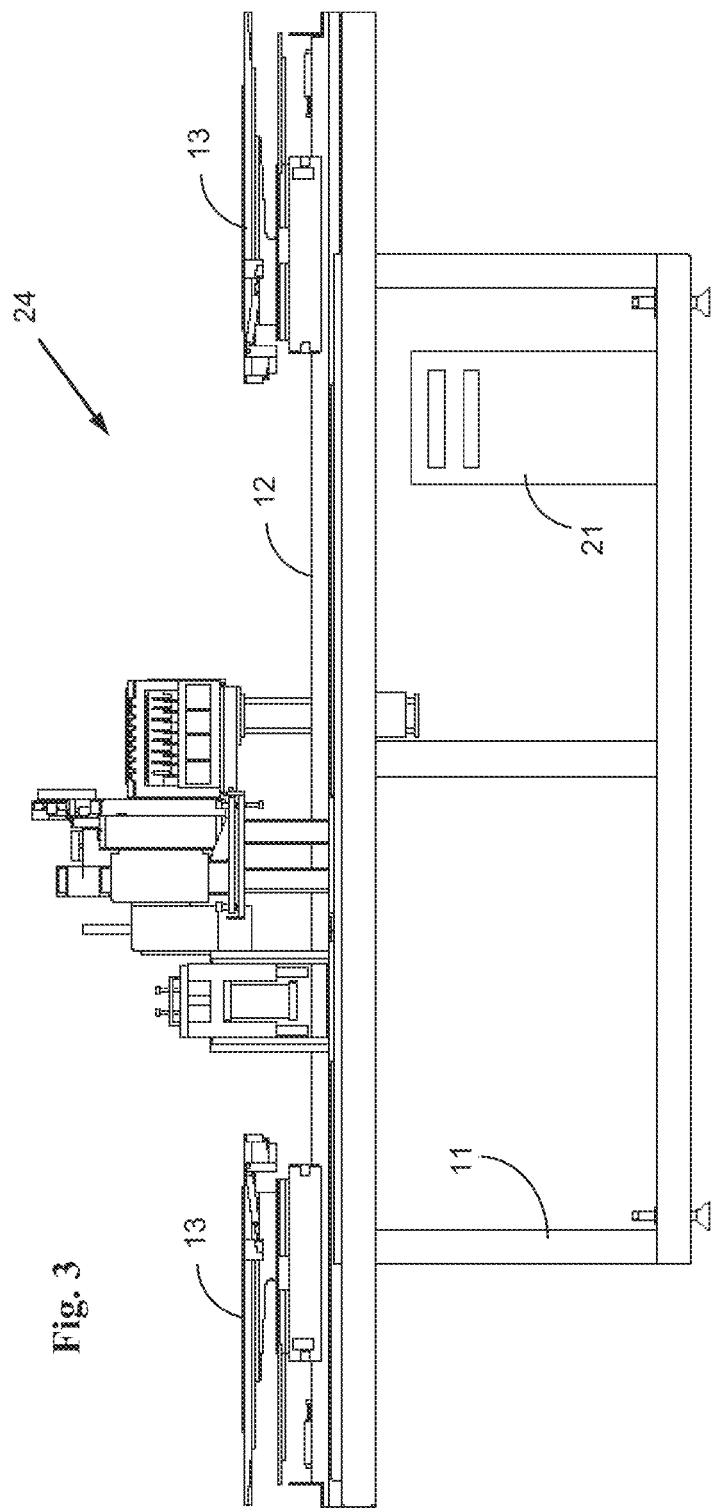

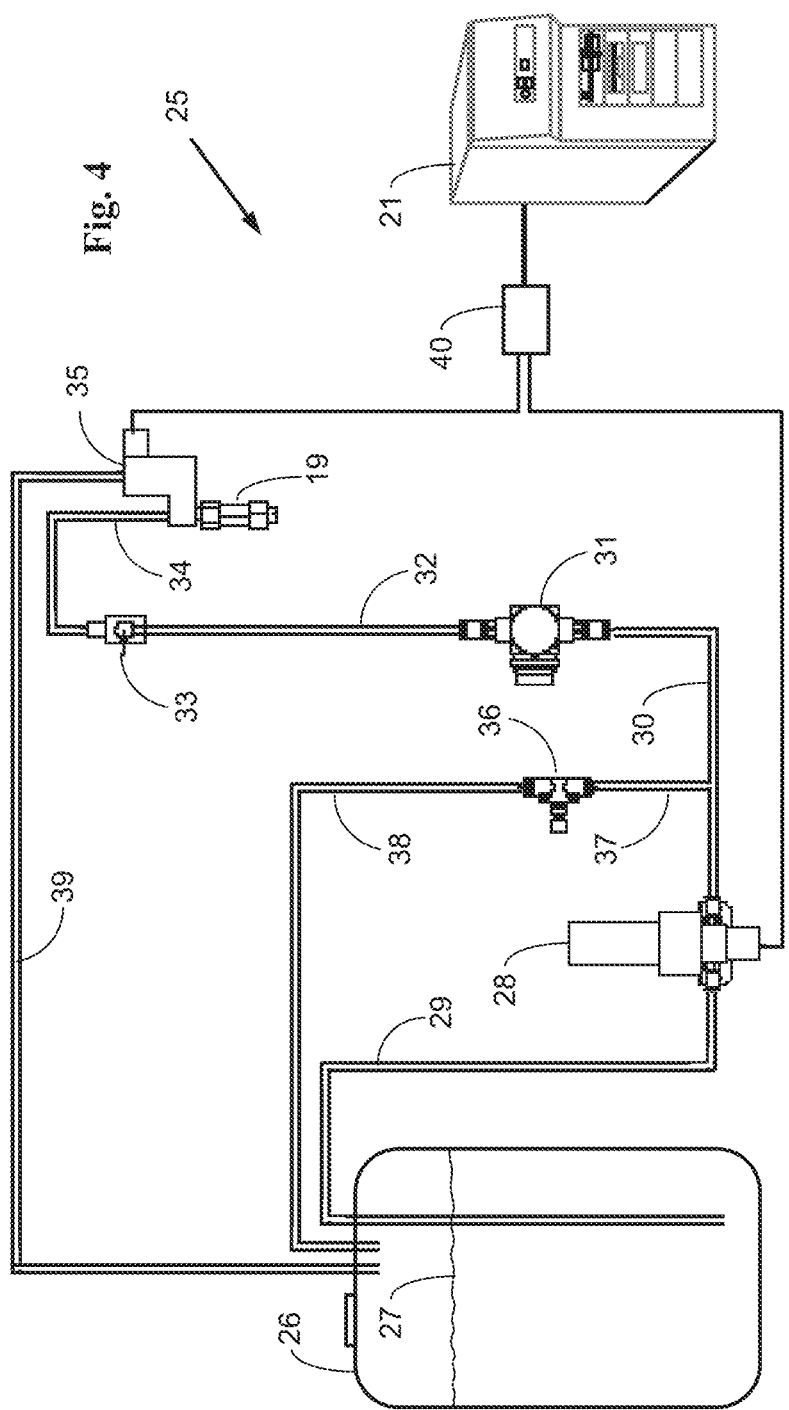

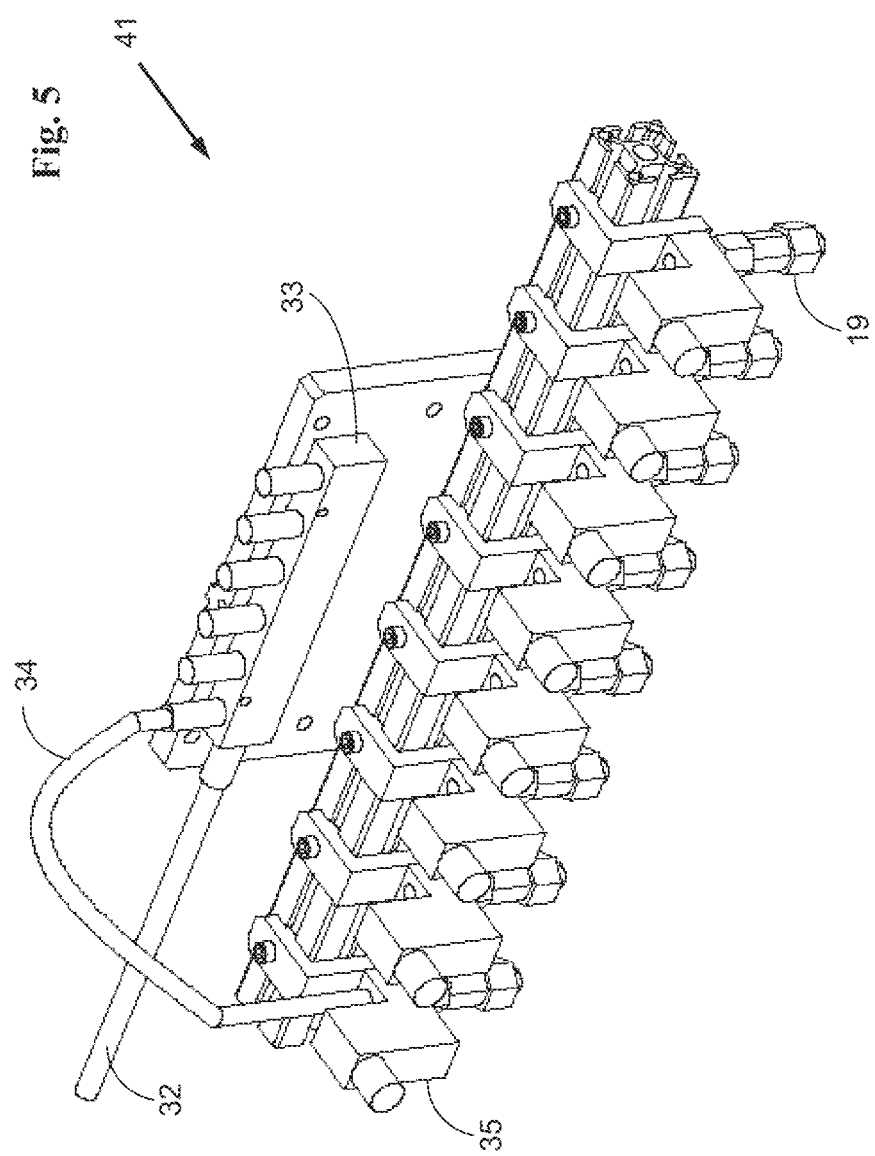

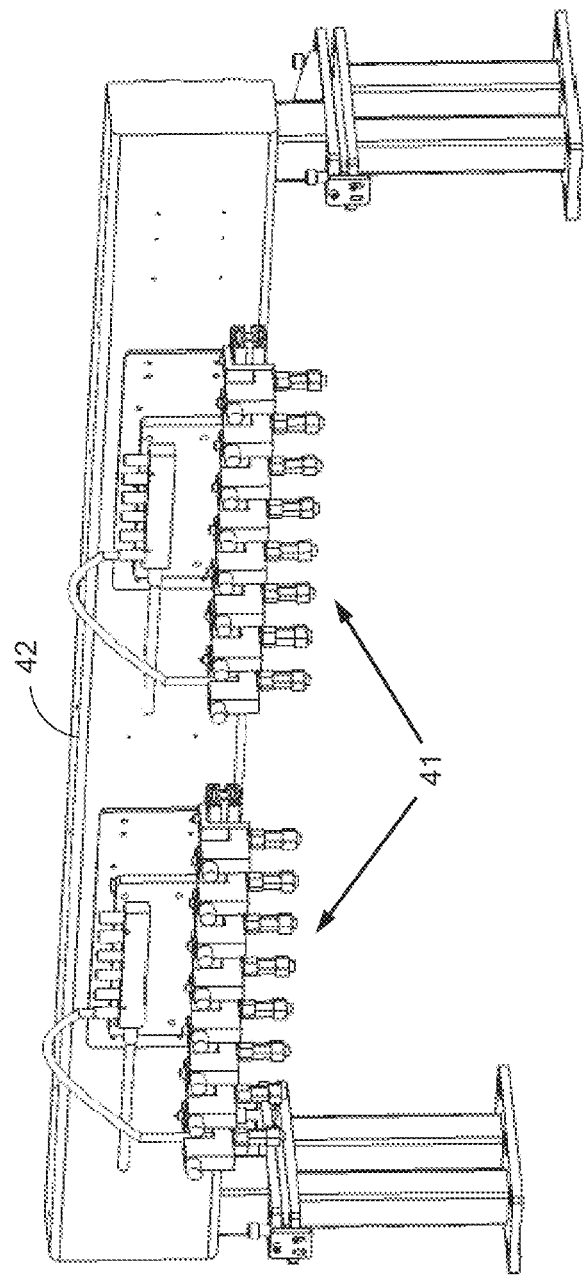

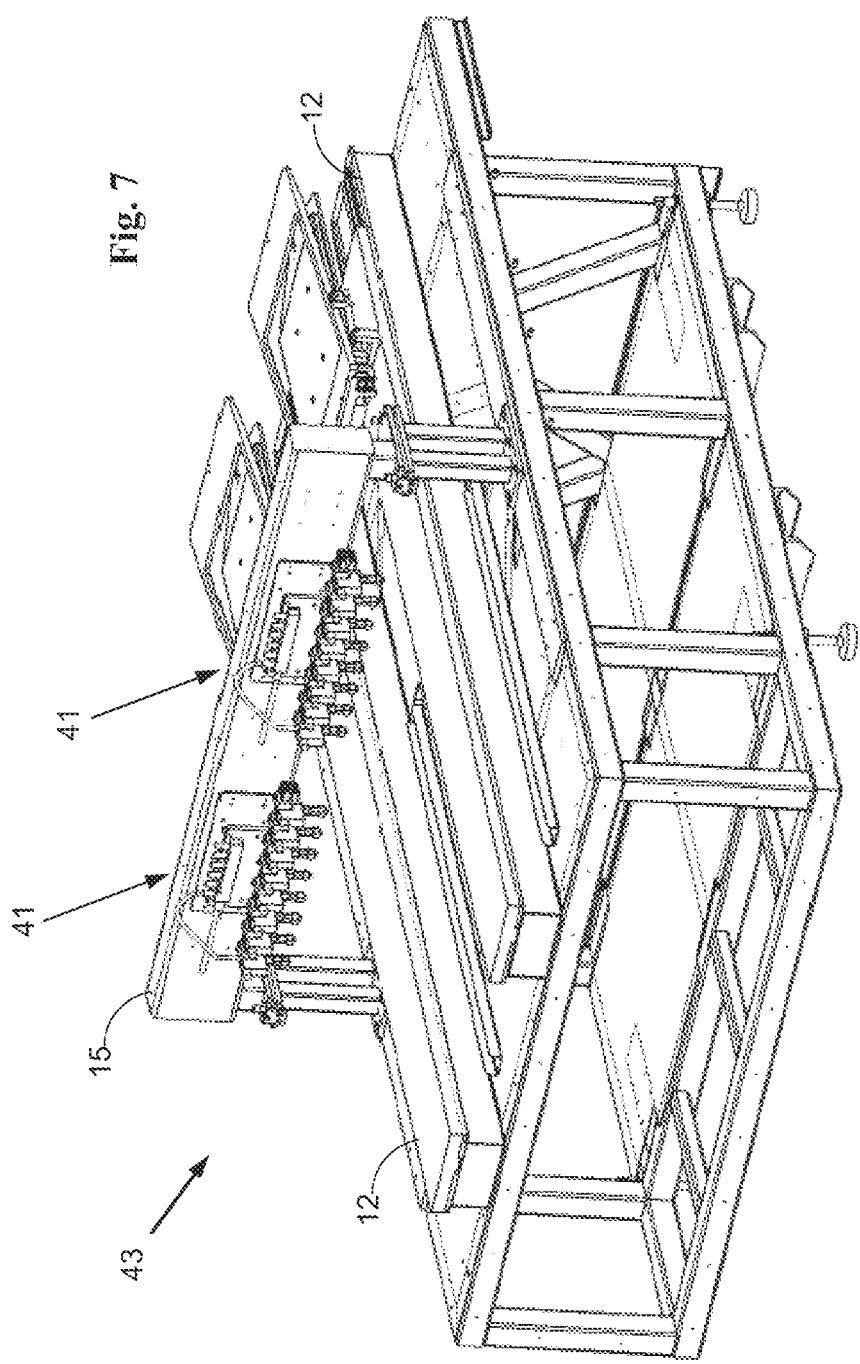

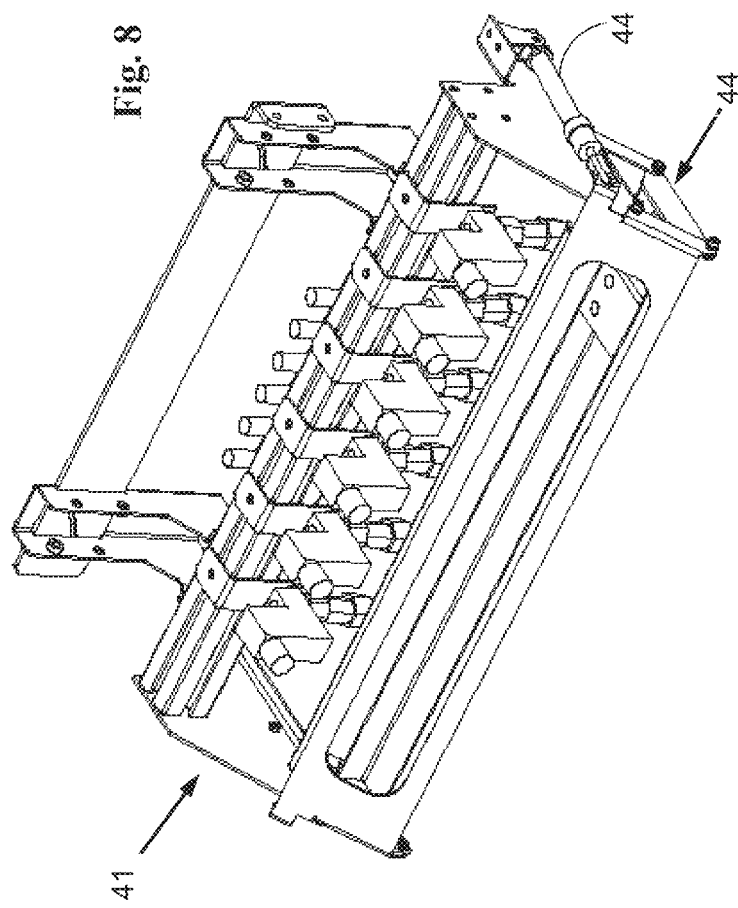

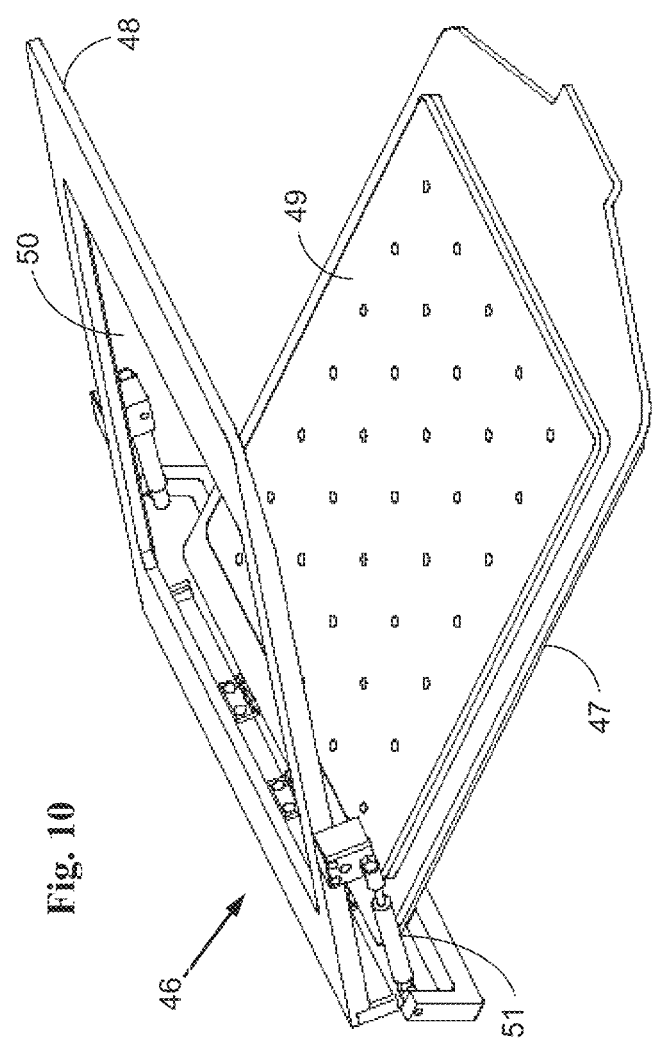

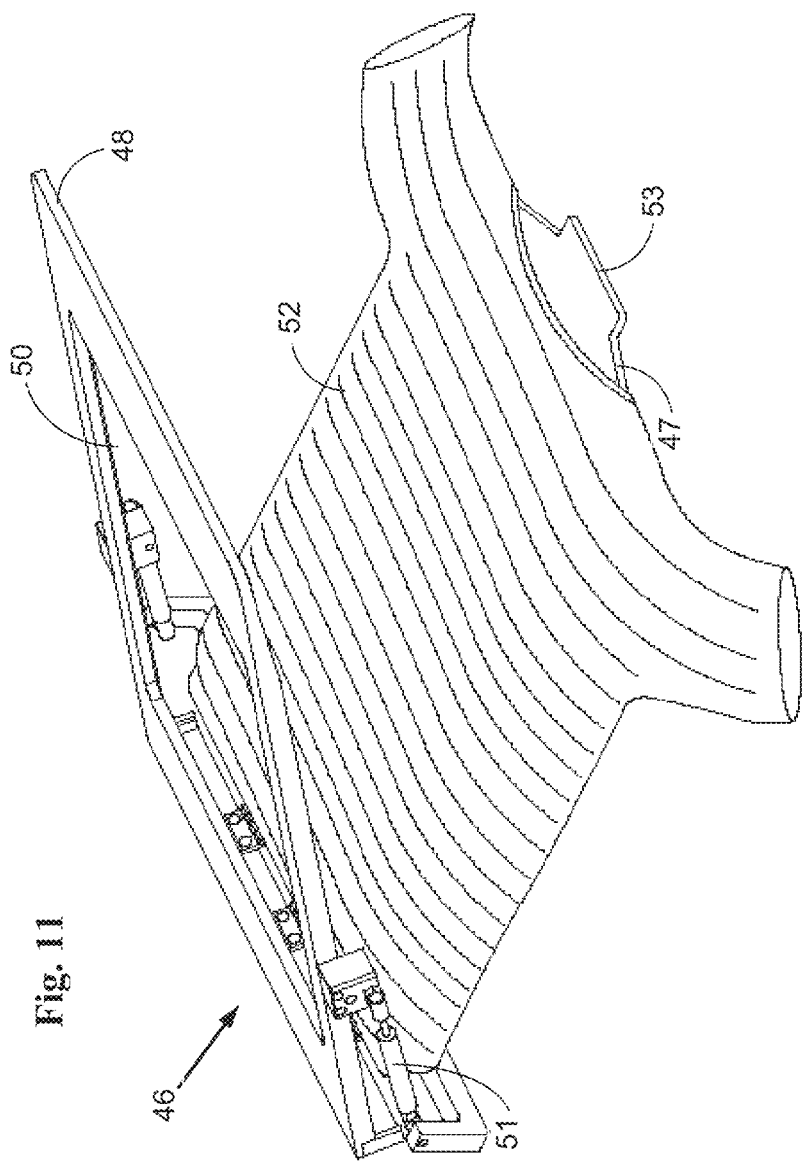

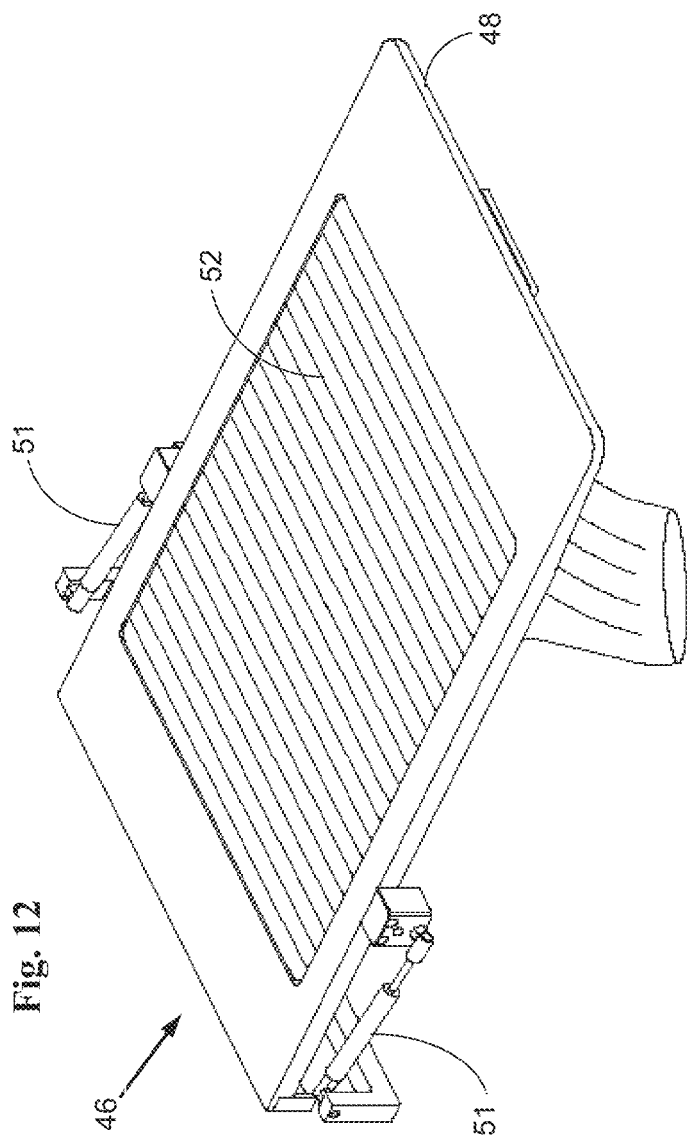

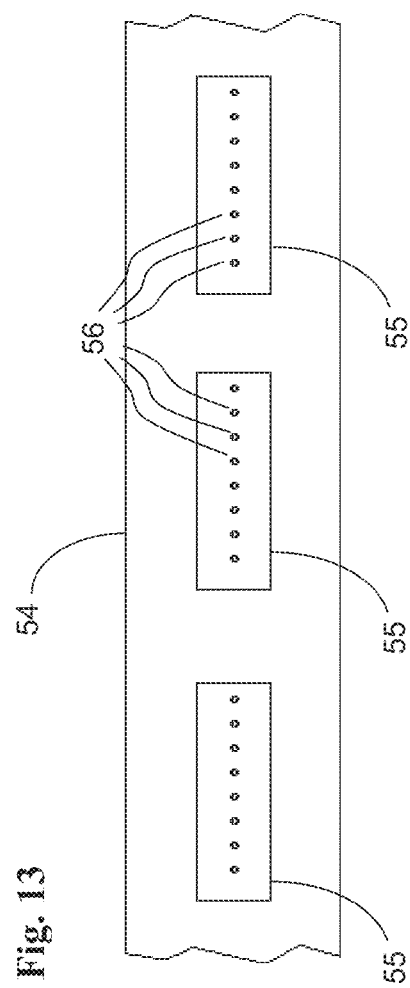

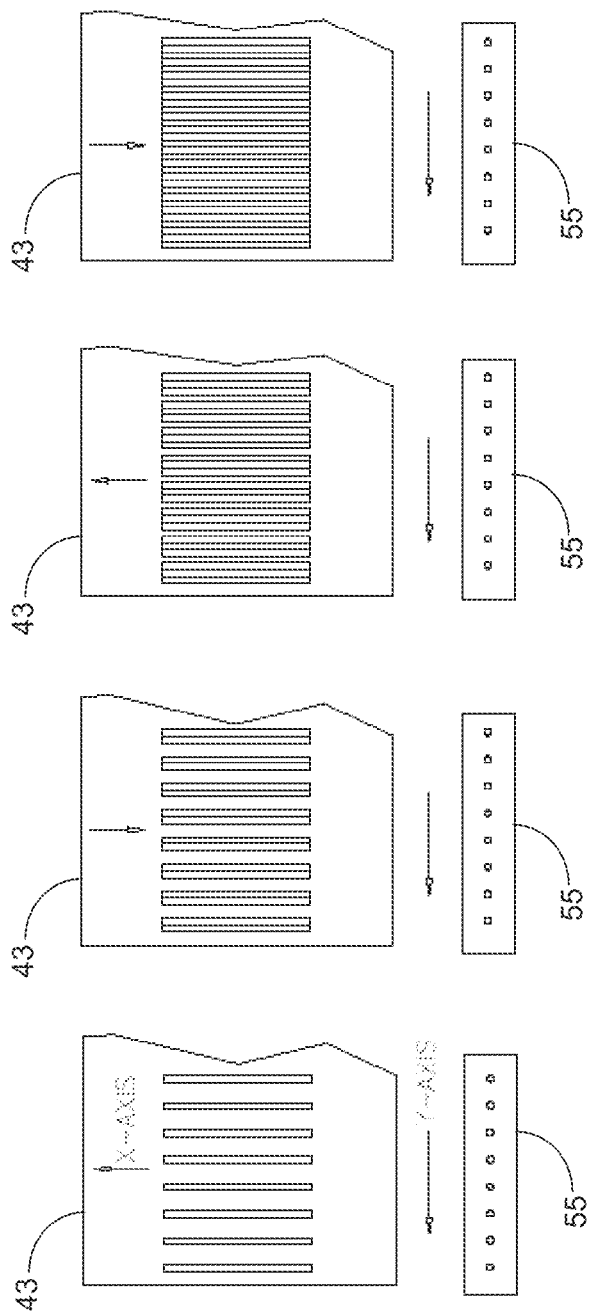
Figs. 14a-d

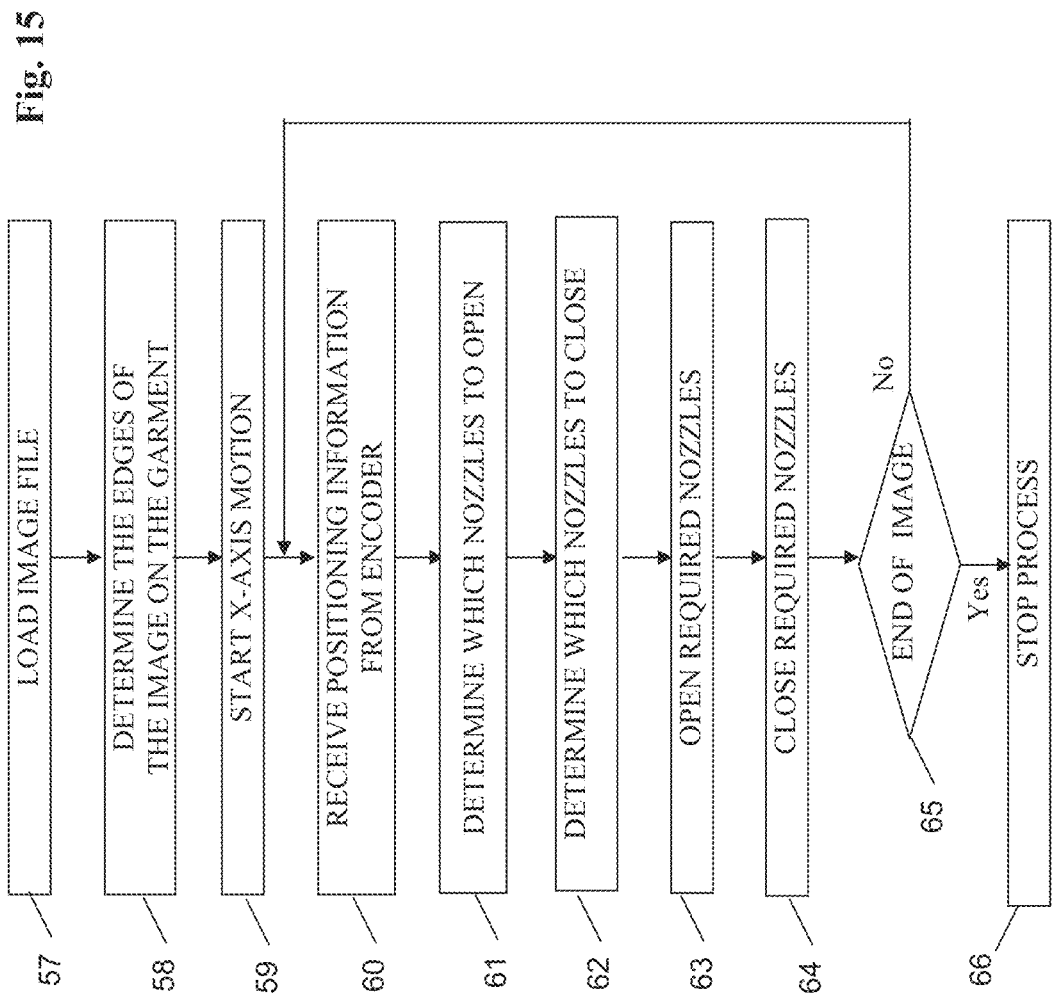

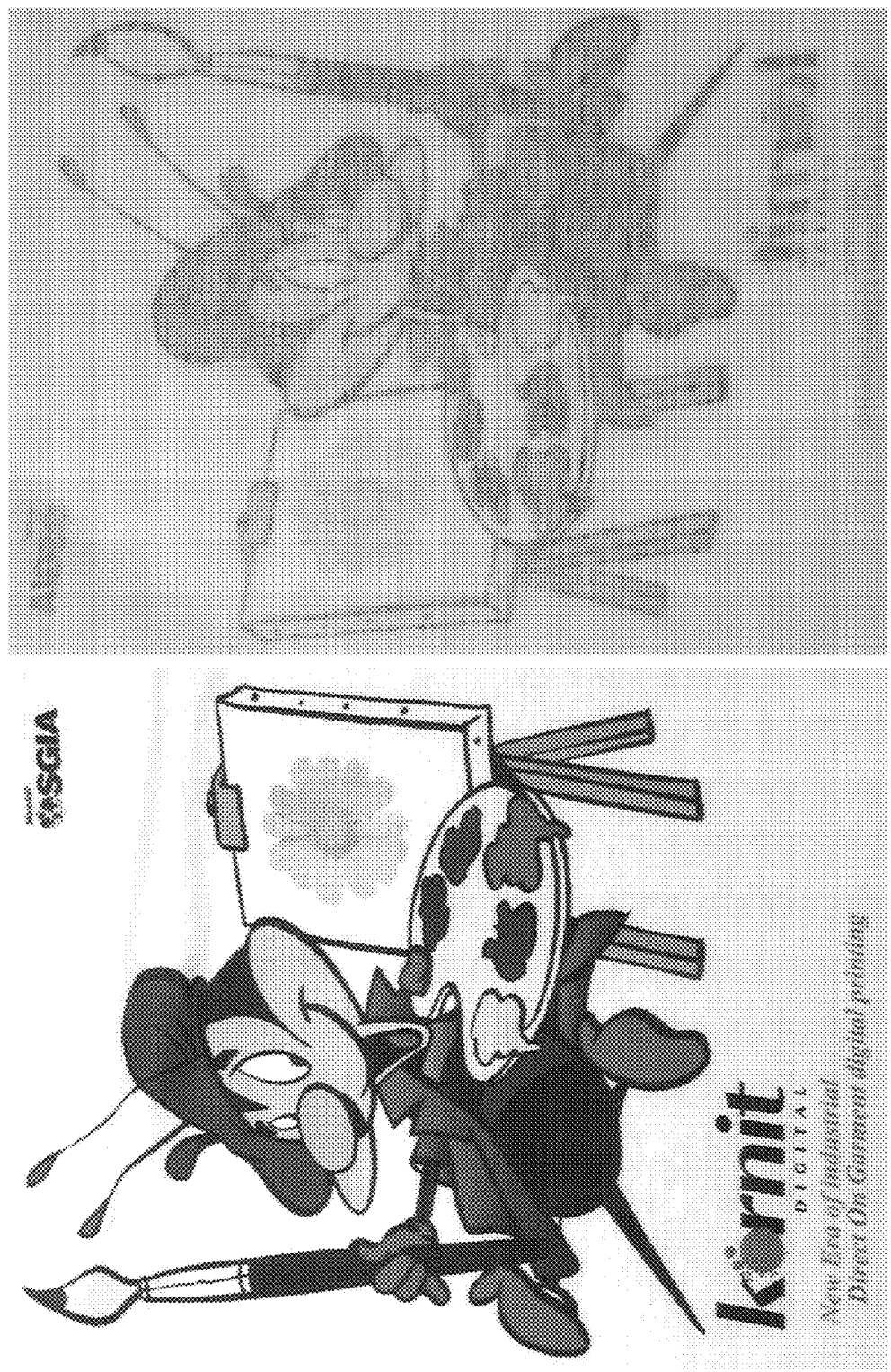

PROCESS AND SYSTEM FOR PRINTING IMAGES ON ABSORPTIVE SURFACES

CROSS REFERENCE TO RELATED APPLICATIONS

This application is a continuation of U.S. patent application Ser. No. 14/619,218, filed Feb. 11, 2015, which is a continuation-in-part of U.S. patent application Ser. No. 11/606,242 filed Nov. 30, 2006, now abandoned, which is a continuation-in-part of PCT Patent Application Nos. PCT/IL2005/000558 and PCT/IL2005/000559 both filed May 30, 2005, which are both continuation-in-part applications of PCT Patent Application No. PCT/IL2005/000166 filed Feb. 10, 2005.

PCT Patent Application Nos. PCT/IL2005/000558 and PCT/IL2005/000559 also claim the benefit of priority of U.S. Provisional Patent Application No. 60/651,230 filed Feb. 10, 2005, and Israel Patent Application Nos. 163459 filed Aug. 11, 2004, now abandoned, and 162231 filed May 30, 2004.

U.S. patent application Ser. No. 11/606,242 also claims the benefit of priority of U.S. Provisional Patent Application No. 60/759,955 filed Jan. 19, 2006.

U.S. patent application Ser. No. 11/606,242 is also a continuation-in-part of U.S. patent application Ser. No. 11/588,277 filed Oct. 27, 2006, now abandoned, which is a continuation-in-part of U.S. patent application Ser. No. 10/461,414 filed Jun. 16, 2003, now U.S. Pat. No. 7,134,749.

The contents of the above applications are all incorporated by reference as if fully set forth herein in their entirety.

FIELD AND BACKGROUND OF THE INVENTION

The present invention relates to the field of printing and, more particularly, to novel methods and apparatus for high-resolution, high-definition multicolor direct printing on surfaces such as textile.

The ever growing demand for new and stimulating garment and fabric fashion, one of the greatest commercial markets, challenges cutting edge technology to innovate in areas such as fiber materials, weaving and threading, cloth fabrication, dying and post treatment of textile fabrics. Still, the area in which technology can contribute the most is in the merging of textile with the limitless world of designer art. Hence, most promising is the area of textile printing of designer's art, which is still not fulfilled satisfactorily by the present technologies.

There are several technical and logistic challenges on the way to accomplishing the goal of high-resolution, high-definition art printing unique to textile printing, especially when the fabric is used for a garment. The printed image should withstand recurrent washings, stretching and other conditions of typical use of a garment while maintaining its vivid colors. It is further desired that the printed area would have a similar texture and pleasant feel of the original fabric. Finally, the process should to be reproducible, adapted for mass production and cost-effective while maintaining the quality of the printed image.

To date, several technologies are typically used for printing on textile surfaces. These include, for example, mold block techniques such as rotogravure and flexographic printing, screen printing, and dye sublimation. However, the requirements set forth above are only partially met with these techniques, as is discussed in detail hereinbelow.

Rotogravure printing uses an etched metal printing cylinder. The printed image is etched into the cylinder as many small cells. When the printing cylinder passes through the ink reservoir, the cells are filled with ink. The excess ink is wiped from the surface of the printing cylinder with a doctor blade leaving the image inked. The printing cylinder then transfers the image to the textile material as it comes in contact with the impression cylinder.

Rotogravure printing is ideal for long run high fidelity half tone printing at high speeds, yet it is one of the most expensive techniques due to the high cost of plate cylinder production. As other printing mold block techniques, rotogravure printing is less suitable for complex, multicolor images and designs on textile.

Another printing mold block technique is flexographic printing, which uses a raised image on a printing plate cylinder to transfer the image to the material. Flexo-plates are usually made from rubber or rubber-like materials. The raised image area picks up ink from the etched anilox roller and transfers the image to the textile material when it comes in contact with the impression cylinder.

Flexographic printing is a popular printing process because of its relatively cheap printing plates, faster set-up time and its ability to print long or short runs at high production rates. Flexography is capable of half-tone printing on central impression cylinder presses with the aid of a doctor blade to control ink distribution and fine line anilox rolls. Its main disadvantage is its incapacity to create a high definition multicolor image on textile.

Screen printing, oftentimes referred to as "silk-screening", is presently one of the most common techniques for textile printing, and is particularly suitable and applicable for flat or relatively flat surfaces. The gist of this technique involves forcing ink through a stenciled fine mesh or screen, typically made of stainless steel in industrial settings or silk in more traditional settings, which is tightly stretched around a rigid frame, directly to the textile material. The areas that should not to be printed are masked out on the screen. To create the print, the screen is positioned over the item to be printed, and thick ink is placed on the screen. A squeegee is then used to press the ink through the screen and the masked areas prevent the ink from passing from the desired areas. The textile is then heated and dried to cure the ink so as to permanently affix the image to the textile material.

In cases where a multicolor image is desired, the process is repeated using a different screen for each color. The screens are usually placed on a rotary press which allows the different color prints to be properly aligned or registered with each other. Some screen-printers have fully automatic presses that do not require any manual labor other than set-up and loading/unloading.

The inks used in screen-printing are typically non-aqueous solvent-based plastisols or aqueous-based inks. Plastisols typically include liquid plasticizers and a suspension of vinyl powder mixed with coloring agents. When the liquid is heated (typically to 180° C.) the vinyl melts and dissolved into the plasticizer. Upon cooling, the ink solidifies to various degrees of hardness, and thus a printed image that gives an unpleasant feel is formed. Aqueous-based inks tend to absorb in the fabric, and smudge, and thus oftentimes a blurred image is formed.

Masking the screen can be effected via various routes. The most straightforward route involves application of a masking fluid directly on the screen. This technique is suitable for simple, one or two color, graphics but is ineffective for more complex and photorealistic prints. For multi-color prints, screen-printers often use photosensitive emulsions to create the masked areas. The design is created on a clear piece of plastic film, while a photosensitive fluid coating is applied to the entire surface of the screen and then dried. The film is placed on the prepared screen and the surface is exposed to a very bright light. After a period of time, the exposed areas can be washed off the screen with water and printing is effected.

Screen-printing is typically used for T-Shirts, garments and other fabrics, but can also be used for other substrates, ranging from plastic to metal. Although small and intricate details can be captured, screen-printing is more suitable for bold and graphic yet simple designs, and less for multicolor, photorealistic images. In any event, as mentioned above, this technique typically results in a blur image and/or an image with an unpleasant feeling.

Other methods for printing multicolor images onto textile are transfer techniques. In these techniques, the image is created off the fabric on a special paper or decal containing an adhesion agent layer. When applied to the fabric, heat and pressure causes the image to transfer to the fabric. The resulting image is vivid and of high definition, but tends to crack upon usage, has an unpleasant feel and seals the fabric from "breathing".

Dye sublimation printing is another method presently used for creating high definition, vivid multicolor images on polyester bland fabrics. The inks are transferred to the fabric by a heat-driven sublimation, creating a soft and high resolution image. The process utilizes special inks, which are passed through an inkjet printer onto a simple paper, and the printed image is heat-transferred onto the substrate textile material.

This technique is a viable alternative for short to medium production runs. However, the process is limited only to polyester bland fabrics and, furthermore, the use of special inks and the extra step of sublimation render this technique highly expensive.

The presently used printing methods detailed above therefore fail to meet contemporary demands of the fashion industry by failing to produce high-resolution and photorealistic multicolor images. The disadvantages of these methods generally result from the multi-step processes that are involved, the cost and time-consuming pre-treatment of the fabrics, and, above all, the mediocre results obtained thereby. Moreover, at least some of these methods are limited to certain types of textile surfaces and colorants.

One approach for increasing textile printing speed, quality, versatility and simplicity involves the use of inkjet printing. Since the introduction thereof in the latter half of the 1980s (see, for example, U.S. Pat. Nos. 4,312,007 and 4,380,770), inkjet printers have grown in availability, performance and popularity while dropping significantly in price, mostly due to their reliability, relatively quiet operation, versatility, graphics capability, print quality, and low cost. Moreover, inkjet printers have made possible "on demand" color printing without the need for complicated devices.

An inkjet printer is a printer that places droplets of ink onto a subject surface, so as to create an image. The dots created by the droplets are very small, ranging between 50 to 60 microns in diameter. The dots are positioned precisely, usually by a digital process, with resolutions of up to 1440 over 720 dots per inch (dpi) in common home printers. The dots can have different colors, depending on the number of inks used by the printer and the image requirements, which are combined together to create photo-quality images. An ink jet printing apparatus typically includes an ink jet printing head having a multitude of nozzles that are used to spray droplets of ink, whereby each printing head is typically responsible for spraying a different color ink. Depending on the printing technique used, ink cartridges are available in various combinations, such as separate black and color cartridges, color and black in a single cartridge or a cartridge for each ink color. In some printer models the cartridge and printing head are combined to one unit.

Inkjet printers are capable of printing on a variety of surfaces. For example, commercial inkjet printers can spray directly on a non-flat, curved item such as the label on a glass bottle. For consumer use, there are a number of specialty papers, ranging from adhesive-backed labels or stickers to business cards and brochures.

When the desired surface is a garment or another textile fabric surface, digital inkjet technology is probably the most favorable technique for designer art and image creation. It is relatively cheap and versatile, yet can provide high resolution multicolor photorealistic images, as many households experience with their low cost, high resolution inkjet home computer printers.

The presently available inks for ink jet printing include aqueous-based inks and non-aqueous solvent-based inks. Aqueous-based inks are typically composed of water and a colorant, usually a dye or pigment dispersion, and may further contain a number of additives for imparting certain features to the ink (e.g., improved stability and flow, feather resistance, and the like). Non-aqueous solvent-based inks are typically composed of one or more volatile organic solvents, such as low alcohols, low alkanes and the like, and a colorant.

Inkjet printers are typically controlled by a computer on which the image is rendered and processed for printing. The digital data, which is typically originated from a software-driven driver, is sent to a printing head stepper motor, or linear motor driven stage, which moves the printing head array (printing head and ink cartridges) back and forth across the subject surface, while applying ink droplets on the surface, so as to form the desired image.

Presently, there are two main inkjet printing techniques for applying ink droplets onto the subject surface:

The first technique is known as thermal bubble and is further commonly referred to as bubble jet (see, for example, U.S. Pat. No. 4,296,421). In a thermal inkjet printer, small electrical resistors create heat which vaporizes the ink to create a bubble. As the bubble expands, some of the ink is pushed out of a nozzle onto the subject surface. When the bubble collapses, the created vacuum pulls more ink into the printing head from the reservoir in the ink cartridge. A typical bubble jet printing head has 300 or 600 small nozzles, all of which can apply a droplet simultaneously.

The second technique utilizes piezoelectric print heads, in which piezo crystals are used (see, for example, U.S. Pat. No. 4,312,007). A piezo crystal is located at the back of the ink reservoir of each nozzle. The crystal receives a minute electric charge that causes it to vibrate. When the crystal vibrates inward, it forces a small amount of ink out of the nozzle. When it vibrates out, it pulls some more ink into the reservoir to replace the ink sprayed out.

An inkjet printing process of an image typically includes the following basic steps:

A software application breaks the image into pixels (unit of information which depicts one point of a computerized graphic image), and sends the digital data regarding the positioning and color composition of each pixel to be printed to the printer driver.

The driver translates the data into an executable format.

The printer then receives the data and executes the actual printing by activating the control circuitry. The control circuitry sets various stepper motors, or linear motor driven stages, into motion for moving the surface back and forth under the printing head array, and to move the printing head array right and left across the surface. In some large scale commercial inkjet printers, the surface remains stationary and the printing head array is the only moving part. The printing head stepper motor typically uses belts to move the printing head array across the surface. The alternative linear motor driven stage uses an accurate linear sprocket track and sprocket wheel to move the printing head array across the surface. Typically the image is printed a line at a time. The motor pauses for a fraction of a second each time that the printing head sprays droplets of ink on the surface and then moves to the next pixel position before stopping again. Multiple dots are made at each stop when the print heads spray a combination of basic colors in precise amounts to make various colors. At the end of the pass, the stepper motors, or the linear motor driven stage, move the printing head array to the next line (beginning or end, depending on the model) and the process is repeated until printing the image is completed.

The image obtained by an ink jet process on high quality inkjet paper has relatively good quality, particularly in view of the cost and effort put in the process.

Unfortunately, however, using inkjet printing techniques for printing on other surfaces, and particularly more absorptive surfaces such as textiles, is associated with various limitations. First, inkjet printed images on textiles are often of low quality. For example, the printed images often smudge upon handling, exhibit bleeding (the intrusion of one color into an adjacent color) and infiltration (the diffusion of the image through the fabric), are moisture sensitive, and are dull, i.e., the colored inks fail to accurately produce the expected hues. Moreover, the printed images are often neither water-fast nor detergent-resistant, resulting in fading of the printed image after washing and further oftentimes fail to meet the demand for pleasant hand feel. While the textile industry requires that the image be both water-resistant and detergent-resistant, that the colors and hues would be as vivid as possible, that the colorant of the ink would adhere tenaciously to the substrate, and that the desirable hand properties of the substrate would be maintained, the presently known inkjet printing techniques fail to accomplish these requirements.

Several techniques are presently known in the art which are aimed at overcoming the limitations associated with digital inkjet printing on textile and other absorptive surfaces. These include, for example, pre-treatment of the fabric prior to the printing process. Thus, U.S. Pat. Nos. 6,291,023, 6,698,874 and 6,840,992, for example, teach coating compositions which are applied on the fabric prior to printing. Albeit, these pre-treatments are not suitable for all fabric materials, use environmentally unfriendly chemicals, are time-consuming and cost-ineffective.

Other attempts aimed at achieving a high-quality, long-lasting image, involve protection of the image, once applied on the surface, by a protective coating, as taught, for example, in U.S. Pat. No. 6,626,530. These attempts, however, reduce the simplicity and cost-effectiveness of the process, while resulting in a final product with an unpleasant feel.

Hence, while the prior art teaches various methods for printing images on various surfaces, these techniques, including the most promising technique of inkjet printing, are limited by the ability to create a multicolor, high resolution photorealistic image on textile. Most commonly used techniques suffer from adverse characteristics such as feathering (bleeding) and deep infiltration of the ink when applied on absorptive surfaces and inaccurate placement of the inks due to stray fibers which plagues the end result with blurriness and lack of high definition, in addition to the unpleasant hand-feel (and odor) of pre-treated fabrics and the unpleasant hand-feel and cracking of plasticized colorants.

There is thus a widely recognized need for, and it would be highly advantageous to have, a method for high-resolution, high-definition multicolor printing on absorptive surfaces in general and textile fabrics in particular, devoid of the above limitations.

SUMMARY OF THE INVENTION

The present inventors have now surprisingly found that by wetting a surface onto which an image is to be printed with a wetting composition that interfere with the engagement of the ink with the surface and thus temporarily modify the surface mechanical, physical and/or chemical characteristics, and thereafter forming an image by a typical printing process, on the wet surface, results in high-resolution, high-definition and vivid images, with no bleeding and diffusion of the ink.

Thus, according to one aspect of the present invention there is provided a process of printing an image on a surface, which comprises:

contacting at least a part of the surface with a wetting composition so as to provide a wet part of the surface, whereby the wetting composition is capable of interfering with the engagement of a liquid ink composition with at least one binding site of the surface; and applying the liquid ink composition on the wet part of the surface, so as to form the image on the part of the surface.

According to further features in preferred embodiments of the invention described below, the process further comprises, subsequent to applying the ink composition, curing the image.

According to still further features in the described preferred embodiments the curing is effected by a method selected from the group consisting of heating the surface and drying the surface.

According to still further features in the described preferred embodiments THE contacting is effected by a method selected from the group consisting of spraying, ejecting, smearing, spreading, brushing, dipping, dripping, impregnating, pouring, condensing, scattering, dispersing, dissipating, dissolving, melting or a combination thereof, preferably by spraying, ejecting or dripping.

According to still further features in the described preferred embodiments the contacting comprises passing the wetting composition through a liquid applicator.

According to still further features in the described preferred embodiments a density of the wetting composition in the wet part of the surface ranges from about 0.01 gram and about 2 grams per 1 $cm^2$ of the wet part of the surface, preferably from about 0.1 gram and about 0.6 gram per 1 $cm^2$ of the wet part of the surface.

According to still further features in the described preferred embodiments the part of the surface is a pre-determined part of the surface and contacting the pre-determined part of the surface with the wetting composition is effected digitally.

According to still further features in the described preferred embodiments the liquid ink composition is selected from the group consisting of an aqueous-based ink composition and a non-aqueous solvent-based ink composition, and preferably is a non-aqueous solvent-based ink composition.

According to still further features in the described preferred embodiments the wetting composition is characterized by a surface tension lower than a surface tension of the liquid ink composition, preferably by at least 2 dynes.

According to still further features in the described preferred embodiments the wetting composition is characterized by a surface tension lower than 50 dynes per centimeter.

According to still further features in the described preferred embodiments the surface tension of the wetting composition ranges from 35 dynes per centimeter to 15 dynes per centimeter, preferably from 25 dynes per centimeter to 10 dynes per centimeter.

According to still further features in the described preferred embodiments the wetting composition comprises water.

According to still further features in the described preferred embodiments the wetting composition comprises at least one organic solvent.

According to still further features in the described preferred embodiments the at least one organic solvent is selected from the group consisting of an alcohol, a ketone, an ether, an alkyl polysiloxane, an alkane, an alkene, a cycloalkane, a cycloalkene, an aryl, a heteroalicyclic, a heteroaryl and any combination thereof.

According to still further features in the described preferred embodiments the at least one organic solvent has a boiling point lower than 100° C.

According to still further features in the described preferred embodiments the wetting composition further comprises at least one agent selected from the group consisting of an adhesion promoting agent, a viscosity modifying agent, a thickener agent, a surface tension modifying agent, a surface active agent, a surfactant, a softener and any combination thereof, and optionally may further comprise water.

According to still further features in the described preferred embodiments a concentration of the at least one agent ranges from 0.01 weight percentages to 75 weight percentages of the total weight of the wetting composition.

According to still further features in the described preferred embodiments the at least one adhesion promoting agent is selected from the group consisting of an acrylic resin, a polyurethane emulsion, a polyurethane resin, a polyether resin, a polyester resin, a polyacrylate resin, a polyvinyl chloride resin, a polyvinyl acetate resin, a polyvinyl butyral resin, an aminosilicon resin and any combination thereof.

According to still further features in the described preferred embodiments the at least one agent is selected from the group consisting of a clay, a polysaccharide, a polyol, a siloxane, a polyalkylsiloxane, a melamine, a peroxide, an epoxide, an isocyanate, and a phthalate.

According to still further features in the described preferred embodiments the process further comprises, subsequent to applying the liquid ink composition, re-contacting the part of the surface with a wetting composition that preferably comprises at least one organic solvent and at least one adhesion promoting agent. Optionally and preferably, the wetting composition comprises water and at least one adhesion promoting agent.

According to still further features in the described preferred embodiments the process further comprises, prior to the contacting and/or subsequent to the applying the liquid ink composition, contacting the part of the surface with at least one adhesion promoting agent, as described herein.

According to still further features in the described preferred embodiments the surface is selected from the group consisting of a textile fabric, a plastic, a metal, a wood and a rock.

According to still further features in the described preferred embodiments the textile fabric is selected from the group consisting of wool, silk, cotton, linen, hemp, ramie, jute, acetate fabric, acrylic fabric, lastex, nylon, polyester, rayon, viscose, spandex, metallic composite, carbon or carbonized composite, and any combination thereof.

According to still further features in the described preferred embodiments the surface is a garment made of a textile fabric as described above, and preferably, cotton.

According to still further features in the described preferred embodiments the liquid ink composition comprises a carrier, a colorant, a polyol, an agent capable of chemically interacting with the surface and a catalyst for promoting the chemically interacting. Preferably the agent capable of chemically interacting with the surface of the substrate is a cross-linking agent, and the catalyst is an acid.

According to still further features in the described preferred embodiments the liquid ink composition comprises a carrier, a colorant, a polyol and an agent capable of chemically interacting with the surface and the wetting composition comprises a catalyst for promoting the chemically interacting.

According to still further features in the described preferred embodiments the liquid ink composition comprises a carrier, a colorant, a polyol and a catalyst and the wetting composition comprises an agent capable of chemically interacting with the surface, whereby the catalyst is being for promoting the chemically interacting.

According to still further features in the described preferred embodiments the chemically interacting comprises interacting with at least one functional group present within the surface.

According to still further features in the described preferred embodiments the at least one functional group is selected from the group consisting of an amine, an amide, a carboxyl, a hydroxyl and a thiol.

According to still further features in the described preferred embodiments the agent capable of chemically interacting with the surface of the substrate is a cross-linking agent.

According to still further features in the described preferred embodiments the cross-linking agents is selected from the group consisting of an aldehyde-based cross-linking agent, a polyisocyanate based cross-linking agent, a silane based cross-linking agent, a peroxide based cross-linking agent, an ester based cross-linking agent, an amide based cross-linking agent and a vinyl based cross-linking agent.

According to still further features in the described preferred embodiments the aldehyde-based cross-linking agent is a modified melamine formaldehyde.

According to still further features in the described preferred embodiments the catalyst is an acid.

According to still further features in the described preferred embodiments the acid is selected from the group consisting of dinonylnaphthalene sulfonic acid, dinonylnaphthalene disulfonic acid, dodecylbenzene sulfonic acid, toluene sulfonic acid, an alkyl phosphate acid and an aryl phosphate acid.

According to still further features in the described preferred embodiments the polyol is selected from the group consisting of a polyester polyol, a polyether polyol, a urethane polyol, a polyether, a polyester acrylate, an acrylic polyol, a urethane acrylic polyol, a polyester urethane triol resin, a polyvinyl butyral, a polyvinyl chloride acrylate and an oxidized castor oil.

According to still further features in the described preferred embodiments of the present invention, either the liquid ink composition or the wetting composition further includes a property-adjusting agent and the other composition which does not include this property-adjusting agent includes a property-sensitive agent, whereas this property-adjusting agent effects a chemical and/or physical change in the property-sensitive agent upon contacting that composition which comprises the property-sensitive agent and this composition which comprises the property-sensitive agent, and thereby effects a chemical and/or physical change in the wetting composition and/or the liquid ink composition which includes the property-sensitive agent.

According to still further features in the described preferred embodiments the liquid ink composition includes the property-sensitive agent and the wetting composition include the property-adjusting agent.

According to still further features in the described preferred embodiments the chemical and/or physical change is selected from the group consisting of solidification, adhesion, thickening, polymerization, sedimentation and cross-linking.

According to still further features in the described preferred embodiments the property is a chemical and/or physical property selected from the group consisting of acidity (pH), ionic strength, solubility, hydrophobicity and electric charge.

According to still further features in the described preferred embodiments the property-adjusting agent is selected from the group consisting of an acid, a base, a salt, a charged polymer, an oxidizing agent, a reducing agent, a radical-producing agent and a cross-linking agent.

According to still further features in the described preferred embodiments the property is acidity, and the property-adjusting agent is an organic acid.

According to still further features in the described preferred embodiments the property-sensitive agent is selected from the group consisting of an adhesion promoting agent, a dispersing agent, a viscosity modifying agent, a thickener agent, a surface tension modifying agent, a surface active agent, a surfactant and a softener.

According to still further features in the described preferred embodiments the property-sensitive agent is an agent capable of chemically interacting with the surface and the property-adjusting agent is a catalyst.

According to another aspect of the present invention there is provided a substrate having an image printed on a surface thereon, prepared by any one of the processes described hereinabove. The image is characterized by high color definition, high resolution and/or no color bleeding and can further be characterized by high color definition, high resolution, no color bleeding, high durability, chemical-fastness and/or wash-fastness.

According to another aspect of the present invention there is provided a pre-printing system for preparing a surface, as described hereinabove, for printing an image thereon, the pre-printing system comprising at least one liquid applicator for applying a wetting composition over at least a part of the surface, the wetting composition being capable of interfering with the engagement of a liquid ink composition with at least one binding site of the surface.

According to further features in preferred embodiments of the invention described below, the at least one liquid applicator comprises at least one of a spraying nozzle, a dripping nozzle, a droplet injector, a drop-on-demand piezoelectric inkjet nozzle, a continuous piezoelectric inkjet nozzle, a roller pad, a stamping pad, an offset printing stencil and a screen printing stencil.

According to still further features in the described preferred embodiments the pre-printing system further comprises at least one controller operative to control the at least one liquid applicator to apply the wetting composition onto selected parts of the surface.

According to still further features in the described preferred embodiments the pre-printing system further comprises at least one retractable bath carrying a thinner liquid operative to prevent the wetting composition from drying within the liquid applicator, and positioned beneath the liquid applicator and operative to be retracted on demand to expose the liquid applicator to apply the wetting composition onto the surface.

According to still further features in the described preferred embodiments the thinner liquid comprises the wetting composition.

According to yet another aspect of the present invention there is provided a printing system for printing an image on a surface, as described above. The system according to this aspect of the present invention comprises:

at least one printing apparatus including at least one ink applicator operative to form the image over at least a part of the surface; and at least one wetting apparatus including at least one liquid applicator operative to apply a wetting composition as described hereinabove, over at least a portion of the part of the surface prior to forming the image.

According to further features in preferred embodiments of the invention described below, the at least one ink applicator is selected from the group consisting of a spraying nozzle, a dripping nozzle, a droplet injector, a drop-on-demand piezoelectric inkjet nozzle, a continuous piezoelectric inkjet nozzle, a roller pad, an offset printing stencil and a screen printing stencil.

According to still further features in the described preferred embodiments the printing system further comprises at least one controller operative to control the at least one liquid applicator to apply the wetting composition onto selected parts of the surface.

According to still further features in the described preferred embodiments the liquid applicator comprises at least one of a spraying nozzle, a dripping nozzle, a droplet injector, a drop-on-demand piezoelectric inkjet nozzle, a continuous piezoelectric inkjet nozzle, a roller pad, an offset printing stencil and a screen printing stencil.

According to still further features in the described preferred embodiments the printing system further comprises at least one retractable bath carrying a thinner liquid, the thinner liquid operative to prevent the wetting composition from drying within the liquid applicator, the retractable bath positioned beneath the liquid applicator and operative to be retracted on demand to expose the liquid applicator to apply the wetting composition onto the surface.

According to still further features in the described preferred embodiments the printing system further comprises a curing unit arranged to cure the image.

According to still further features in the described preferred embodiments the curing unit comprises an infrared system.

According to still further features in the described preferred embodiments the curing unit comprises a hot air blowing unit.

According to still further features in the described preferred embodiments the printing system further comprises an ironing unit arranged to iron the at least a part of the surface.

According to still further features in the described preferred embodiments the printing system further comprises:

a rigid frame;

a linear motion X-axis mounted on the frame;

at least one table assembly, operative to bear a printable medium, movable on the linear X-axis;

a bridge mounted on the frame perpendicular to the linear X-axis, above the table assembly;

the at least one liquid applicator mounted on the bridge, the at least one liquid applicator operative to apply a wetting composition onto at least a part of the surface of the printable medium, the wetting composition being capable of interfering with the engagement of a liquid ink composition with at least one binding site of the surface of the printable medium;

a linear motion Y-axis stage mounted on the frame perpendicular to the linear X-axis stages, above the printing table assembly; and the at least one ink applicator mounted on the linear Y-axis stage for linear motion perpendicular to the X-axis stage.

According to still further features in the described preferred embodiments the printing system further comprises:

a rigid frame;

a first linear motion X-axis stage mounted on the frame;

a second linear motion X-axis stage mounted on the frame parallel to the first axis stage, and arranged for operation independently of the first X-axis stage;

at least one table assembly, operative to bear a printable medium, movable on each the linear X-axis;

a bridge mounted on the frame perpendicular to the linear X-axis, above the at least one table assembly;

the at least one liquid applicator mounted on the bridge, over each of the first and second X-axis, the at least one liquid applicator operative to apply a wetting composition onto at least a part of the surface of the printable medium, the wetting composition being capable of interfering with the engagement of a liquid ink composition with at least one binding site of the surface of the printable medium;

a linear motion Y-axis stage mounted on the frame perpendicular to the linear X-axis stages, above each of the at least one table assembly; and the at least one ink applicator mounted on the linear Y-axis stage for linear motion perpendicular to the first and second X-axis stage.

According to still further features in the described preferred embodiments each of the at least one printing table assembly comprises a media-holding plate and an openable cover pivotally coupled to the media-holding plate for holding the printable medium firmly against the plate.

According to still further features in the described preferred embodiments the media-holding plate includes a raised portion, and the cover includes a window of the same shape and slightly larger than the raised portion.

According to still further features in the described preferred embodiments the linear motion X-axis stage is a linear motor driven stage.

According to still further features in the described preferred embodiments the linear motion Y-axis stage is a linear motor driven stage.

According to still further features in the described preferred embodiments at least a part of each of the at least one table assembly is a vacuum table.

According to still further features in the described preferred embodiments the system further comprises a curing unit located above each of the at least one printing table assembly and arranged to cure the image formed on the surface of the printable medium mounted on the printing table assembly.

According to still further features in the described preferred embodiments the curing unit comprises an infrared system.

According to still further features in the described preferred embodiments the curing unit comprises a hot air blowing unit.

According to still further features in the described preferred embodiments the system further comprises an ironing unit located above each of the at least one printing table assembly and arranged to iron the printable media on the printing table assembly.

The present invention successfully addresses the shortcomings of the presently known configurations by providing a novel and efficient process for printing high-resolution, high-definition photorealistic images on various absorptive surfaces, in which limitations that typically lead to reduced resolution and dullness of the resulting image, such as engagement of the ink with binding sites of the surface, are circumvented.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

As used herein, the term "comprising" means that other steps and ingredients that do not affect the final result can be added. This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

The term "method" or "process" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the singular form "a," "an," and "the" include plural references unless the context clearly dictates otherwise. For example, the term "a compound" or "at least one compound" may include a plurality of compounds, including mixtures thereof.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 presents a schematic simplified perspective view of a garment printing system, constructed and operative in accordance with an embodiment of the present invention;

FIGS. 2A, 2B and 2C present side, front and top simplified views, respectively, of a garment printing system, constructed and operative in accordance with an embodiment of the present invention;

FIG. 3 is presents a schematic simplified side view of a garment printing system, constructed and operative in accordance with an embodiment of the present invention;

FIG. 4 presents a schematic illustration of a wetting system, constructed and operative in accordance with one embodiment of the present invention;

FIG. 5 presents a schematic perspective view of a wetting battery of solenoid valves and spraying nozzles, constructed and operative in accordance with one embodiment of the present invention;

FIG. 6 presents a schematic perspective view of two wetting batteries mounted over a bridge, constructed and operative in accordance with one embodiment of the present invention;

FIG. 7 presents a simplified perspective view of a preprinting system, which is a part of the printing system presented in FIGS. 2A, 2B and 2C, equipped with the wetting system presented in FIG. 4, according to preferred embodiments of the present invention;

FIG. 8 presents a schematic simplified perspective view of a battery of solenoid valves and spraying nozzles equipped with a bath of thinner liquid, constructed and operative in accordance with a preferred embodiment of the present invention;

FIG. 10 presents a simplified perspective view of a preferred embodiment of a garment mounting assembly onto which the garment is manually mounted before the printing process commences according to a preferred embodiment of the present invention;

FIG. 11 presents a simplified perspective view of the garment mounting assembly presented in FIG. 10, with a mounted garment in an open position;

FIG. 12 presents a simplified perspective view of the garment mounting assembly presented in FIG. 10, with a mounted garment in a close position;

FIG. 13 presents a simplified schematic view of an inkjet printing head assembly according to a preferred embodiment of the present invention;

FIGS. 14A, 14B, 14C, and 14D, taken together, are simplified schematic illustrations of several stages of the ink application process, according to a preferred embodiment of the present invention, showing four separate passes of the printing assembly needed to cover the entire area of the image in order to achieve high-resolution image;

FIG. 15 presents a simplified flow chart of one exemplary stepwise use of the printing process of the present invention using the wetting composition on the garment prior to printing;

FIGS. 17A and 17B are photographs presenting the front side (FIG. 17A) and the back side (FIG. 17 B) of a 100% cotton garment onto which an image was printed after contacting the surface of the garment with a wetting composition according to the present invention, using an inkjet printing machine.

DESCRIPTION OF THE PREFERRED EMBODIMENTS

Figure 9B:
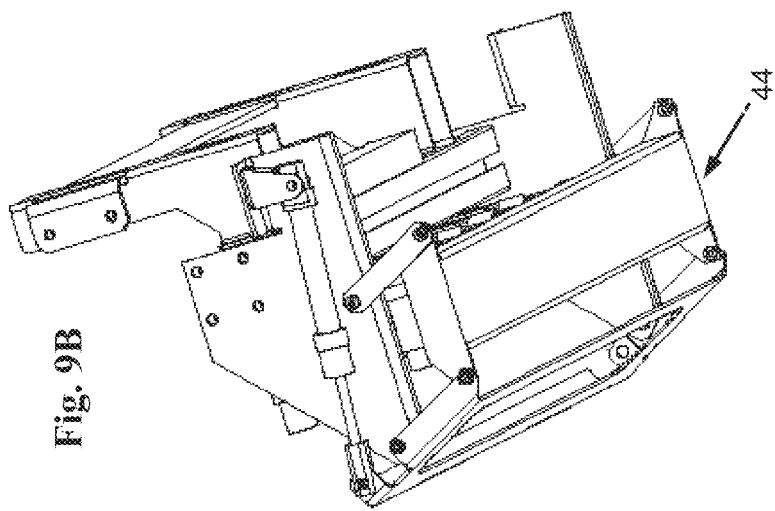
FIGS. 9A and 9B present schematic simplified perspective views of a battery of solenoid valves and spraying nozzles equipped with a bath of thinner liquid, constructed and operative in accordance with an embodiment of the present invention.

The present invention is of a novel process and apparatus for printing an image on surfaces, which are particularly beneficial for printing multicolor images on absorptive surfaces such as, but not limited to, textile fabrics and garments.

The principles and operation of the process and the apparatus according to the present invention may be better understood with reference to the accompanying descriptions and examples.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

As is described in detail hereinabove, meeting the demands of the modern textile and designer fashion industries requires processes and tools which can produce high-resolution, high-definition multicolor and photorealistic images on textile fabrics and garments. The presently known and used textile printing technologies are all accompanied by one or more limitations which render them disadvantageous, ranging from image quality, image sustainability and hand-feel, to cost and time consumption in industrial scale.

In general, a conventional method of printing on textiles involves the binding of a colorant in a form of an ink to the surface of a fibrous material. However, processes that involve such a method typically fail to produce high resolution and multicolor photorealistic images since: (i) the process involves the use of a mold requiring multiple passes for each color which are hard to superimpose; (ii) the absorptive nature of the fabrics leads to absorption and bleeding of the ink droplets in the fabric and thus reduces resolution and brightness; and/or (iii) the unpleasant hand-feel of an image which was transferred to the fabric by a decal. Moreover, some of these processes are limited to certain types of textile surfaces and colorants that can be used. Several yet limited solutions to the prevalent limitations associated with printing on textiles include the time- and cost-consuming pre-treatments of the fabric, and using the expensive and slow process of dye sublimation printing. Nevertheless most procedures end in unsatisfactory results.

One of the key limitations in the process of applying a liquid ink on absorptive surfaces, such as those made of fibrous materials or porous materials, stems from the interaction of the liquid ink with the material once the ink is applied, and before the ink is fully cured and fastened to the fabric. As is well known to a skilled artisan, when ink droplets are absorbed into an absorptive material upon contacting the surface, the color dots begin to feather (bleed), spread out in an irregular fashion, and therefore cover a larger area than the intended area, thus producing a fuzzy image with dull colors and low definition. Hence, while the quality of the printed image depends on the degree of absorption of the ink in the material of the subject surface, it is well recognized that in order to achieve a high-resolution and high-definition multicolor image on absorptive surfaces (obtained, for example, by spraying the inks onto the fabric's surface), it is highly desirable that an applied ink droplet would stay as a tight, symmetrical dot once being in contact with the fabric, and until it is fully cured.

The presently known printing technologies are also limited when applied on other absorptive surfaces, as well as surfaces that are characterized by high surface tension and glossy finish. In the latter type of surfaces, the ink droplets tends to expand and over-spread due to physical interactions adverse to the printing process, thus leading to reduced resolution of the printed image.

In a search for a comprehensive and efficient solution for the limitations associated with printing on absorptive surface, such as a textile fabric, as well as other problematic surfaces as described hereinabove, and for improving the quality of a printed image on such surfaces the present inventors have envisioned that the quality of a printed image could be enhanced by temporarily modifying the physical, chemical and/or mechanical characteristics of the surface prior to applying a liquid ink composition thereon. Thus, while conceiving the present invention, it was hypothesized that such a modification could be achieved by contacting the surface with an agent that would temporarily modify these characteristics of the surface such that the engagement of the liquid ink composition with the binding sites of surface would be decreased. It was further hypothesized that such an agent can be comprised of simple and readily available wetting composition and thus it was further envisioned that such a methodology would result, in addition to the improved quality of the image, in a cost-effective process, and in a printed surface with no adverse characteristics such as unpleasant feel.

While reducing the present invention to practice, as is demonstrated in the Examples section that follows, the present inventors have surprisingly found that utilizing such a methodology indeed results in a significantly improved quality of the printed image. More specifically, it was found that contacting a textile surface with variable wetting compositions, prior to applying the ink thereon, rendered the surface of the textile fabric temporarily less absorptive to the ink, such that the dots of the ink did not feather or bleed until the ink was fully applied and further cured on the surface, thereby affording a sharp, highly defined and vivid image.

Hence, according to one aspect of the present invention, there is provided a process of printing an image on a surface. The process is effected by wetting at least a part of the surface with a wetting composition; and applying a liquid ink composition on the wet part of the surface, so as to form an image thereon.

As is discussed hereinabove, the wetting composition is selected capable of interfering with the engagement of the liquid ink composition with at least one binding site of the surface. Such an interference includes, for example, temporarily modifying a mechanical property of the surface by, for example, reducing the contact area between the ink composition and the surface by, e.g., filling the pores in the surface or flattening perturbing objects such as stray fibers; temporarily modifying a physical property of the surface by, for example, reducing the surface tension formed between the surface and the ink composition; and temporarily modifying a chemical property of the surface by, for example, engaging the binding sites of the surface by, e.g., interacting with functional groups on the surface, masking, neutralizing or inverting the charge of functional groups on the surface. As used herein the phrase "binding site" describes any site of the surface that may interact, either chemically, mechanically or physically, with the ink composition. These include, for example, functional groups on the surface that may chemically bind compatible functional groups present in the ink composition; functional groups on the surface that may form hydrophobic or hydrophilic interactions with compatible functional groups present in the ink composition; flattening perturbing objects such as stray fibers that can interfere with the uniform application of the ink composition on the surface; any dry area of the surface which may thermodynamically promote absorption of the liquid ink composition; and any area of the surface which due to too high or too low surface tension promotes minimization or maximization of surface area of the ink droplets on the surface.

Applying the liquid ink composition can be effected by any of the printing techniques known in the art, including, but not limited to, ink jet printing, screen printing, printing block (mold) techniques, dye sublimation techniques and the likes.

As used herein, the phrase "at least a part of the surface" describes one or more areas of the surface, and includes also the entire surface. Preferably the part of the surface that is contacted with the wetting composition includes the area onto which the ink is later on applied, namely, the total area covered by the printed image. The areas may be continuous or discontinuous.

Hereinunder in this section, the term "surface" is used to describe any area of the surface, including specific parts of the surface, as described above.

The printing process may further include, subsequent to the formation of the image, curing the image. The curing can be effected by heat and/or dry air emanating from a heat source such as, for example, an infrared conveyor or a filament coil, or a dry air source such as, for example, a hot air blower.

Contacting the surface with the wetting composition, according to the process of the present invention, may be performed by any method or technique for applying a liquid onto an object, including, but not limited to, spraying, ejecting, smearing, spreading, brushing, dipping, dripping, impregnating, pouring, condensing, scattering, dispersing, dissipating, dissolving, melting, or a combination of some of these wetting methods. Alternatively, contacting the surface with the wetting composition can be effected by converting a composition to a liquid form on an object, e.g., by condensation of a vaporized liquid onto the surface or melting a solidified liquid onto the surface. A suitable method is selected so as to comply with the physical properties of a specific wetting composition, and to comply with a given printing machine and technology.

According to a preferred embodiment of the present invention, contacting the surface with the wetting composition is effected by spraying, ejecting or dripping the wetting composition onto the desired part of the surface, by means of a liquid applicator. These methods are most suitable for a controlled and automatic in-line wetting procedure, and can therefore be easily implemented as a part of many mechanized printing techniques.

Contacting the surface with the wetting composition can be further controlled by pre-determining the area of the surface that is to be wetted by the wetting composition, so as to contact with the wetting composition only that specific, pre-determined area of the surface onto which the image is printed in the subsequent stage of the process. The pre-determination of the area to be wetted allows for optimization of the entire printing process which depends on accurate material quantification, i.e., of the wetting and the ink compositions, and accurate timing of each printing steps, i.e., the wetting, the ink application and the curing steps. The pre-determination of the area of the surface can by readily established by a computerized algorithm Hence, according to a preferred embodiment of the present invention, the part of the surface that is contacted with the wetting composition is pre-determined digitally.

Applying a sufficient amount of the wetting composition on the surface is essential for the effectiveness of the wetting process and the quality of the resulting image. The amount of the wetting composition applied on the surface during the contacting described above can be controlled by the liquid applicator mechanism. A suitable amount would be an amount which ensures uniform and adequate coverage of the surface with the wetting composition and further which ensures efficient modification of the surface physical characteristics regarding the engagement of the ink with the binding sites of the surface material. Yet, an excessive amount of the applied wetting composition may form a thick layer thereof, which may minimize the interaction of the ink and the surface and thus adversely affect the durability of the resulting image.

Preferably, contacting the surface with the wetting composition is performed so as to obtain a wet part of the surface in which the density of the wetting composition ranges from about 0.01 gram per 1 $cm^2$ of the surface to about 2 grams per 1 $cm^2$ of the surface, more preferably from about 0.05 gram per 1 $cm^2$ to about 1 gram per 1 $cm^2$, more preferably from about 0.1 gram per 1 $cm^2$ to about 1 gram per 1 $cm^2$ and, more preferably, from about 0.2 grams per 1 $cm^2$ to about 0.6 grams per 1 $cm^2$.

As used herein the term "about" refers to ±10%.

As is discussed hereinabove, while reducing the present invention to practice, the present inventors have studied the effect of various wetting compositions in various combinations with different ink compositions. The obtained results indicated a possible effect of the surface tension of the wetting composition with respect to that of the ink composition. Hence, without being bound to any particular theory, it is assumed that contacting the surface with a wetting composition renders the resulting wet surface temporarily less absorptive to the ink by reducing its surface tension. More specifically, it is assumed that the interference with the engagement of the ink composition with the surface is at least partially affected by reducing the surface tension of the surface. Thus, it is assumed that a wetting composition characterized by a low surface tension in general, and particularly with respect to the liquid ink composition may interfere with the absorption of the ink into an absorptive surface such as a textile fabric. Therefore, it is assumed that preferred wetting compositions according to the present invention are those which exhibit the required surface tension difference between a given liquid ink composition and the wetting composition.

The phrase "surface tension" as used herein, refers to the phenomena exhibited when a liquid substance and another substance become in contact, stemming from the difference in the molecular attraction forces of the molecules in each substances, which reveals itself at the interface between the substances. The surface tension is a result of the unbalanced force experienced by molecules at the surface of the liquid substance. As a result of surface tension, a drop of liquid tends to form a sphere, because a sphere offers the smallest area for a definite volume. The higher the surface tension, the tighter the sphere will be, and vice versa, the lower the surface tension is, less is the tendency of the liquid to form a spherical droplet. Substances with low surface tension have a tendency to form films. For example, the force of adhesion between an aqueous liquid and a liquid hydrocarbon is very small compared to the force of cohesion between the water molecules in the aqueous liquid. As a result, water does not adhere to wax and tends to form spherical beads, or droplets, with the smallest possible surface area, thereby maximizing the force of cohesion between the water molecules. One method of measuring surface tension is by means of a capillary tube. If a liquid of density d rises a height h in a tube of internal radius r, the surface tension is equal to rhdg/2. The result will be in dynes per centimeter if r and h are in centimeter, d in grams per centimeter cube (cm³) and g in centimeter per second square (sec²).

In the context of embodiments of the present invention, the surface tension of a liquid ink composition with respect to its interaction with the surface of a substrate is used as a basis of comparison with the surface tension of the liquid ink composition with respect to its interaction with the surface of a substrate wetted with a wetting composition, meaning that the wetting composition has a surface tension lower than that of the liquid ink composition in comparison to the fabric surface.

Hence, according to a preferred embodiment of the present invention, the wetting composition is characterized by a relatively low surface tension.

Preferably, the surface tension of the wetting composition is lower than 50 dynes per centimeter. Further preferably, the surface tension of the wetting composition ranges from about 35 dynes per centimeter to about 15 dynes per centimeter. More preferably, the surface tension of the wetting composition ranges from about 25 dynes per centimeter to about 10 dynes per centimeter.

According to another preferred embodiment of the present invention, the wetting composition and the liquid ink composition are selected such that the surface tension of the wetting composition is lower that the surface tension of the liquid ink composition. Preferably, the surface tension of the wetting composition is lower than the surface tension of the liquid ink composition by at least 2 dynes per centimeter, more preferably by at least 3 dynes per centimeter, more preferably by at least 5 dynes per centimeter and even more preferably by at least 10 dynes per centimeter.

According to a preferred embodiment of the present invention, the wetting composition includes one or more organic solvents.

Since, as is discussed hereinabove, the wetting composition is aimed at temporarily modify the mechanical, physical and chemical properties of the surface during the application of the ink thereon, while not affecting other properties of the surface, it is highly desirable that at least a majority the wetting composition could be removed from the surface once the printing process is completed. One of the simplest routes of removing substances under these conditions is by evaporation. Therefore, preferred organic solvents are characterized as volatile.

As used herein, the term "volatile" refers to a substance or a composition that is characterized by a relatively low boiling point and/or high evaporation rate.

As is well accepted in the art, boiling points below 100° C. are considered as relatively low boiling points. Hence, according to a preferred embodiment of the present invention, the organic solvent has a boiling point lower than 100° C. Such organic solvents can be easily removed once the printing process is completed, during, for example, the curing process, as described above, which involves application of heat or air blow onto the surface.

Preferred organic solvents according to this embodiment of the present invention are further characterized by an evaporation rate that is greater than 0.1, preferably greater than 0.2 and typically ranges between 0.1 and 5. As is well known in the art, values of evaporation rates of substances are determines with reference to the evaporation rate of butyl acetate, which is arbitrarily set as 1.

As is discussed hereinabove, since it is assumed that characteristics such as volatility and low surface tension improve the beneficial effect of the wetting composition, preferred organic solvents are those that exhibit such characteristics. Representative examples of such organic solvents include, without limitation, alkanes, alkenes, cycloalkanes, cycloalkanes and aryls, which are collectively referred to herein as hydrocarbons, alcohols, ketones, ethers, alkyl polysiloxanes, heteroalicyclics, heteroaryls and any combination thereof.

As used herein, the term "alcohol" describes a chemical substance that bears one or more hydroxyl groups. The term "hydroxyl" refers to a —OH group. An alcohol can be represented by R—OH, wherein R is alkyl, a cycloalkyl, alkenyl, alkynyl, aryl, heteroaryl and the likes, as these terms are defined hereinbelow. However, this term further encompasses such groups which bear two or more hydroxyl groups. Such substances are also referred to herein as polyols.

Non-limiting examples of alcohols that are suitable for use in the context of the present invention include methanol, ethanol, propanol, 2-propanol, 1-butanol, 2-butanol and pentanol. The presently most preferred alcohols are ethanol, 2-propanol (isopropyl alcohol, IPA) and 1-butanol. Non-limiting examples of polyols that are suitable for use in the context of the present invention include ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thioglycol.

The term "ketone" describes a chemical substance that has one or more carbonyl groups. The term "carbonyl" as used herein, describes a —C(=O)—R', thus a ketone can be represented by R—(C=O)—R' wherein R is as define hereinabove, and R' is as defined for R.

Non-limiting examples of ketones that are suitable for use in the context of the present invention include acetone, cyclopentanone, cyclohexanone, methyl ethyl ketone and pentan-3-one. The presently most preferred ketone is cyclohexanone.

The term "ether" describes a chemical substance having one or more alkoxy groups. The term "alkoxy" refers to an —OR group, wherein R is as described hereinabove, and thus an ether can be represented by R—O—R', wherein R and R' are each independently as define hereinabove.

Non-limiting examples of ethers that are suitable for use in the context of the present invention include ethylene glycol butyl ether acetate, propyl methyl ether, methoxy propanol, diethyl ether, 1-methoxyhexane, 1-ethoxyhexane and 1-propoxypentane. The presently most preferred ethers are ethylene glycol butyl ether acetate and propyl methyl ether.

The phrase "alkyl polysiloxanes" describes a polymeric chemical substance having the general formula

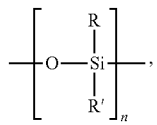

wherein n is an integer denoting the number of repeating polymeric units, and R and R' are each independently as defined hereinabove. Preferably, n is an integer from 1 to 3.

Non-limiting examples of alkyl polysiloxanes that are suitable for use in the context of the present invention include dimethyl polysiloxane, ethyl methyl polysiloxane, phenyl methyl polysiloxane and nitrilobutyl phenyl polysiloxane. The most preferred alkyl polysiloxane is dimethyl polysiloxane.

The term "alkane" or "alkyl" describes a saturated aliphatic hydrocarbon including straight chain and branched chain groups. Preferably, the alkane has 6 to 20 carbon atoms. Whenever a numerical range; e.g., "6-20", is stated herein, it implies that the group, in this case the alkane, may contain 6 carbon atom 2, 7 carbon atoms, 8 carbon atoms, etc., up to and including 20 carbon atoms. More preferably, the alkane is a medium size alkane having 6 to 14 carbon atoms. Most preferably, unless otherwise indicated, the alkane is a lower alkane having 6 to 10 carbon atoms. The alkane may be substituted or unsubstituted. Substituted alkanes may have one or more substituents, whereby each substituent can independently be, for example, halide, alkyl, cycloalkyl, alkenyl, alkynyl, aryl, heteroaryl and the likes.

The term "halide" group refers to fluorine, chlorine, bromine or iodine.

Non-limiting examples of alkanes that are suitable for use in the context of the present invention include hexane, heptane, octane, petroleum ether, tert-butylchloride, isobutylchloride, perfluorohexane, perfluoroheptane and perfluorooctane. The most preferred alkanes are petroleum ethers, heptane, octane and perfluorohexane.

The term "cycloalkane" or "cycloalkyl" refers to an all-carbon monocyclic or fused ring (i.e., rings which share an adjacent pair of carbon atoms) group where one or more of the rings does not have a completely conjugated pi-electron system. The cycloalkane may be substituted or unsubstituted. When substituted, the substituent group can be, for example, halide, alkyl, cycloalkyl, alkenyl, alkynyl, aryl, heteroaryl and the likes.

The term "aryl" refers to an all-carbon monocyclic or fused-ring polycyclic (i.e., rings which share adjacent pairs of carbon atoms) groups having a completely conjugated pi-electron system. The aryl group may be substituted or unsubstituted. When substituted, the substituent group can be, for example, halide, alkyl, cycloalkyl, alkenyl, alkynyl, aryl, heteroaryl and the likes. Representative examples of aryls are benzene, naphthalene, dichlorobenzene, xylene, cymene and 1-chloro-4-methylbenzene.

The term "heteroalicyclic" refers to a monocyclic or fused ring group having in the ring(s) one or more atoms such as nitrogen, oxygen and sulfur. The rings may also have one or more double bonds. However, the rings do not have a completely conjugated pi-electron system. The heteroalicyclic may be substituted or halide, alkyl, cycloalkyl, alkenyl, alkynyl, aryl, heteroaryl and the likes. Representative examples of heteroalicyclics are piperidine, piperazine, tetrahydrofurane, tetrahydropyrane, morpholino and the likes.

The term "heteroaryl" refers to a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furane, thiophene, imidazole, oxazole, thiazole, pyrazole, pyridine, pyrimidine, quinoline, isoquinoline and purine. The heteroaryl group may be substituted or unsubstituted. When substituted, the substituent group can be, for example, halide, alkyl, cycloalkyl, alkenyl, alkynyl, aryl, heteroaryl and the likes. Representative examples of heteroaryls are pyridine, pyrrole, oxazole, indole, purine and the likes.

The wetting composition may include, in addition to, or instead of, the organic solvent, water.

According to the presently most preferred embodiment of the present invention, the wetting composition comprises water as a major component. Preferably the wetting composition further includes one or more organic solvents as described hereinabove. Such a wetting composition is selected so as to be compatible, in terms of miscibility, surface-tension and other criteria, with other most preferred embodiments, namely the use of aqueous-based liquid ink compositions, as these embodiments are presented and discussed hereinbelow The wetting composition according to the present invention may optionally further include one or more agents which may additionally alter the interaction of the ink composition with the surface.

These agents include, for example, one or more adhesion promoting agents. As is well known in the art, adhesion promoting agents are typically comprised of one or more substantially saturated, predominantly or substantially hydrocarbon oligomers or polymers, containing reactive functional groups that are capable of reacting with a co-polymer or a cross-linking agent upon heat exertion, oxidation, drying and other chemical and physical conditions. By being cross-linked, the adhesion promoting agents typically form an adhesive film.

The addition of the adhesion promoting agent(s) to the wetting composition of the present invention beneficially affects the properties of the resulting image by stabilizing the colorants of the liquid ink compositions after the curing procedure, and thus improving the wash-fastness of the printed image. The addition of the adhesion promoting agents may optionally also improve the surface tension relations between the wetting composition and the ink composition.

Non-limiting example of adhesion-promoting agents that are suitable for use in the context of the present invention include various polymers and copolymers such as acrylic resins, polyurethane emulsions and resins, polyether resins, polyester resins, polyacrylate resins, polyvinyl chloride resins, polyvinyl acetate resins, polyvinyl butyral resins, aminosilicon resins and combinations thereof.

Additional agents that may be beneficially incorporated in the wetting of the present invention include, for example, one or more of viscosity modifying agents, thickening agents, surface tension modifying agents, surface active agents, surfactants, softeners and combinations thereof. The addition of such agents to the wetting composition may improve the effect of the wetting composition and may further provide a selected wetting composition with desirable characteristics. Thus, for example, the addition of surface tension modifying agents enables to use a wetting composition that comprises an organic solvent with moderate surface tension characteristics, which are improved by the added agent. The addition of viscosity modifying agents enables to use a wetting composition that comprises an organic solvent with high viscosity, which is reduced by the added agent, and so on.

Representative examples of agents that can be beneficially added to the wetting composition of the present invention include, without limitation, clays, polysaccharides, polyols such as propylene glycol and glycerin, modified siloxanes and polyalkylsiloxanes, aldehyde based liquid resins such as melamines, urea formaldehyde, phtalates, isocyanates, polymers and oligomers having hydroxyl, carboxyl or amide functional groups and catalysts, and thermally activated agents such as peroxides, epoxides, isocyanates and acrylates.

The agents described above can be incorporated in a wetting composition that comprises an organic solvent either per se, such that the final form of the wetting composition can be, for example, a mixture, a solution, an emulsion or a suspension, including these agents. Alternatively, these agents can be incorporated as an aqueous solution, suspension or emulsion, such that the resulting wetting composition comprises water.

The agents described above can be applied onto the surface as a part of the wetting composition (typically as a mixture, suspension or an emulsion that comprises one or more organic solvents as detailed hereinabove, one or more of these agents and optionally water), within the contacting of the surface with the composition. Alternatively, these agent(s) can be applied onto the surface prior to or subsequent to contacting the surface with the wetting composition. Further alternatively, a wetting composition that comprises one or more organic solvents can be applied on the surface during the contacting procedure and a wetting composition that comprises a mixture (e.g., an emulsion) of one or more organic solvent and one or more of these agents is applied prior or subsequent thereto.

Alternatively, or in addition to the above, the additional agent(s) can be applied onto the image, either per se or as a part of the wetting composition, subsequent to applying the ink composition. These procedure is aimed at protecting the image from wearing and loosing its definition, as discussed hereinabove.

The concentration of these agent(s) when added to the wetting composition according to the present invention preferably ranges from about 0.01 weight percentages to about 75 weight percentages of the total weight of the wetting composition, more preferably from about 0.5 weight percentages to about 15 weight percentages of the total weight of the wetting composition and more preferably from about 1 weight percentages to about 5 weight percentages of the total weight of the wetting composition.

Hence, according to a preferred embodiment, an exemplary wetting composition according to the present invention includes 95 weight percents ethanol and 5 weight percents of an acrylic emulsion (about 50% solids) and the process includes application such a composition prior and subsequent to the application of the ink composition. Applying this wetting composition prior to the ink application interfere with the engagement of the ink with the surface, and applying this wetting composition thereafter provides for improved color gamut, definition, brightness and wash-fastness of the printed image.

The printing process according to the present invention can be applied using a variety of liquid ink compositions typically used in printing techniques known in the art and therefore can be applied using aqueous-based ink compositions and non-aqueous solvent-based ink compositions.

The carrier can be, for example an aqueous carrier, comprising mainly water, or an organic carrier, comprising mainly an organic solvent.

Aqueous-based ink compositions typically contain deionized distilled water as a main carrier or solvent, and other carriers and coating chemicals such as, for example, cymel 323 (Cytec Industries).

Non-aqueous solvent-based liquid ink compositions typically contain an organic component as a main carrier or solvent. Non-limiting examples of non-aqueous solvent-based liquid ink compositions include as a carrier, or solvent, ethylene glycol butyl ether acetate (EGBEA), cyclohexanone, dipropylene glycol methyl ether (DPM), and/or diethylene glycol.

In general, non-aqueous solvent-based liquid ink compositions offer some advantages such as enhanced solubilizing effect of more types of colorants and other beneficial additives, higher evaporation rate (high volatility), and a typical, medium-range surface tension and are generally more compatible with mechanical parts of the printing machine. However, these solvents are costly and harmful for the user and the environment as waste, and further may cause staining of the substrate.

On the other hand, water, which serves as the main carrier in aqueous-based compositions is a safe and readily available carrier which can offer the use of many safe and environmentally friendly colorants and additives, and can be more easily manipulated than an organic solvent with respect to its chemical properties such as ionic strength, pH, surface tension and other properties which can be optimized for inkjet applications.

As is demonstrated in the Examples section that follows, the present inventors have found that the methodologies described herein can be efficiently practiced using ink compositions which comprise an aqueous carrier (aqueous-based ink compositions).

Thus, according to preferred embodiments of the present invention, the liquid ink composition utilized herein comprises an aqueous carrier, whereby, the carrier is preferably water. Such ink compositions are also referred to herein, interchangeably, as "aqueous-based ink compositions".

The liquid ink composition used in the process described herein may further include one or more agents such as, for example, adhesion promoting agents, as described hereinabove, which are aimed at improving properties of the resulting image such as durability, and/or provide the ink composition with characteristics that would beneficially affect its interaction with the wetting composition (e.g., enhanced or reduced surface tension and/or viscosity), as is discussed in detail hereinabove.

The concentration of such agents in the liquid ink composition, according to this embodiment of the present invention, preferably ranges from about 0.01 weight percentage to about 75 weight percentage of the total weight of the liquid ink composition, more preferably from about 0.1 weight percentages to about 50 weight percentages of the total weight of the ink composition and more preferably from about 0.1 weight percentages to about 10 weight percentages of the total weight of the ink composition.

The agents described above can therefore be added, according to the present invention, to either one or both of the wetting composition and the ink composition. Furthermore, these agents can be applied on the area on the image subsequently to the application of the liquid ink compositions either before or after the curing step. Applying, for example, an adhesion promoting agent on the printed image before the curing can be performed in order to enhance the wash-fastness of the colorants and provide mechanical and chemical protection to the printed image.

A preferred ink composition that can be beneficially used in the context of the present invention is disclosed in IL Patent Application No. 163459 and in WO 2005/115761, both by the present inventors and assignee and are incorporated by reference as if fully set forth herein. The ink composition taught in these applications is highly suitable for printing color images on a variety of surfaces, and particularly absorptive surfaces, and is further suitable for inkjet printing processes. The use of this ink composition in various printing process affords a durable printed image which is wash-fast, chemically robust and resistant to physical wear. The ink composition taught in IL Patent Application No. 163459 and WO 2005/115761 includes a carrier, as is described hereinabove and is also referred to herein interchangeably as a solvent, a colorant, a polyol, an agent capable of chemically interacting with functional groups present within the substrate, and a catalyst for catalyzing the chemical interaction and may optionally further include various additives for modulating the chemical interaction and formulations of different ink properties and different results in the finished printed image.

The term "colorant" as used herein describes a substance which imparts the desired color to the printed image. The colorant may be a pigment, a lake or a dye. Pigments are solid colorants with are typically suspended in the carrier of the ink composition, whereby dyes are liquid colorants which are dissolved in the carrier of the ink composition.

Apart for imparting the desired color to the printed image, the colorant is selected suitable in terms of its chemical and physical properties. Thus, for example, in a preferred embodiment of the present invention, the colorant is a heat curable colorant.

Exemplary dye colorants that are suitable for use in this embodiment of the present invention include, without limitation, azo chrome complexes such as the commercially available Orasol black RLI, Orsal Red G and CU phthalocyanine and similar azo-cobalt complexes. Exemplary pigment colorants that are suitable for use in this context of the present invention include, without limitation, quinacridone, benzimidazolone, carbon black, phthalocyanine, diarylide, azo, titanium oxide and calcium carbonate. Exemplary commercially available pigments are such as Permajet, Renol and Microlith.

Preferably, the colorant content in the ink composition according to this embodiment of the present invention ranges from about 0.2% to about 40% of the total weight of the ink composition. More preferably, the colorant content ranges from 1 to 10 weight percentages of the total weight of the ink composition.

As is discussed hereinabove, the component of the ink composition according to this embodiment, which provides for enhanced durability of the images formed thereby is an agent that is capable of chemically interacting with the substrate. Preferably, such agent interacts with functional groups that are present within the substrate material and more preferably, which are present on its surface.

As used herein, the phrase "chemical interaction" describes a chemical reaction which takes place between two or more substances, and typically leads to a formation of a bond. The bond, in the case of the present invention, can be a covalent bond, a ionic bond, a hydrogen bond and the like and thus, the chemical interaction can involve, for example, nucleophilic and electrophilic substitutions, nucleophilic and electrophilic addition reactions, elimination reactions, cycloaddition reactions, rearrangement reactions, chelate formation, ionic complex formation, affinity-pair formation and any other known organic and inorganic reactions.

As used herein, the phrase "functional group" describes a chemical moiety that is capable of undergoing a chemical reaction that typically leads to a bond formation. The bond, in the case of the present invention, can be a covalent bond, a ionic bond, a hydrogen bond and the like. Representative examples of suitable functional groups according to this embodiment of the present invention include, without limitation, amine, amide, halide, hydroxyl, thiol, cyano, sulfonamide, carboxyl, thiocarbamate, urea and thiourea, as these terms are defined hereinafter. Preferably, the functional groups according to this embodiment are those which are abundant and available for chemical interactions in the substances which compose the substrate onto which the image in printed. Such functional groups that are present within prevalent substrates typically include, without limitation, amine, amide, carboxyl, hydroxyl and thiol.

By chemically interacting with the substrate, this agent provides for improved adherence of the ink composition and thus ensures that the image formed by the ink composition would sustain washes, abrasion and other physical and chemical stress. Preferably, the chemical interaction involves cross-linking and the agent capable of interacting with the substrate is a cross-linking agent.

As used herein, the term "cross-linking" describes a chemical reaction that involves the formation of interconnecting links between various components and thus leads to the cross-wise formation of interconnecting links.

The phrase "cross-linking agent" as used herein thus refers to a chemical substance which has two or more reactive groups available for chemical interaction typically leading to bond formation, whereby these reactive groups participate in such a bond formation that leads to cross-linking between other chemical substances. Preferably the cross-linking agent has more than two reactive groups, enabling the cross-linking agent to form a branched mesh of interconnecting links.

The reactive groups on the cross-linking agent according to this embodiment of the present invention must be chemically compatible with the functional groups available on the surface of the substrate, and be reactive under mild condition at which printing and/or curing are performed. For example, in the case of a substrate with amine groups on its surface, a cross-linking agent with a carboxyl groups may form amide bonds with the substrate. Similarly, hydroxyl and/or thiol groups on the surface of the substrate will form bonds with cross-linking agents having amine groups, carboxyl groups, acyl-halide groups, aldehyde groups, isocyanate groups, as these terms are defined hereinbelow, and many other such functional groups which interact readily in mild conditions and/or mild heating.

Thus, the cross-linking agent can be, for example, an aldehyde-based cross-linking agent, an amine-based cross-linking agent, an isocyanate-based cross-linking agent, a carboxyl-based cross-linking agent, a silane based cross-linking agent, an acyl-halide cross-linking agent, a peroxide based cross-linking agent, an ester based cross-linking agent, an amide based cross-linking agent and a vinyl based cross-linking agent. Each of these cross-linking agents include one or more of the indicated functional group.

Aldehyde-based cross-linking agents are the most commonly used cross-linking agents in many industries due to their highly reactive profile under mild conditions and the relatively safe use thereof in industrial scale. For printing onto textile fabrics, aldehyde-based cross linking agents are particularly advantageous due to the abundant presence of hydroxyl groups on surfaces of textile fabrics.

However, the high reactivity of aldehyde-based cross-linking agents may oftentimes limit their use since ink compositions containing same may be unstable, and thus difficult to prepare, store, transfer and utilize or having short shelf-life.

As used herein, the term "amine" refers to an —NR'R" group where R' and R" are each hydrogen, alkyl, alkenyl, cycloalkyl, aryl, heteroaryl (bonded through a ring carbon) or heteroalicyclic (bonded through a ring carbon) as defined hereinbelow.

The terms "alkenyl" and "alkene" refers to an alkyl group which consists of at least two carbon atoms and at least one carbon-carbon double bond.

As used herein, the term "acyl-halide" describes a R'(C=O)X group wherein X is halide, as defined herein and R' as defined herein.

As used herein, the term "aldehyde" refers to an —C(=O)—H group.

As used herein, the term "amide" refers to both "C-amide" and "N-amide" whereas "C-amide" refers to a —C(=O)—NR'R" group, where R' and R" are as defined herein and "N-amide" refers to an —NR'C(=O)—R" group, where R' and R" are as defined herein.

As used herein, the term "carboxyl" refers to an —C(=O)OR' group, where R' is as defined herein.

The term "cyano" describes a —C≡N group.

The term "hydroxyl" refers to a —OH group.

The term "isocyanate" describes an —N=C=O group.

The term "peroxide" refers to a —O—O—R' group, where R' is as defined herein.

The term "silane" describes a —O—Si—(OR')(OR")(OR''') group, where R', R" and R''' are as defined herein.

The term "sulfonamide" describes a —N—S(=O)$_2$—OR' group, where R' is as defined herein.

The term "thiocarbamate" describes a —O—(C=S)—NR'R" group, where R' and R" are as defined herein.

The term "thiol" refers to a —SH group.

The term "thiourea" describes an —NR'—C(=S)—NR"R''', with R', R" and R''' as defined herein.

The term "urea" describes an —NR'C(=O)—NR"R''', where R', R" and R''' are as defined herein Exemplary types of aldehyde-based cross-linking agents include, without limitation, modified melamine formaldehyde based cross-linking agents, urea formaldehyde based cross-linking agents, glycoluril formaldehyde based cross-linking agents and benzoguanamine formaldehyde based cross-linking agents.

Exemplary modified melamine formaldehyde-based agents include, without limitation, methylated melamine formaldehyde, N-butylated melamine formaldehyde and isobutylated melamine formaldehyde. A preferred modified melamine formaldehyde-based agent is a methylated melamine formaldehyde.

Exemplary urea formaldehyde based agent include, without limitation, methylated urea formaldehyde, N-butylated urea formaldehyde and isobutylated urea formaldehyde. Exemplary glycoluril formaldehyde based agents include, without limitation, N-butylated glycoluril formaldehyde and methylated/ethylated glycoluril formaldehyde. Exemplary benzoguanamine formaldehyde based agents include, without limitation, N-butylated benzoguanamine formaldehyde and methylated/ethylated benzoguanamine formaldehyde.

Preferably, the cross-linking agent content in the ink composition according to this embodiment of the present invention ranges from about 0.4 weight percentage to about 55 weight percentages of the total weight of the ink composition. More preferably, the cross-linking agent content ranges from about 5 weight percentages to about 25 weight percentages of the total weight of the ink composition.

It should be noted herein that some of the binding sites with which the wetting composition interacts so as to reduce the engagement of the ink composition therewith may also include functional groups that are present on the substrate surface. However, the chemical characteristics of the wetting composition described herein and the ink composition presented in this embodiment of the present invention are completely different and so do the interactions formed with the wetting composition and the ink composition.

The ink compositions according to this embodiment of the present invention further includes a catalyst.

The term "catalyst" as used herein describes a chemical substance which is capable of promoting, initiating and/or catalyzing the chemical reaction between the agent capable of chemically interacting with the substrate and the functional groups in the substrate. The catalyst is selected so to promote, initiate and/or catalyze the reaction upon contact of the ink composition with the substrate, optionally in combination with an external heat that is applied during the curing of the image.

Preferred catalysts according to this embodiment of the present invention are acid catalysts and more preferred are strong acid catalysts. Acid catalysts are suitable since they may catalyze most of the reactions described above between various functional groups on the substrate and reactive groups within, e.g., the various cross-linking agents described above.

The acid catalyst can be present in the ink composition either in its free form, or as a blocked catalyst, namely as a salt form thereof with a volatile basic counter-ion or as a complex with about 3% by weight of a low amine or about 15% by weight of a low alcohol present in the ink composition, whereby the amine or the alcohol serves as a volatile acid attenuating additive. The salt or the complex described above decomposes upon application of the composition onto the substrate and thus the reactive form of the catalyst is generated.

Preferably, the catalyst content in the ink composition of the present embodiment ranges from about 0.01 weight percentage to about 15 weight percentages of the total weight of the ink composition. More preferably, the catalyst content ranges from about 0.1 to about 10 weight percentages of the total weight of the ink composition.

The term "polyol" describes a chemical substance that has two or more free hydroxyl groups, as this term is defined hereinbelow, and includes, for example, diols, triols, tetraols, etc. Typical polyols are substances that include from about 50 to about 400 hydroxyl groups. Representative examples of a polyol include, without limitation, a polyester polyol, a polyether polyol, a urethane polyol, a polyester acrylate, an acrylic polyol, a urethane acrylic polyol, a polyester urethane triol resin, a polyvinyl butyral, a polyvinyl chloride acrylate and an oxidized castor oil.

Non-limiting examples of polyols that are suitable for use in the context of the present embodiment include ethylene glycol, diethylene glycol, triethylene glycol, polyethylene glycol, propylene glycol, dipropylene glycol, polypropylene glycol, butylene glycol, hexanediol, pentanediol, glycerin (glycerol), hexanetriol, and thioglycol.

The polyol content in the ink composition of the present embodiment ranges from about 0.1 weight percentage to about 50 weight percentages of the total weight of the ink composition. Preferably, the polyol content in the ink composition ranges from 0.5 weight percentage to 30 weight percentages of the total weight of the ink composition and more preferably, the polyol content in the ink composition ranges from about 11 weight percentages to about 20 weight percentages of the total weight of the ink composition.

Each of the ink compositions described herein can further include one or more additional ingredient which may further modify the chemical and physical properties of the ink composition, and provide for improved performance of the formed image. Examples of such ingredients include, without limitation, non-reactive agents softeners/plasticizers, dispersing agents, surface active agents and conductivity agents (ionizable materials).

The above-described ink composition can be utilized in the process of the present invention by being applied after the application of the wetting composition. Utilizing such an ink composition by the process of the present invention produces images which are beneficially characterized by both the superior qualities stemming from the use of the wetting composition of the present invention, and the physical and chemical durability stemming from the use of such an ink composition.

However, a more preferred ink composition that can be utilized in the context of the present invention is a composition that comprises a colorant, a carrier, a polyol and an agent that is capable of chemically interacting with the substrate, as described hereinabove, whereby the wetting composition comprises a catalyst that promotes the chemical interaction, as described hereinabove.

Alternatively, a preferred ink composition that can be utilized in the context of the present invention is a composition that comprises a colorant, a carrier, a polyol and a catalyst, as described hereinabove, whereby the wetting composition comprises an agent that is capable of chemically interacting with the substrate, as described hereinabove.

By utilizing such ink compositions that are devoid of one of the reactive components (e.g., the catalyst or the agent capable of chemically interacting with the substrate) and a wetting composition that comprises this component, adverse reactions between the reactive components in the ink compositions are avoided and the ink composition can be more efficiently utilized.

The printing process of the present invention thus produces images with improved resolution, definition and brightness, as compared with the presently known printing technologies, and is particularly useful for printing multi-color images on absorptive and other surfaces. As is demonstrated in the Examples section that follows, by contacting the surface, prior to the formation of the image, with a suitable wetting composition, the feathering and bleeding of the ink dots one into the other is substantially reduced, the ink droplets exhibit a tight and symmetrical droplet shape when applied onto the wetted surface, higher optical density of ink on the surface is achieved (allowing printing of higher-resolution images), and the ink does not infiltrate to the back side of the surface. The use of a volatile solvent in the wetting composition allows for complete or substantially complete removal thereof, as is shown by the absence of noticeable traces of the wetting composition after the image is cured.

The requirement from any liquid ink composition to be fluid and cause ultimately no clogging in the fine fluid passages in the printing machine, and at the same time have the capacity to solidify and bind irreversibly to the material of the surface, put limits on compositions that can be used in inkjet machines. The balance between these requirements was considered by the present inventors whom hypothesized that the undesired compromise between fluidity and final durability requirements can be waived by using two fluid and cross-reactive agents that solidify or otherwise go through a chemical or physical change only upon contact therebetween.

While further searching for improved methodologies for printing an image on absorptive surfaces, the present inventors have found that by adding a property adjusting agent to either the liquid ink composition or to the wetting composition and adding a property sensitive agent, which, in one embodiment, promotes the adhesion of the colorant to the substrate upon contacting the property adjusting agent, to any of the wetting or liquid ink compositions which do not have the property adjusting agent, result in affixing the colorants in the inks to the surface.

This feature can be effected according to the present invention since the image is formed by more than one pass over the surface, and since each composition, namely the wetting composition and the liquid ink composition, can be applied by a separate mechanical element, such as a printing head or a spraying nozzle. A chemical/physical property-sensitive agent can therefore be added to the one of the liquid ink compositions applied in one pass, and a chemical/physical property-adjusting agent, can be added to the one of the other liquid ink composition applied in the other pass, thereby contacting these two agents when applied these two liquid ink compositions onto the surface. The event of the contacting initiates a chemical and/or physical change upon which the colorant of either ink compositions settles and is better affixed on the surface of the substrate.

Hence, according to preferred embodiments of the printing process presented herein, one of the liquid ink composition or the wetting composition includes a property-adjusting agent and one of the liquid ink composition or the wetting composition which does not include the property-adjusting agent, includes a property-sensitive agent. The property-adjusting agent is selected such that it effects a change in the property-sensitive agent only upon a contact therebetween, and thereby effects a chemical/physical change in the combined liquid ink and wetting compositions which includes the colorant.

Preferably, the wetting composition includes the property-adjusting agent and the liquid ink composition includes the property-sensitive agent. Thus, upon contacting the liquid ink composition with the wetting composition during the printing process, the liquid ink composition undergoes a chemical change that prevents the penetration of the liquid ink into an absorptive substrate and at the same time enhances the adhesion of the colorant to the substrate, all of which enhances properties such as durability, wear-resistance, flexibility and vividness of the printed image.

In general, the objective of using a property sensitive and adjusting agents is to provide the means to generate a chemical reaction between two agents which are reactive therebetween such that the reaction will occur only on the surface of the substrate and not beforehand.

The term "property" as used herein refers to a chemical and/or physical property of the wetting or liquid ink composition, namely, a characteristic of the composition that is reflected by the chemical composition and/or a physical parameter of the composition. Representative examples include, without limitation, acidity (pH), ionic strength, solubility, hydrophobicity, electric charge and the likes.

The term "pH" refers to the quantitative measure of the acidity or alkalinity (basicity) of liquid solutions, and translates the values of the concentration of the hydrogen ion which ordinarily ranges between about 1 and 10E-14 gram-equivalents per liter into the exponent negative values which range between 0 and 14.

The phrase "ionic strength" as used herein refers to the charge-weighted concentration of ions in solutions.

The term "hydrophobicity" as used herein refers to a quality of a non-polar molecule or group that has little affinity to water or other polar solvents. Hydrophobic groups on molecules in a polar solution tend to turn in on them or clump together with other hydrophobic groups.

The term "solubility" as used herein refers to the amount of a solute that will dissolve in a specific solvent under given conditions. The reduction of solubility may be effected by a change in another chemical property such as pH, ionic strength and hydrophobicity.

The phrase "property-sensitive agent" refers to a component of a composition which is sensitive to a change in a particular chemical and/or physical property of the composition and as a result of such a change undergoes a chemical and/or physical change which effects the entire composition.

The chemical or physical change that takes effect upon contacting these agents is preferably designed so as to afford better binding between the colorants and the substrate, and hence a preferred chemical and/or physical change can be, for example, solidification, adhesion, thickening, polymerization, sedimentation and cross-linking.

The action of thickening, sedimentation and subsequent solidification of one or more components in the liquid ink composition promotes adhesion of the colorant to the substrate by, for example, direct chemical binding or entanglement of these components with functional groups in the substrate, as described hereinabove, upon polymerization and/or cross-linking thereof which is effected upon the abovementioned chemical or physical property change caused by the property-adjusting agent. For example, a property-sensitive cross-linking agent such as glutaraldehyde can become chemically reactive upon a change in the pH and interact with an amine-rich resin in the composition and form a semi-solid substance which adheres to the substrate as an entangled mesh, as well as directly via amine groups on the surface of the substrate. This reaction entraps particles of the colorant in the mesh thereby promoting the adhesion thereof to the material of the substrate.

The phrase "property-adjusting agent" as used herein refers to an agent that may forms a part of one liquid ink composition or a part of the wetting composition, and can effect the level of one or more chemical or physical property of another liquid ink composition when coming in contact therewith, such as a pH level, the ionic strength, the hydrophobicity or the electric charge of the other composition. By effecting a change in one or more such properties, the property-adjusting agent is causing the property-sensitive agent to undergo a chemical and/or physical change, as discussed hereinabove.

The abovementioned chemical properties can be readily adjusted by adding a chemical substance (the property-adjusting agent) which lowers or elevates the level of these properties. For example, adding an acid (H+ ions) will elevate the acidity while adding a base will lower the acidity level. Similarly adding a salt will elevate the ionic strength, adding a precipitating agent will lower the solubility, adding a hydrophilic agent will lower the hydrophobicity, adding a charged species will elevate the electric charge, and so on, each property can be lowered or elevated by use of a suitable adjusting agent.

Exemplary property-adjusting agents present in either the wetting composition or the liquid ink composition, according to preferred embodiments, include acids and/or bases that adjust the pH property; salts that adjust the ionic strength and electrical charge; or oxidizing agents, reducing agents, radical-producing agents and cross-linking agents which change the chemical reactivity of certain chemical groups present in one or more components of the other liquid ink composition and thereby effect the solubility thereof by promoting cross-linking and/or polymerization of these components.

The concentration of the property-sensitive agent depends on its type and role in the liquid ink composition, namely if it is a main resin binder it will constitute up to 50% of the total weight of the composition and if it is a minor additive such as a dispersant, it will constitute up to 10% of the composition. Typically, the concentration of the property-sensitive agent ranges from about 0.5 weight percentages to about 50%, and more preferably 30% of the total weight of the composition comprising same.

The concentration of the property-adjusting agent should correspond adequately to the type and amount of the property-sensitive agent, and can range from about 0.5% to about 20% of the total weight of the composition.

The following describes a few representative and non-limiting examples, which present how the objective of using the property sensitive and adjusting agents is met:

An acid-base interaction can cause a resin that is soluble in a basic or neutral composition to precipitate once it comes in contact with an acid, whereupon such solidification leads to a sharp increase in the viscosity of the composition.

An acid-base interaction can cause an emulsion of a colorant and other components that can keep its low viscosity under basic conditions, to turn into a gel having a very high viscosity once it comes in contact with an acid. For example, adding polyvinyl alcohol with a low molecular weight to an aqueous-based ink composition and adding borax (sodium tetra borate) to the wetting composition will cause the formation of a gel upon contacting these two compositions. A similar effect will be achieved when using calcium acetate and isopropanol.

A resin being soluble in an aqueous solution will precipitate once it comes in contact with calcium and/or aluminum ions, whereupon it will become a solid and will effect a sharp increase in the viscosity of the combined composition.

A salt (ionic) interaction between anions and cations such that cause an emulsion to break and to its components to precipitate. Preferred salts for effecting an increase on the ionic strength include calcium salts such as calcium chloride and calcium acetate, and aluminum salts such as aluminum chloride and aluminum sulfate, and any combination thereof.

A hydrophilic-hydrophobic interaction between various solvents and polymeric latex resin that causes the resin to swell and precipitate and effect an overall rise in the viscosity of the combined composition.

A preferred chemical property, according to the present invention, is acidity, the preferred chemical adjusting agent is an acid, and preferably the acid is an organic acid. Preferably, the organic acid is a carboxylic acid such as, for example, a carbonic acid, a formic acid, an acetic acid, a propionic acid, a butanoic acid, an α-hydroxy acid such as glycolic acid and lactic acid, a halogenated derivative thereof and any combination thereof, and most preferably the acid is acetic acid.

In order to improve the stability of colorants and pigments on the surface once applied (and optionally cured or otherwise dried), it is known in the art that adhesion promoting agents can be used to affix the pigments to the surface.

As discussed hereinabove, the liquid ink composition may include an agent capable of chemically interacting with functional groups present within the substrate, and a catalyst for catalyzing the chemical interaction. In terms of the property adjusting and the property sensitive agents, the agent capable of chemically interacting with functional groups present within the substrate is the property sensitive agent, and the catalyst for catalyzing the chemical interaction is the property adjusting agent, but as opposed of coexisting in one composition, these two agents are now separated, each forms a part of a different composition.

According to the present embodiments the liquid ink compositions include an agent capable of chemically interacting with functional groups present within the substrate, for example, an adhesion promoting agent, which is soluble when present in the liquid ink composition and may also act as a dispersing agent for the various colorants and pigments which are included in these ink compositions, but precipitates and/or solidifies when, for example, the pH of the media it is dissolved in drops below a certain pH level, therefore it is a pH-sensitive dispersion and adhesion promoting agent.

Correspondingly, according to the present embodiments, the wetting composition includes a catalyst for catalyzing the chemical interaction, for example, a pH-adjusting agent, namely an acid, which upon contacting the liquid ink compositions, lowers the pH thereof and thereby lowers the pH of the media of the pH-sensitive dispersion and adhesion promoting agent, causing it to precipitate and solidify, hence affixing the colorants and pigments of the liquid ink composition and affords a durable printed image which is wash-fast, chemically robust and resistant to physical wear.

Hence, the chemical/physical property-sensitive agent, which undergoes a chemical reaction or physical change as a result of contacting the chemical/physical property-adjusting agent, is preferably an adhesion promoting agent, a dispersing agent, a viscosity modifying agent, a thickener agent, a surface tension modifying agent, a surface active agent, a surfactant and a softener, which form a part of the liquid ink compositions. Preferably the chemical/physical property-sensitive agent is an adhesion promoting agent.

Exemplary adhesion promoting agents include, without limitation, an acrylic polymer, a polyurethane emulsion, a polyurethane polymer, a polyether polymer, a polyester polymer, a polyacrylate polymer, a polyvinyl chloride polymer, a polyvinyl acetate polymer, a polyvinyl butyral polymer, an aminosilicon polymer and any combination thereof.

Thus, according to preferred embodiments, a liquid ink composition is preferably an aqueous based ink composition which includes a polymer which serves as a dispersion agent and a pH-sensitive adhesion promoting agent which precipitates when it comes in contact with a preferably aqueous-based wetting composition, which preferably comprises an acid as a property-adjusting agent, when these compositions are applied one after the other on the surface of the substrate.

Exemplary formulations of a wetting composition, according to preferred embodiments are based on the following percentage of content ranges:

Water as an aqueous-based wetting composition carrier 65-99%
A property sensitive agent 0-35%
or a property adjusting agent 0-10%
Other additives 0-5%
Surface active agent 0-0.5%

As discussed hereinabove, preferably the wetting composition comprises a property adjusting agent and the liquid ink composition comprises a property sensitive agent. Preferably, the property adjusting agent is volatile.

For example, the wetting composition can comprise water and a relatively small amount of an acid, acting as a pH adjusting agent. In these cases, the water content of the wetting composition preferably ranges from 90% to 99.9% and the organic acid content in the wetting composition ranges from 10% to 0.1% respectively to the water content. More preferably the water content is 99.5% and the acid content is 0.5% and the organic acid is a volatile organic acid such as formic acid or acetic acid.

Following the exemplary wetting composition, an exemplary and corresponding formulation of a liquid ink composition is based on the following percentage of content ranges:

Water 0-95%
Glycols 0-95%
Pigment/colorant 0-35%;
Resin binder or a polymeric dispersion 0-20%;
Resin/binder 0-50%
Dispersing agent 0-20%
Rheology modifier 0-10%
Organic solvent 0-5%
Additives (anti-foaming agents, leveling agents, surface active agents etc.) 0-2%
Property sensitive agent 0-50%
or a property adjusting agent 0-35%

The property sensitive agent can be present as a main resin/binder (content of up to 50%), or a secondary resin/binder (content of up to 20%), or as a dispersant (content ranging from 0 to 20% or up to 60% of the pigment/colorant), or as a resin binder or a polymeric dispersion (content ranging from 0 to 20%).

Preferably the ink composition is alkaline (basic) so as to maintain the sensitive adhesion promoting agent in its soluble form, and therefore the pH setting agent is a base.

In summary, the images produced by the process of the present invention, are characterized by minimized ink absorption into the surface (e.g., minimized diffusion of ink to the back side of a thick layered surface); high and long-lasting color vividness; high resolution; and high durability.

The process described hereinabove can be performed on any desirable surface, using an appropriate printing machine. Thus, the surface can be a flat surface and a non-flat surface such as a curved surface or any uneven surface.

Further, the surface can be in a form of e.g., a film, a foil, a sheet or any other face of any three-dimensional object.

As is discussed in detail hereinabove, the process according to the present invention is particularly beneficial when the surface onto which the image is printed has undesirable characteristics which reduce the image quality. These characteristics include, for example, absorptiveness and high surface tension as compared with that of the ink, which lead to smearing of the ink composition and hence to reduced brightness and resolution.

Thus, the process according to the present invention is particularly beneficial when the surface is made of an absorptive material such as fibrous material and a porous material or a material characterized by high surface tension. Examples of such surfaces include, without limitation, textile fabrics, plastics, metals, glass, wood and rock.

The surface described above may form a part of a subject that is made of the same material or, alternatively, include one or more additional layers such as, for example, a paper layer, a foam layer, a textile fabric layer, a natural or synthetic rubber layer, a ceramic or glass layer, a resin layer and the likes, and any combination thereof.

As is further discussed in detail hereinabove, the process according to the present invention is particularly useful when the surface includes one or more fibrous materials, e.g., a textile fabric.

Textile fabrics that are suitable for use in the context of the present invention include, for example, woven fabrics, knitted fabrics, and non-woven fabrics such as felt fabrics.

The textile fabrics, according to the present invention, may include fibers from any animal, plant and/or synthetic source such as, for example, wool, silk, cotton, linen, hemp, ramie, jute, acetate, acrylic fabric, lastex, nylon, polyester, rayon, viscose, spandex, metallic composite, carbon or carbonized composite, and any combination thereof.

The printing process of the present invention is highly suitable for garments made of one or more textile fabrics, and therefore one of the preferred embodiments of the present invention is the use of this novel printing process on a piece of garment. An exemplary garment is a cotton T-shirt.

As described and discussed hereinabove, the printing process of the present invention and its novel principles is suitable for a variety of printing techniques using liquid inks on absorptive and glossy surfaces. One example for a highly compatible printing technique, with respect to the present invention, is digital inkjet printing directly on the subject surface.

Hence, the present invention further relates to a digital printing system for various substrates that permits accurate, high quality, high resolution, multi-color printing directly onto a substrate in a relatively simple system.

A preferred embodiment of the present invention is useful for printing over materials that usually cause the ink to feather in the material of the surface, such as fibrous materials, porous materials and other ink absorbing materials, and materials having high surface tension with the ink liquid. A preferred embodiment of the present invention is thus provided for the garment industry in general, and for T-shirt printing industry in particular.

A preferred embodiment of the present invention comprises a pre-printing system for preparing a surface for printing an image thereon, including one or more controller-operated liquid applicator for applying the wetting composition of the present invention. This liquid applicator typically comprises an array of spraying nozzles operative to apply a wetting composition over the subject surface. Other types of liquid applicators may include dripping nozzles, droplet injectors, drop-on-demand piezoelectric inkjet nozzles, continuous piezoelectric inkjet nozzles, roller pads, stamping pads, offset printing stencils and a screen printing stencils. The controller(s) operates the liquid applicator(s) so as to apply the wetting composition on selected part(s) of the surface, as discussed hereinabove.

The pre-printing system of the present invention may be a stand alone apparatus, or a part of a complete printing system. The particulars of the pre-printing system, according to the present invention, are discussed in detail hereinbelow and in the figures (see, for example FIG. 4).

Hence, according to an aspect of the present invention there is provided a printing system which includes:

The pre-printing system described hereinabove;

a printing assembly comprising at least one printing head operative to apply ink on a printable medium; and A controller unit for controlling the operation of the above assemblies, typically comprising a computer, preferably comprising a microcontroller, or a programmable logic controller (PLC), or a personal computer (PC) or any combination thereof.

The printing system may optionally further include a garment handling assembly; and further optionally, at least one curing assembly, operative to cure the ink composition and/or the wetting composition, and/or expedite the drying of the wetting composition.

Further optionally, the printing system includes at least one ironing assembly, operative to iron the garment prior to printing or wetting.

The abovementioned wetting assembly and printing assembly preferably comprise one or more units capable of applying liquid over selected areas of the surface to be printed. Such units can be, for example, spraying nozzles, dripping nozzles, droplet injectors, drop-on-demand piezoelectric inkjet nozzles, continuous piezoelectric inkjet nozzles, roller pads, stamping pads, offset printing stencil and a screen printing stencil, etc.

The abovementioned garment handling assembly preferably comprises an accurate X, Y, Z motion system and a printing table. Since the printing system is particularly suited to printing on a garment, it has been described herein with respect to garment printing, by way of example only. However, it will be appreciated that any other suitable substrate can alternatively be utilized.

A preferred embodiment of a digital printing system according to the present invention typically comprises electronically controlled wetting and printing units such as spraying nozzles, dripping nozzles, droplet injectors, drop-on-demand piezoelectric inkjet nozzles, continuous piezoelectric inkjet nozzles, etc. that are capable of creating image pixels in a controllable manner.

A preferred embodiment of the present invention shown and described below comprises the combination of wetting by spraying technology and printing by inkjet technology. It is appreciated that the present invention pertains to every possible combination of wetting technology and printing technology.

Reference is now made to FIG. 1, which is a simplified perspective drawing of a garment printing system 10 constructed and operative in accordance with one embodiment of the present invention. Garment printing system 10 comprises a rigid frame 11 in which an accurate linear motion X-axis stage 12 is installed. According to one embodiment, X-axis stage 12 is a linear motor driven stage, and can be a conventional linear stage. Alternatively, X-axis stage 12 can be any other type of linear stage, like a belt-driven stage, or ball screw driven stage. A printing table assembly 13 is connected to X-axis stage 12, which preferably provides high acceleration and scanning speed.

Perpendicular to the X-axis direction, an accurate linear motion Y-axis stage 14 is installed above printing table assembly 13, preferably on a bridge 15. X-axis 12 and Y-axis stages 14 are known in the art as linear stages, such as linear rails, like rails marketed by THK Co., Ltd., Tokyo, Japan, a linear encoder like that sold by RSF Elektronik Ges.m.b.H., Tarsdorf, Austria, and a moving plate supported on the rails. According to a preferred embodiment of the invention, X-axis stage 12 is a linear motor driven stage, capable of high acceleration rate and stiffness, for example, Anorad brand model LW10 of Rockwell Automation, Shirley, N.Y., USA. Closed loop control is responsible for the high accuracy and motion smoothness. The position of printing table 13 along the rails of X-axis stage 12 is measured by a linear encoder, and is used also to determine the firing timing of the inkjet nozzles and the wetting nozzles. Y-axis stage 14 is preferably a linear motor stage similar to X-axis stage 12.

A printing head 16, preferably comprising a plurality of inkjet nozzles, is connected to a vertical Z-axis system 17, which is preferably a ball screw driven stage. Z-axis stage 17 is supported on a Y-axis moving plate 18, to allow motion perpendicular to the direction of movement of printing table 13. The gap between the printing heads array 16 and the printed surface on printing table assembly 13 is an important parameter for high quality printing. Z-axis stage 17 enables movement of the printing heads array 16 in the vertical direction for calibration for different media heights.

It is appreciated that any other ink applying apparatus can be used for printing head 16, such as a dripping nozzle, a droplet injector, a drop-on-demand piezoelectric inkjet nozzle, a continuous piezoelectric inkjet nozzle, a roller pad, an offset printing stencil and a screen printing stencil.

It is also appreciated that, while the system is particularly suited for printing on a finished garment, other printable media can alternatively be employed. The present invention will be described with regard to a finished garment, for ease of description by way of example.

Printing system 10 optionally comprises an ironing unit 19 and also optionally comprises a curing unit 20. Ironing unit 19 is preferably supported on frame 11 above X-axis stage 12, preferably on a bridge, such that printing table assembly 13 can move underneath. Ironing unit 19 prepares the media for printing, as will be further explained in detail below. Curing unit 20 is preferably supported on bridge 15 over rigid frame 11. Alternatively, curing unit 20 can be mounted over a separate bridge in a similar manner to ironing unit 19. According to one embodiment of the present invention curing unit 20 is an infrared heating conveyor unit that evaporates the ink carrier and/or at least a part of the wetting composition as printing is accomplished or during print passes. According to another embodiment of the present invention curing unit 20 is a hot air blower. Alternatively, any other curing unit can be utilized, which is suited to the type of ink printed on the garment.

A main computer 21, preferably a microprocessor, controls the entire system, and is coupled to each of the various units for coordination, synchronization, and activation, in accordance with a pre-programmed printing process. Main computer 21 coordinates a large number of functions. It receives images from an image file, processes the images to be printed, activates the curing unit, and controls the motion systems, the ironing unit, and more. Preferably, movement of the X-axis and the Y-axis stages is coordinated by the microprocessor with the nozzles firing command by a print heads controller, so that precise printing of a desired object or symbol can be performed. In a preferred embodiment of the present invention, computer 21 is augmented with a programmable logic controller (PLC), later shown and described in accordance with FIG. 4.

Reference is now made to FIGS. 2A, 2B, and 2C, which are respectively side, front and top simplified views of a garment printing system 22 constructed and operative in accordance with another embodiment of the present invention. Printing system 22 comprises a frame 23 that is wider than frame 11 shown in FIG. 1, and two independent linear X-axis stages 13 are installed instead of one X-axis stage, as in the embodiment described in FIG. 1. Y-axis stage 14 described in FIGS. 2A, 2B and 2C is substantially the same as Y-axis stage 14 in FIG. 1. Printing system 22 also comprises two curing units 20, two ironing units 19 and two printing table assemblies 13. It is a particular feature of the present embodiment that the two X-axis stages 12 operate independently from one another. Thus, the process of loading and unloading can be carried out on one printing assembly at the same time that printing is being carried out on the second printing assembly. As a result, the printing heads array is working substantially continuously, dramatically improving throughput of the system. Each table can be accessed from the same edge of the system, thereby permitting a single worker to operate two printing assemblies. Main computer 21 controls both X-axis stages for independent operation.

Reference is now made to FIG. 3, which is a side view of a printing system 24 according to a yet another embodiment of the present invention. The printing system 24 comprises a frame 11, which is the same as frame 11 shown in FIG. 1 and two independently movable printing table assemblies 13 mounted on the same X-axis stage 12. Printing table assemblies 13 are capable of moving back and forth independently of one another. Printing is performed on one printing table 13 while at the same time garments are unloaded and loaded on the second printing table. Each printing table 13 is accessed from the opposite edge of the system, and is loaded and unloaded by a different operator. Main computer 21 controls both printing tables.

Reference is now made to FIG. 4, which is a schematic illustration of a wetting system 25 constructed and operative in accordance with one embodiment of the present invention to apply the wetting composition to part(s) of the surface of the printable medium. Wetting system 25 can be added to a printing system, such as the printing systems 10, 22 and 24 described above. In a preferred embodiment of the present invention wetting system 25 comprises a tank 26 containing the wetting composition 27, a pump 28 connected to tank 26 through a pipe 29 and operative to pump wetting composition 27 from tank 26 to spraying nozzle 19 via pipe 30, a pressure regulator 31, a pipe 32, a manifold 33, a pipe 34 and a solenoid valve 35. An overflow needle valve 36 is operative to carry excess wetting composition back to tank 26 via pipes 37 and 38. A pipe 39 is also operative to carry overflow wetting composition from solenoid valve 35 to tank 26. Preferably, a plurality of solenoid valves 35 and spraying nozzles 19 are constructed to form a battery of spraying nozzles as will be described below. When wetting is initiated, as will be described below, computer 21, preferably with the aid of a programmable logic controller (PLC) 40, activates pump 29, and then solenoid valve 35, to inject streams of wetting composition 27. In a preferred embodiment of the present invention shown and described in accordance with FIGS. 4 and 15, the role of the PLC is to translate the commands effected by computer 21 into electrical activation to the relevant components. A detailed description of the computer 21 procedure to operate wetting system 25 is further shown and described below with reference to FIG. 15.

As discussed in length hereinabove, it is appreciated that the wetting of the garment with the wetting composition of the present invention prior to printing, limits the penetration of the ink droplets into the garment so that a larger amount of ink remains on the external, visual, layers of the fabric and do not bleed, and thus the printing head is capable of creating smaller dots of ink. Therefore the printed image has a higher quality, through higher resolution and stronger, more vivid colors.

It is also appreciated that the method and the apparatus for wetting the garment with the wetting composition of the present invention can alternatively be used to coat any other surface that is capable of absorbing the ink, or that has a relatively high surface tension or glossy finish, so as to limit the bleeding of the ink through, or over, the surface.

It is further appreciated that spraying nozzle 19 can be replaced by other means for applying liquid onto a surface, such as a dripping nozzle, a droplet injector, a drop-on-demand piezoelectric inkjet nozzle, a continuous piezoelectric inkjet nozzle, a roller pad, an offset printing stencil and a screen printing stencil.

It is additionally appreciated that the printing head 16 can be replaced by other means for applying ink onto a surface, such as a dripping nozzle, a droplet injector, a drop-on-demand piezoelectric inkjet nozzle, a continuous piezoelectric inkjet nozzle, a roller pad, an offset printing stencil and a screen printing stencil, in any possible combination of wetting technology and printing technology. Non-limiting examples of such combinations include wetting using dripping and printing using drop-on-demand piezoelectric inkjet nozzle; wetting using roller pad and printing using continuous piezoelectric inkjet nozzle; wetting using spraying and printing using screen printing stencil; and wetting using droplet injector and printing using inkjet nozzle. Reference is now made to FIG. 5, which is a perspective drawing of a battery 41 of solenoid valves 35 and spraying nozzles 19, constructed and operative in accordance with one embodiment of the present invention. Solenoid valves 35 are each connected via pipe 34, manifold 33 and pipe 32 to pressure regulator 31 (not shown in this figure).

Reference is now made to FIG. 6, which is a perspective drawing of two batteries 41, mounted over a bridge 42 constructed and operative in accordance with one embodiment of the present invention. It is appreciated that alternatively batteries 41 can be mounted on bridge 15 of FIGS. 1, 2A, 2B and 2C, preferably at the opposite side of printing head 16.

Reference is now made to FIG. 7, which is a simplified perspective drawing of a printing system 43 constructed and operative in accordance with one embodiment of the present invention. Printing system 43 is an improvement of the printing systems 10, 22 and 24 as shown and described in accordance with FIGS. 1, 2A, 2B, 2C and 3 by adding pre-printing wetting assembly 25. For simplicity, printing system 43 is shown and described as an improvement of the twin axis printing system 22 shown and described in accordance with FIGS. 2A, 2B, 2C. FIG. 7 shows two batteries 41 mounted over bridge 15, each battery over its respective X-axis 12. Each battery 41 is operative, separately and independently, to spray a wetting composition over the garment prior to printing, and optionally subsequently to the printing, as will be described below.

After mounting the garment on printing table 13, as will be described in further details below, the operator instructs computer 21 to start the printing process. Computer 21, with the aid of PLC 40, moves printing table 13, under battery 41, until one edge of the area to be printed is placed directly below battery 41. Then computer 21 and PLC 40 operate the adequate spraying nozzles 19, while moving printing table 13 beneath, until at least a part of the area to be printed is wetted. At this stage the garment is ready for printing and printing table 13 is moved under printing head 16 to commence printing as will be described below.

It is appreciated that the operation of selected spraying nozzles 19 while moving the garment below enables the wetting of only selected, and optionally pre-determined areas of the garment, particularly those areas to be printed, while other areas are left intact.

Optionally computer 21, with the aid of PLC 40, operate curing assembly 20 while moving the printing table underneath, to cure, at least partially, the optionally included additional agents in the wetting composition, prior to printing.

It is appreciated that wetting assembly 25, as well as printing system 43, can be easily modified for printing objects other than garments.

Figure 9A:
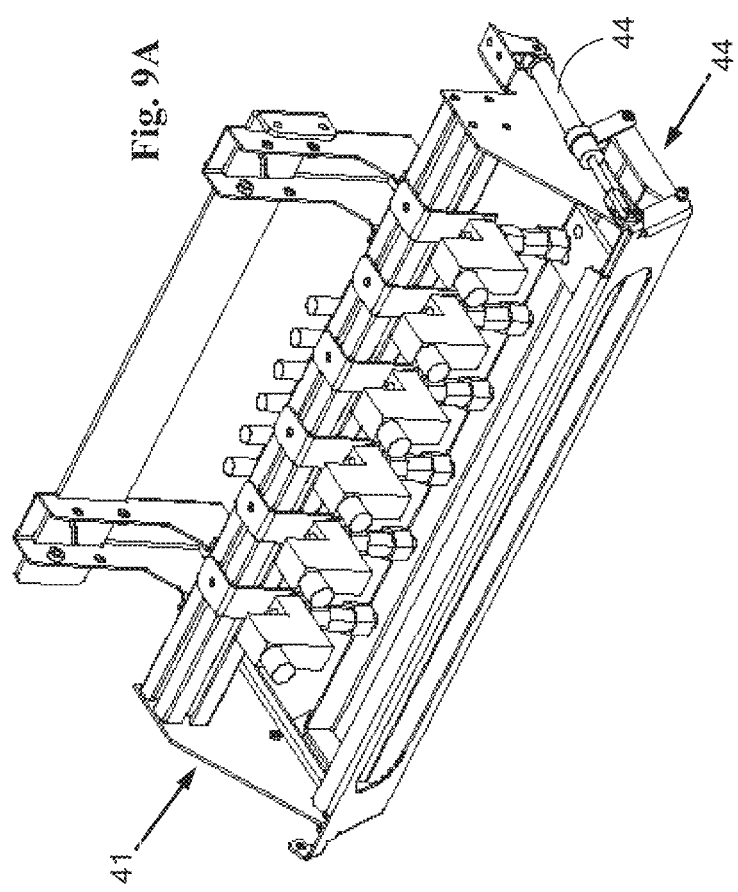

Reference is now made to FIGS. 8, 9A and 9B, which are all simplified perspective drawings of a preferred embodiment of battery 41 equipped with a bath 44, constructed and operative in accordance with one embodiment of the present invention. Bath 44 contains a thinner liquid, and is operative to dip the tips of spraying nozzles 19 in this thinner liquid when the spraying nozzles are not spraying, as can be seen in FIG. 8. Before spraying is initiated, computer 21 activates the solenoid 45 to move bath 44 and expose the tips of spraying nozzles 19, as can be seen in FIGS. 9A and 9B.

Reference is now made to FIG. 10, which is simplified perspective drawings of a preferred embodiment of a garment mounting assembly 46, which is a part of printing table 13, constructed and operative in accordance with one embodiment of the present invention. Garment mounting assembly 46 comprises a media-holding plate 47 and an openable cover 48. Preferably, media-holding plate 47 includes a raised portion 49 of the same size as the image to be printed, and cover 48 includes a window 50 of the same shape as raised portion 49. Preferably, window 50 is slightly larger in size, preferably a few millimeters, than raised portion 49. Cover 48 is held in an open position by two gas cylinders 51, as known in the industry. Preferably, at least part of the printing table assembly, for example raised portion 40, is a vacuum table, to allow holding of non-porous media such as paper, boards, plastic etc.

Reference is now made to FIGS. 11 and 12, which are simplified perspective drawings of garment mounting assembly 46, with a mounted garment, in an opened and closed positions, constructed and operative in accordance with one embodiment of the present invention. FIG. 11 shows a garment 52 loaded onto garment mounting assembly 46. Garment 53 is loaded manually onto the media-holding plate, as the plate's chamfers 53 center the garment on the plate. As can be seen in FIG. 12, after garment 53 is loaded onto the media-holding plate, cover 48 is closed against the media-holding plate, while gas cylinders 51 urge the cover to the closed orientation. The edges of the garment are stretched slightly by the cover surface that touches the table's lower surface around the raised portion. As a result, the garment is held firmly in place to allow high-resolution printing (i.e., there is substantially no movement of the media during printing or wrinkling).

According to another embodiment of this invention, the garment mounting assembly is a simple, flattened plate, made of aluminum or wood on which a textile piece or a garment is positioned. Flattened plates are well known by those who are familiar with the garment printing industry.

Reference is now made to FIG. 13, which is a simplified schematic drawing of an inkjet printing head assembly 54, constructed and operative in accordance with one embodiment of the present invention. Printing head assembly 54 comprises an array of printing heads 55, arranged for printing directly on a finished garment, a textile piece or other flexible or rigid medium. Each printing head 55 comprises at least one inkjet nozzle 56. Printing head 55 can be any conventional printing head, such as those marketed by Spectra, Inc., New Hampshire, USA and others known in the industry.

According to one preferred embodiment of the invention, printing heads assembly 54 is a massive array of conventional piezoelectric drop-on-demand or continuous inkjet heads, which perform the high-speed printing. It is a particular feature of the present invention that at least a 500, and preferably several thousands (i.e., 2,000) nozzles are provided for simultaneous printing, resulting in a very quick and accurate process. Each printing head 55 consists of dozens of nozzles 56 that are controlled independently by main computer 21, optionally via PLC 40.

Reference is now made to FIGS. 14A, 14B, 14C and 14D, which, taken together, are simplified schematic illustration of several stages of the printing process, according to a preferred embodiment of the present invention. FIGS. 14A, 14B, 14C and 14D, show four consecutive passes of a part of a garment, such as garment 53 shown in FIG. 12, under a single print head, such as print head 56 of FIG. 13.

According to a preferred embodiment, the distances between nozzles and between printing heads are bigger than the printing resolution, hence several print passes are needed to complete the image. After each pass in the X-axis, here created by movement of the printing table assembly with media 53, printing head 55 moves incrementally in the Y-axis to prepare for the next pass. It will be appreciated that computer 21 is programmed to control the relative motion of the printing heads and the printing table assembly so as to obtain this accurate and complete coverage.

The printing process is performed while relative motion occurs between the printing heads array 55 and the printing table assembly. At least two axes of motion are needed for this multi-color printing: X-axis motion that is in the printing direction; and Y-axis motion that is perpendicular to the printing direction. As stated above, the distances between nozzles and between printing heads are bigger than the printing resolution, hence several print passes are needed to complete the image. This is accomplished by moving the printing table assembly back and forth along the X-axis while moving the heads array perpendicular to the line of printing. The X-axis is the printing line and the Y-axis is the line on which the printing heads array moves after each pass to fill the gaps between printed lines in the next pass. Multicolor printing is performed as the table surface passes below the drop-on-demand inkjet nozzles array.

According to an alternative embodiment of the invention, the Y-axis is the fast-moving axis, while the X-axis moves incrementally to permit filling in of the gaps between printed lines.

A printing command is sent by the printing heads driver (not shown) to each nozzle at the exact time and location for ink firing. The printing command is actually an electronic pulse, with exact width, voltage level, rise time and decay time. Printing heads drivers are commercial systems known in the industry, such as *Inca* drivers, of *Inca* Digital Printers, Cambridge, England. When printing is completed, the printing table is moved to a loading position. Then, the printed garment is unloaded and a new garment is loaded onto the printing table.

Reference is now made to FIG. 15, which is a simplified flow chart of the process of wetting the garment prior and optionally subsequent to printing, preferably executed by computer 21. The process of wetting the garment with the wetting composition of the present invention described above starts with element 57 by loading the image file from the computer's storage. The process progresses to element 58 to determine the edges of the image on the garment, which are also the edges of the area to be wetted. The process continues to element 59 to activate X-axis 12, which moves printing table 13. The process advances to element 60 to receive from the encoder the position data of printing table 13. The process proceeds to element to determine which nozzles to open (element 61) or close (element 62) and sends the appropriate commands (elements 63 and 64) to nozzle solenoids 35, preferably via PLC 40. When the other edge of the image is reached (element 65) the process is stopped (element 66).

The printing system of the embodiments described above incorporates the following subsequent processes:

loading and unloading garments, while optionally ironing at least the area onto which the image in printed on;

wetting at least a part of the area of the garment to be printed by contacting it with a wetting composition as described hereinabove;

forming an image by applying an ink composition over the wetted area of the mounted garment;

optionally re-wetting the area onto which the image is printed; and optionally curing the image.

In order to increase the throughput of the system, these processes can be performed in parallel, as seen in the above embodiments of the invention.

It will be appreciated that the invention is not limited to what has been described hereinabove merely by way of example. Rather, the invention is limited solely by the claims that follow.

It is expected that during the life of this patent many relevant liquid applicator devices and ink applicator devices and systems will be developed and the scope of the terms herein, particularly of the terms "spraying nozzles" and "inkjet nozzles", is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions; illustrate the invention in a non limiting fashion.

Material and Methods

General Printing Procedure:

In all the Examples below, a "Kornit 930" or a "Kornit 931" digital printing machine (manufactured by Kornit Digital Ltd., Israel) and equipped with a wetting system for applying the wetting composition, as described hereinabove, were used.

Printing was typically performed on the surface of a 100% cotton textile T-shirt. Similar tests were also performed on a surface of 50% cotton and 50% polyester, yielding the same results.

The T-shirts were ironed for 5 seconds at 160° C. using an automatic press. Thereafter the ironed T-shirts were mounted on the digital printing machine.

The merits of the resulting multicolor image was assessed both qualitative (visually inspected) and quantitative (numerically parameterized). An exemplary multicolor image was printed for a qualitative assessment of the printing process and the resulting image. For a quantitative assessment of the printing process and the resulting image, four color squares (4×4 cm), each having one pure CMYK color were printed on the T-shirts without applying a wetting composition and compared to color squares printed with the wetting composition. The color squares were printed at 100% and 50% surface coverage on white T-shirts and 100% surface coverage on a black T-shirts. All prints were cured in an IR curing unit prior to testing.

Specifically, unless otherwise stated, the experimental preparations for printing on 100% cotton white T-shirts purchased from Anvil Ltd. included:

Machine type: KORNIT 931 D;

Printing resolutions of 727×727 dots per inch;

Wetting composition spraying rate of 0.08-0.014 grams per square centimeter;

Curing cycle: 160 sec at 160 C using a press; and for printing on 100% cotton black T-shirts (Beefy-T) purchased from Hanes included:

Machine type: KORNIT 931 D;

Printing resolution for two layers of opaque white ink composition at 636×454 dots per inch and one layer of water based CMY ink compositions at 636×454 dots per inch;

Wetting composition spraying rate of 0.025-0.032 grams per square centimeter;

Curing cycle: 160 sec at 160 C using a press.

Measuring Equipment:

Colorimeter/densitometer Eye-One (I1) by Gretag Macbeth. Optical density measured using filter standard ANSI A (Internal auto calibration). Lab* (internal auto calibration) measured using observer angle 2 degrees and illumination set to D50.

Quantitative Assessment of Printing:

It is noted herein that there is a noticeable difference between the results as measured after conducting identical printing experiments using different textile pieces even when classified as similar, and even when coming from two different lots made by the same manufacturer. Namely, identical printing experiments using 100% cotton T-shirts of the same color including white, give varying results.

Nevertheless, the remarkable difference between prints with the use of a wetting composition and prints not using a wetting composition, always remain. In some textile types the amount of wetting composition and the optimal resolution at which the liquid ink composition can be applied may vary due to the fabric composition and nature, namely each textile type may require an adjustment for the optimal wetting amount and printing resolution. Using these optimized parameters will result in the most outstanding beneficial contribution of the wetting process.

An improved printing process on a textile piece achieves higher color intensity and brightness, namely high optical density, which can be translated into better coverage of a porous and non-uniform surface such as in the case of a textile piece.

In order to assess the quality of the resulting color prints using the process presented herein, L*a*b* parameters were measured.

As used herein, the term "L*a*b*" or "Lab*" refers to the CIE L*a*b* (International Commission on Illumination or Commission Internationale d'Eclairage, CIE) color model. Used interchangeably herein and throughout, CIE L*a*b*, L*a*b* or Lab is the most complete color model used conventionally to describe all the colors and shades which are typically visible to a normal human eye. The three parameters in the model define a particular color, whereas the lightness of the color is represented by the parameter L*, wherein L*=0 corresponds to black and L*=100 corresponds to white. The value between true magenta and true green is represented by the parameter a*, wherein a negative value indicates green and a positive value indicates magenta. The value between true yellow and true blue is represented by the parameter b*, wherein a negative value indicates blue and a positive value indicates yellow.

L*a*b* values which represent a three dimensional color space called colorimetric uniform color space as described in details hereinabove. In this color space model every set of three numbers (L*, a* and b*) represents one specific color that the human eye can perceive. The combination of all possible numbers (colors) affords the sum total (also known as the gamut) of the visual color range. Lab* values are used in the printing industry to quantify colors for evaluation of color differences (see, ΔE below), color gamuts, color transformations and other color qualities. The units of Lab* are absolute numbers.

Density, or optical density (OD) is a logarithmic scale of relative light reflectance from a defined surface. Optical density is used in the printing industry to measure quantities of ink deposits of printed materials. Since OD is determined with respect to a reference color, the units of OD are absolute numbers.

ΔE (pronounced "delta E") is a measure of color difference between two colored objects which is calculated from their colorimetric values such as Lab*. The smaller the ΔE value, the closer the two colors are to one another visually.

Standard reference of C, M, Y and K colors are used to determine the colorimetric definition of tested colors in terms of Lab* values. These serve as standard benchmark for measuring, for example, inkjet printing quality.

The numeric difference in the optical density and Lab* values between multicolor images printed with and without wetting in an otherwise similar process were compared, measuring the front and the back side of the subject T-shirt.

Example 1

Non-aqueous solvent-based ink compositions, having the four basic formulations of cyan, magenta, yellow and black colors (CMYK), were used.

A 100% cotton shirt was mounted onto the machine, as described above, and a multicolor image was directly printed on the fabric surface using an inkjet printing heads.

The printed image was then subjected to curing, by heating to 150-180° C. for 180 seconds using an infrared curing unit.

Figure 16A:
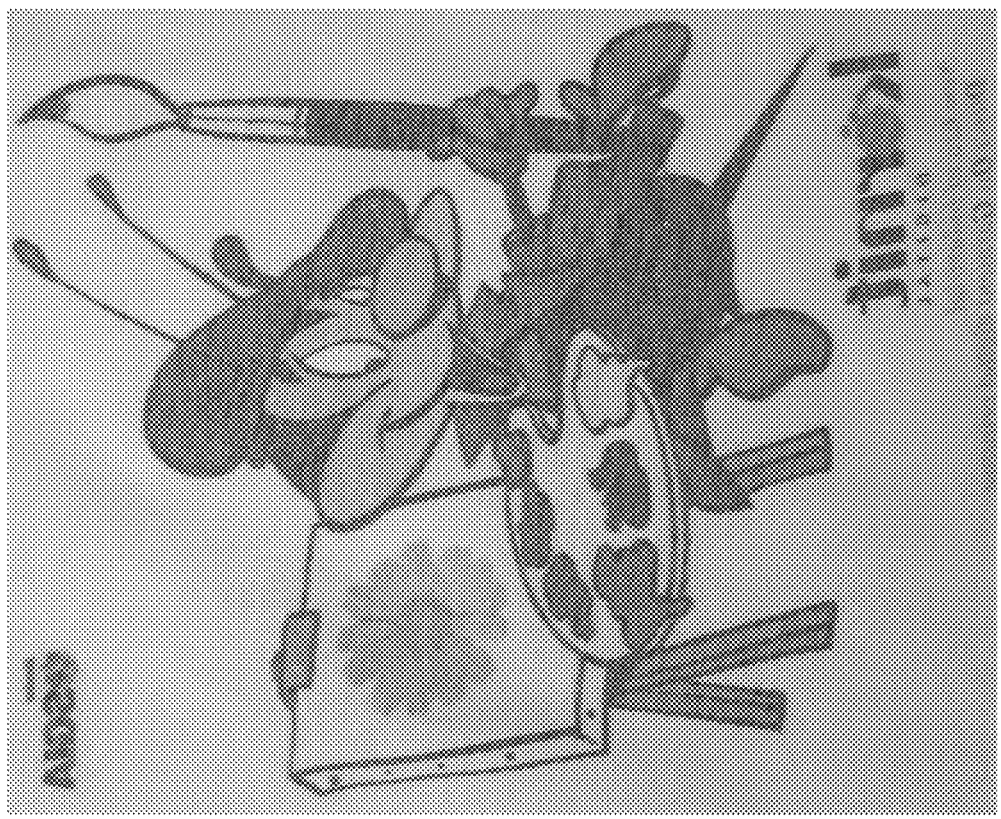
FIGS. 16A and 16B are photographs presenting the front side (FIG. 16A) and the back side (FIG. 16 B) of a 100% cotton garment onto which an image was directly printed using an inkjet printing machine.
Figure 16B:
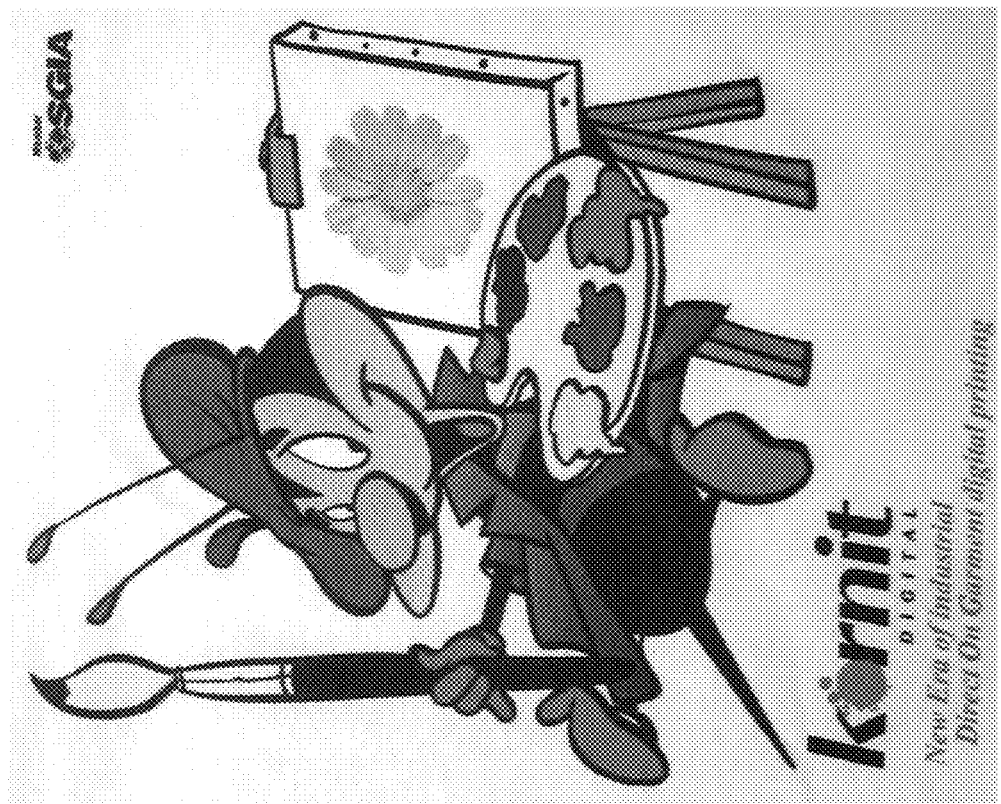

FIGS. 16A and 16B present photographs of the front side (FIG. 16A) and the back side (FIG. 16B) of the printed shirt and demonstrate the dullness of the obtained image and the colors bleeding (especially that of the cyan) obtained on the front side, and the high absorption of the ink in the fabric, as shown by the significant infiltration of the ink through the fabric and to the back side of the shirt.

Example 2

The same ink composition as in Example 1 was used for printing the same image, upon wetting the cotton shirt with an exemplary wetting composition according to the present invention.

Thus, a 100% cotton shirt was mounted onto the machine, as described above. 100% isopropanol was uniformly applied onto an area of the cotton fabric, using a spraying nozzle, at a density of 0.25 grams per cm² area of the cotton fabric.

Immediately thereafter, while the cotton fabric was still wet with the isopropanol, the image was printed on the wet area of the shirt surface using an inkjet printing head and the ink composition described above.

The printed image was then subjected to curing, by heating to 150-180° C. for 180 seconds using an infrared curing unit.

FIGS. 17A and 17B presents photographs of the front side (FIG. 17A) and the back side (FIG. 17B) of the printed shirt, and clearly demonstrate the superior brightness of the obtained image and the absence of visible adverse bleeding of the colors (FIG. 17A), as compared with the image obtained without applying the wetting composition (see, FIG. 16A), as well as the significantly reduced infiltration of the ink through the fabric to the back side of the shirt, as compared with that obtained without applying the wetting composition (see, FIG. 16B), and thus clearly demonstrate the superior quality of the image obtained by the printing process of the present invention.

Example 3

A non-aqueous solvent-based ink composition having the four basic formulations of cyan, magenta, yellow and black colors (CMYK) was used.

A 100% cotton shirt was mounted onto the machine, as described above, and a multicolor image of squares of each color formulation was directly printed on the fabric surface using an inkjet printing heads.

The printed image was then subjected to curing, by heating to 150-180° C. for 180 seconds using an infrared curing unit.

In a parallel test, the same process was repeated while uniformly applying 100% isopropanol onto an area of the cotton fabric prior to applying the ink formulations, as described hereinabove in Example 2.

The optical density of each of the colored squares, in each of the printed shirts (with and without pre-treatment with a wetting composition according to the present invention) was measured, using Shamrock Color Print 415. Table 1 below presents the optical densities values that were recorded and clearly show the higher values obtained following pre-treating the fabric with a wetting composition according to the present invention.

TABLE 1

| Color | Optical density without a wetting composition (OD) | Optical density with a wetting composition (OD) |
| --- | --- | --- |
| Cyan | 1.25 | 1.40 |
| Magenta | 0.95 | 1.20 |
| Yellow | 0.75 | 0.90 |
| Black | 1.25 | 1.40 |

Photographs of the front sides of a shirt printed without applying a wetting composition and of a shirt printed after applying a wetting composition demonstrated the improved brightness, definition and vividness of the image obtained on a fabric pre-treated with a wetting composition, according to the process of the present invention.

Photographs of the back sides of a shirt printed without applying a wetting composition and of a shirt printed after applying a wetting composition demonstrated the significantly reduced ink infiltration to the back side of the fabric upon pre-treating the shirt with a wetting composition and thus further demonstrated the beneficial modification of the surface characteristic of the printed object achieved by applying the wetting composition according to the process of the present invention.

Example 4

The following non-aqueous solvent-based ink composition was used:
Ethylene glycol butyl ether acetate (EGBEA) 80.0 grams
Cyclohexanone 4.0 grams
Dipropylene glycol methyl ether (DPM) 10.0 grams
Microlith Black preparation 6.0 grams A spraying nozzle attached to the printing machine was used to uniformly apply the wetting composition onto the subject surface.

A 100% cotton fabric was mounted onto the machine, as described above. 100% butanol was uniformly applied onto an area of the cotton fabric, using the spraying nozzle, at a density of 0.40 grams per cm$^2$ area of the cotton fabric.

Immediately thereafter, while the cotton fabric was still wet with the butanol, an image was printed on the wet area of the fabric surface using an inkjet printing head and the ink composition described above.

The printed fabric was then subjected to curing, by heating to 150-180° C. for 180 seconds using an infrared curing unit.

Compared to a similar image printed on a similar fabric using the same print-head and ink composition, but without the pre-wetting step, the image resulting after applying the above wetting composition displayed no visible feathering signs. The optical density of the image was higher, and less ink was transferred to the back side of the fabric.

Example 5

The following non-aqueous solvent-based ink composition was used:
Ethylene glycol butyl ether acetate (EGBEA) 80.0 grams
Cyclohexanone 4.0 grams
Dipropylene glycol methyl ether (DPM) 10.0 grams
Microlith Black preparation 6.0 grams A spraying nozzle attached to the printing machine was used to uniformly apply the wetting composition onto the subject surface.

A 100% cotton fabric was mounted onto the machine described above. A mixture of 97% isopropanol and 3% SCX 8383 acrylic emulsion (Johnson Polymers) was uniformly applied onto an area of the cotton fabric, using the spraying nozzle, at a density of 0.40 grams per cm$^2$ area of the cotton fabric.

Immediately thereafter, while the cotton fabric was still wet with the wetting composition, an image was printed on the wet area of the fabric surface using an inkjet printing head and the ink composition described above.

The printed fabric was then subjected to curing, by heating to 150-170° C. for 60 seconds using an infrared curing unit.

Compared to a similar image printed on a similar fabric using the same print-head and ink composition, but without the pre-wetting step, the image resulting after applying the above wetting composition displayed no visible feathering signs. The optical density of the image was higher, and less ink was transferred to the back side of the fabric.

Example 6

The following non-aqueous solvent-based ink composition was used:
Ethylene glycol butyl ether acetate (EGBEA) 80.0 grams
Cyclohexanone 4.0 grams
Dipropylene glycol methyl ether (DPM) 10.0 grams
Microlith Black preparation 6.0 grams A pipette was used to uniformly apply the wetting composition onto the subject surface.

A 100% cotton fabric was mounted onto the machine described above. 100% petroleum ether (80-100) was uniformly applied onto an area of the cotton fabric, using the pipette, at a density of 0.40 grams per cm$^2$ area of the cotton fabric.

Immediately thereafter, while the cotton fabric was still wet with the wetting composition, an image was printed on the wet area of the fabric surface using an inkjet printing head and the ink composition described above.

The printed fabric was then subjected to curing, by heating to 150-170 C.° for 150 seconds using an infrared curing unit.

Compared to a similar image printed on a similar fabric using the same print-head and ink composition, but without the pre-wetting step, the image resulting after applying the above wetting composition displayed no visible feathering signs. The optical density of the image was higher, and less ink was transferred to the back side of the fabric.

Example 7

The following aqueous-based ink composition was used:
Cymel 323 (Cytec Industries) 30.0 grams
Polyethylene glycol 35,000 (Sigma-Aldrich) 4.0 grams
Nacure 2501 (King Industries) 2.0 grams
Dipropylene glycol methyl ether (Dow Chemicals) 15.0 grams
Isopropanol 5.0 grams
Distilled water 40.0 grams
Spectra fix red 195 (Spectra Colors Group) 4.0 grams A 100% cotton fabric was mounted onto the machine described above. 100% ethylene glycol butyl ether acetate (EGBEA) was uniformly applied onto an area of the cotton fabric, using a spraying nozzle, at a density of 0.60 grams per $cm^2$ area of the cotton fabric.

Immediately thereafter, while the cotton fabric was still wet with the wetting composition, an image was printed on the wet area of the fabric surface using an inkjet printing head and the ink composition described above.

The printed fabric was then subjected to curing, by heating to 150-180 C.° for 180 seconds using an infrared curing unit.

Compared to a similar image printed on a similar fabric using the same print-head and ink composition, but without the pre-wetting step, the image resulting after applying the above wetting composition displayed no visible feathering signs. The optical density of the image was higher, and less ink was transferred to the back side of the fabric.

Example 8

The following aqueous-based ink composition was used:
Cymel 323 (Cytec Industries) 30.0 grams
Polyethylene glycol 35,000 (Sigma-Aldrich) 4.0 grams
Nacure 2501 (King Industries) 2.0 grams
Dipropylene glycol methyl ether (Dow Chemicals) 15.0 grams
Isopropanol 5.0 grams
Distilled water 40.0 grams
Spectra fix red 195 (Spectra Colors Group) 4.0 grams A 100% cotton fabric was mounted onto the machine described above. 100% cyclohexanone was uniformly applied onto an area of the cotton fabric, using a spraying nozzle, at a density of 0.60 grams per $cm^2$ area of the cotton fabric.

Immediately thereafter, while the cotton fabric was still wet with the wetting composition, an image was printed on the wet area of the fabric surface using an inkjet printing head and the ink composition described above.

The printed fabric was then subjected to curing, by heating to 150-180 C.° for 180 seconds using an infrared curing unit.

Compared to a similar image printed on a similar fabric using the same print-head and ink composition, but without the pre-wetting step, the image resulting after applying the above wetting composition displayed no visible feathering signs. The optical density of the image was higher, and less ink was transferred to the back side of the fabric.

Example 9

The following non-aqueous solvent-based ink composition was used: Ethylene glycol butyl ether acetate (EGBEA) 80.0 grams
Cyclohexanone 4.0 grams
Dipropylene glycol methyl ether (DPM) 10.0 grams
Microlith Black preparation 6.0 grams A 100% cotton fabric was mounted onto the machine described above. 100% ethanol was uniformly applied onto an area of the cotton fabric, using the spraying nozzle, at a density of 0.40 grams per $cm^2$ area of the cotton fabric.

Immediately thereafter, while the cotton fabric was still wet with the wetting composition, an image was printed on the wet area of the fabric surface using an inkjet printing head and the ink composition described above.

The printed fabric was then subjected to curing, as described above.

Compared to a similar image printed on a similar fabric using the same print-head and ink composition, but without the pre-wetting step, the image resulting after applying the above wetting composition displayed no visible feathering signs. The optical density of the image was higher, and less ink was transferred to the back side of the fabric.

Example 10

The following non-aqueous solvent-based ink composition was used:
Ethylene glycol butyl ether acetate as a carrier, 60%
Propylene glycol monomethyl ether acetate as a carrier, 15%
Orasol dye as a colorant, 3%
Modified melamine-formaldehyde resin (such as Cymel 325), 11%
Polyester polyol (such as K-Flex XM-A307 by King Industries), 11%

A 100% cotton fabric was mounted onto the machine described above. A wetting composition composed of 90% isopropyl alcohol and 10% blocked p-toluenesulfonic acid was uniformly applied onto an area of the cotton fabric, using the spraying nozzle, at a density of 0.40 grams per $cm^2$ area of the cotton fabric.

Immediately thereafter, while the cotton fabric was still wet with the wetting composition, an image was printed on the wet area of the fabric surface using an inkjet printing head and the ink composition described above.

The printed fabric was then subjected to curing, as described above.

Example 11

For a quantitative assessment of the effect of the pre-wetting process using an aqueous-based wetting composition containing an exemplary property adjusting agent and aqueous-based liquid ink compositions containing an exemplary property sensitive agent. The following aqueous-based ink compositions of cyan, magenta, yellow and black colors (CMYK) formulated as bellow were used.

Water as a carrier 30-40%

Commercially available colorants such as carbon black, quinacridone, phtalocyanine and diarylide (Ciba, DuPont and BASF) as a colorant 2-4%

Johncryl HPD 96 (an acrylic resin, Johnson) as a property (pH) sensitive agent and a dispersant 3-5%

Acronal S400 (acrylic emulsion, BASF) as an adhesion promoting agent 25-30%

Propylene glycol or diethylene glycol as humectant 20-30%

Triethanol amine or diethanol amine as an organic base 0.5-1%

Sodium lauryl sulfate as a surface active agent 0.1-0.5%

Modified siloxanes (BYK) as a defoamer 0.1-0.5%

A 100% white cotton T-shirt by Anvil was heat pressed for 3 seconds at 160° C. and mounted onto the machine (Kornit 931D).

An image composed of three rows of four squares of 4×4 cm of each color (CMYK) were printed on the media at 727×727 dots per inch in 100% coverage (first row), 75% coverage (second row) and 50% coverage (third row) of the surface per the given area and resolution.

The same color image was printed again on the same media after pre-wetting the predetermined area with a wetting composition in an amount of 0.008-0.014 grams per square centimeter:

Water as a wetting composition carrier 96.9%

Acetic acid (or formic acid or propionic acid) as a property (pH) adjusting agent 3%

Sodium lauryl sulfate as a surface active agent 0.1%

After printing the color image, the printed images were cured for 150 seconds at 150° C. using a heat press.

The optical density (OD) and Lab* values were measured on both side of the printed media, namely in the front and rear side of the fabric, using a colorimeter/densitometer Eye-One (I1) by Gretag Macbeth, used as described hereinabove.

The results are presented in Table 2 below. The left column presents the percent of area coverage by a colored ink composition at a printing coverage (100%=727×727 dots per inch), indicating whether a wetting composition was used or absent.

TABLE 2

| Percent coverage | Cyan | Magenta | Yellow | Black |
|---|---|---|---|---|
| | Optical density on the front of the fabric | | | |
| 100% with wetting | 1.50 | 1.40 | 1.32 | 1.52 |
| 50% with wetting | 1.42 | 1.35 | 1.25 | 1.45 |
| 100% no wetting | 1.25 | 1.17 | 1.10 | 1.29 |
| 50% no wetting | 1.20 | 1.10 | 1.00 | 1.20 |
| | Optical density on the back of the above prints | | | |
| 100% with wetting | 0.20 | 0.22 | 0.16 | 0.25 |
| 50% with wetting | 0.15 | 0.16 | 0.12 | 0.20 |
| 100% no wetting | 0.44 | 0.47 | 0.42 | 0.50 |
| 50% no wetting | 0.30 | 0.29 | 0.27 | 0.35 |

As can be seen in Table 2, printing a colored image using the pre-wetting process yielded an optical density, corresponding to each basic color, which is overall greater on the front side of the fabric as compared to the images which were printed without using a wetting composition. As can further be seen in Table 2, the back side of the fabric was remarkably less stain with the colored ink composition when using the wetting composition.

Photographs of the rear side of a white cotton piece onto which the image was printed using a colored ink composition containing an exemplary property (pH) sensitive agent namely a resin binder that settles at low pH, but without the use of a wetting composition, and of presents the rear side of the same cotton piece onto which the same image was printed using the same colored ink composition subsequent to contacting the surface of the substrate with a wetting composition containing an exemplary property-adjusting agent, namely acetic acid as an organic acid for lowering the pH demonstrated that the inks penetrated the cotton fabric and left a very clear impression of the inverse image. However, when the wetting composition comprising a pH-adjusting agent was applied, the inks comprising a property-sensitive agent hardly penetrated the fabric and the only a faint impression of the image is visible.

These results clearly demonstrate the advantageous effect of the process using a wetting composition, in combination with a property (pH)-adjusting agent that reacts with a property (pH)-sensitive agent, by showing how a high-resolution image in obtained at higher optical density per each basic color, as compared to an identical image printed without the wetting composition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A process of inkjet printing an image on a garment, comprising:
    (a) loading a garment on a garment handling assembly of a printing machine;
    (b) prior to any printing step, causing an ironing unit of the printing machine to iron the garment while loaded on the garment handling assembly;
    (c) causing an inkjet printing assembly of the printing machine to print the image on the ironed garment on the garment handling assembly; and
    (d) unloading the printed garment from the garment handling assembly,
    wherein the motion of the garment handling assembly to move the garment handling assembly with loaded garment to the ironing unit and the printing assembly, within the printing machine, is controlled by a computer.

2. The process of claim 1, further including the step of, prior to said step (c), causing a liquid applicator of the printing machine to wet the garment, said step (b) occurring prior to or subsequent to said wetting.

3. A process according to claim 2, wherein said liquid applicator is caused to wet the garment with a wetting composition selected from the group consisting of water, at least one organic solvent, and a combination of water and at least one organic solvent.

4. A process according to claim 2, that does not include any pre-treatment of the fabric of the garment prior to said step (a) for the purpose of overcoming limitations associated with digital inkjet printing.

5. A printer for printing an image on a garment, comprising:
- a garment handling assembly onto which a garment can be loaded for printing;
- an ironing unit that effects ironing of a garment loaded on said garment handling assembly;
- an inkjet printing assembly that prints an image onto the ironed garment loaded on said garment handling assembly; and
- a computer that controls the motion of the garment handling assembly with respect to said ironing unit and said inkjet printing assembly such that said garment handling assembly is moved to said ironing unit prior to being moved to any inkjet printing assembly.

6. A printer according to claim 5, further including a liquid applicator that wets at least a portion of the loaded garment prior to printing by said inkjet printing assembly.

7. A printer according to claim 6, wherein said liquid applicator wets the at least a portion of the loaded garment with a wetting composition selected from the group consisting of water, at least one organic solvent, and a combination of water and at least one organic solvent.

* * * * *